(12) United States Patent
Takakuwa et al.

(10) Patent No.: US 8,470,502 B2
(45) Date of Patent: Jun. 25, 2013

(54) PHOTOSENSITIVE RESIN COMPOSITION, COLOR FILTER AND METHOD OF PRODUCING THE SAME, AND SOLID-STATE IMAGING DEVICE

(75) Inventors: Hideki Takakuwa, Shizuoka-ken (JP); Kaoru Aoyagi, Shizuoka-ken (JP); Kazuto Shimada, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 542 days.

(21) Appl. No.: 12/509,501

(22) Filed: Jul. 27, 2009

(65) Prior Publication Data

US 2010/0044817 A1 Feb. 25, 2010

(30) Foreign Application Priority Data

Aug. 21, 2008 (JP) ................... 2008-213260

(51) Int. Cl.
*G02B 5/20* (2006.01)
*G03F 7/00* (2006.01)

(52) U.S. Cl.
USPC ............ 430/7; 430/270.1; 257/432; 257/440

(58) Field of Classification Search
None
See application file for complete search history.

(56) References Cited

U.S. PATENT DOCUMENTS

| | | | |
|---|---|---|---|
| 2006/0241259 A1* | 10/2006 | Tanabe et al. | 526/217 |
| 2007/0128548 A1 | 6/2007 | Kim et al. | |
| 2007/0166631 A1* | 7/2007 | Fujimori | 430/7 |

FOREIGN PATENT DOCUMENTS

| | | |
|---|---|---|
| JP | 58-199341 A | 11/1983 |
| JP | 63-257939 A | 10/1988 |
| JP | 2007-053153 A | 3/2007 |
| JP | 2007219467 A | 8/2007 |
| JP | 2007/271994 A | 10/2007 |
| JP | 2008-052250 A | 3/2008 |
| KR | 10-2002-0097414 A | 12/2002 |
| KR | 10-2007-0057652 A | 6/2007 |

OTHER PUBLICATIONS

Corresponding EPO Official Communication.
Office Action dated Sep. 4, 2012 issued in a corresponding Japanese patent application.

* cited by examiner

*Primary Examiner* — John A. McPherson
(74) *Attorney, Agent, or Firm* — SOLARIS Intellectual Property Group, PLLC

(57) ABSTRACT

A photosensitive resin composition is provided which provides a high resolution even when a pattern is formed using a low exposure intensity (in particular, less than 200 mJ/cm$^2$) and may inhibit deterioration in pattern rectangularity during a post baking process of a post treatment. The photosensitive resin composition includes: a resin; an oxime photopolymerization initiator; a UV absorbing agent; and a monomer containing a hydrogen bonding group, the amount of the monomer containing a hydrogen bonding group being 30 mass % or more with respect to the total solid content of the composition, and the photosensitive resin composition is used for forming a solid-state imaging device.

19 Claims, No Drawings

PHOTOSENSITIVE RESIN COMPOSITION, COLOR FILTER AND METHOD OF PRODUCING THE SAME, AND SOLID-STATE IMAGING DEVICE

CROSS-REFERENCE TO RELATED APPLICATION

This application claims priority under 35 USC 119 from Japanese Patent Application No. 2008-213260 filed on Aug. 21, 2008, the disclosure of which is incorporated by reference herein.

BACKGROUND OF THE INVENTION

1. Field of the Invention

The present invention relates to a photosensitive resin composition, a color filter and a method of producing the same, and a solid-state imaging device.

2. Description of the Related Art

For a color filter used for an image sensor (for example, a Charge Coupled Device (CCD), a Complementary Metal Oxide Semiconductor (CMOS) or the like), a single color of a multiple color filter is sometimes made white (transparent) for the purpose of improving sensitivity (e.g., see Japanese Patent Application Laid-Open (JP-A) No. 2007-53153). The background of this is that, although pixel numbers have increased and pixel size has been reduced recently to obtain a better resolution, the size of an aperture has decreased, resulting in a decrease in sensitivity. Thus, to compensate for the decrease in sensitivity, a single color of a multiple color filter is made white (transparent), whereby sensitivity can be improved.

Meanwhile, there are some cases in which a transparent material is used as a protective film for a liquid crystal display apparatus (see Japanese Patent Application Laid-Open (JP-A) Nos. 2008-52250 and 2007-271994, for example).

SUMMARY OF THE INVENTION

However, characteristics required for pattern formation of a transparent resin layer used for the formation of a white (transparent) pixel of a color filter for an image sensor (hereinbelow, also referred to as "solid-state imaging device") are different from those required for pattern formation of a transparent material used as a protective film for a liquid crystal display apparatus. Specifically, since the transparent material used as a protective film easily allows an active energy ray (i-ray, etc.) to pass therethrough, when the transparent material is used, there may be problems in that a pattern line width of a transparent resin layer tends to widen, and resolution and pattern formation are deteriorated thereby.

In particular, with respect to a color filter for a solid-state imaging device, in addition to the problems described above, pattern resolution of a transparent resin layer often becomes problematic due to halation upon exposure to form a pattern on a wafer.

In addition, when a pattern is formed using a low exposure intensity to increase production efficiency, another problem occurs during a post baking process of a post treatment, i.e., a pattern after development is deformed by heat (also referred to as "heat sag") and pattern rectangularity (i.e., a rectangular cross-sectional shape of a pattern) is deteriorated.

Considering the above, the present invention is directed to the following.

According to an aspect of the present invention, a photosensitive resin composition is provided which provides a high resolution even when a pattern is formed using a low exposure intensity (in particular, less than 200 mJ/cm$^2$) and which may inhibit deterioration in desired pattern rectangularity during a post baking process of a post treatment.

According to another aspect of the present invention, a color filter is provided which has excellent pattern rectangularity and which may be used for producing a fine and high-quality image display, and a method of producing the same is also provided.

According to another aspect of the present invention, a solid-state imaging device having excellent color reproducibility is provided.

Hereinbelow, the present invention will be described.

<1> A photosensitive resin composition, including:
a resin;
an oxime photopolymerization initiator;
a UV absorbing agent; and
a monomer containing a hydrogen bonding group,
wherein the amount of the monomer containing a hydrogen bonding group is 30 mass % or more with respect to the total solid content of the photosensitive resin composition, and
wherein the photosensitive resin composition is used for forming a solid-state imaging device.

<2> The photosensitive resin composition according to <1>, wherein the mass ratio of the resin with respect to the total mass of all monomers including the monomer containing a hydrogen bonding group is from 0.6 to 1.0.

<3> The photosensitive resin composition according to <1>, wherein the mass ratio of the resin with respect to the total mass of all monomers including the monomer containing a hydrogen bonding group is from 0.62 to 0.8.

<4> The photosensitive resin composition according to <1>, wherein the amount of the UV absorbing agent is from 3 mass % to 10 mass % with respect to the total solid content of the photosensitive resin composition.

<5> The photosensitive resin composition according to <1>, wherein the UV absorbing agent is a compound having a maximum absorbance in the wavelength range of 250 nm to 400 nm.

<6> The photosensitive resin composition according to <1>, wherein the hydrogen bonding group is at least one selected from the group consisting of a carboxyl group, an alkoxycarbonylamino group, and a ureido group.

<7> The photosensitive resin composition according to <1>, wherein the UV absorbing agent is a conjugated diene compound.

<8> The photosensitive resin composition according to <7>, wherein the conjugated diene compound is a compound represented by the following Formula (1):

$$\begin{array}{c} R^1 \\ \diagdown \\ N-C=C-C=C \\ \diagup \; | \; | \; | \; \diagdown \\ R^2 \;\; H \;\; H \;\; H \;\; R^4 \end{array} \quad \text{Formula (I)}$$

with $R^3$ on the upper right.

wherein in Formula (I), $R^1$ and $R^2$ each independently represent a hydrogen atom, an alkyl group having 1 to 20 carbon atoms, or an aryl group having 6 to 20 carbon atoms; $R^1$ and $R^2$ may be the same as or different from each other, but may not both be a hydrogen atom; $R^1$ and $R^2$ may bind to each other to form a cyclic amino group together with the nitrogen atom; and $R^3$ and $R^4$ each independently represent an electron withdrawing group.

<9> The photosensitive resin composition according to <8>, wherein the electron withdrawing group has a Hammett substituent constant $\sigma_p$ of from 0.20 to 1.0.

<10> The photosensitive resin composition according to <1>, wherein the monomer containing a hydrogen binding group is a polyfunctional monomer.

<11> The photosensitive resin composition according to <1>, wherein the photosensitive resin composition has a light transmittance of 90% or more in the wavelength range of from 400 nm to 700 nm when the photosensitive resin composition is formed into a film having a thickness of 1 μm.

<12> A method for producing a color filter, including:
applying the photosensitive resin composition according to any one of <1> to <11> onto a substrate to form a coating film;
exposing the coating film to a UV ray through a photomask;
developing the coating film to form a pattern; and
post-baking the pattern.

<13> A color filter, which is produced by the method for producing a color filter according to <12>.

<14> A solid-state imaging device, including the color filter according to <13>.

DETAILED DESCRIPTION OF THE INVENTION

Photosensitive Resin Composition

The photosensitive resin composition according to an exemplary embodiment of the invention includes a resin, an oxime photopolymerization initiator, a UV absorbing agent, and a monomer having a hydrogen bonding group, the monomer being included in an amount of 30 mass % or more with respect to total solid content of the composition. The composition may be used for forming pixels of a solid-state imaging device.

By having the constitution as described above, the photosensitive resin composition of the invention provides a high resolution even when a pattern is formed using a low exposure intensity (in particular, less than 200 mJ/cm$^2$), and deterioration in desired pattern rectangularity during a post baking process of a post treatment is inhibited.

Hereinbelow, each constitutional material will be described.

1. Resin

The photosensitive resin composition according to an exemplary embodiment of the invention includes at least one resin.

As for the resin, an alkali-soluble resin is preferable.

The alkali-soluble resin is not particularly limited as long as it is alkali-soluble. The alkali-soluble resin is preferably selected in view of heat resistance, a developing property, availability and the like.

The alkali-soluble resin is preferably a linear organic high-molecular-weight polymer which is also soluble in an organic solvent and can be developed by a weak alkaline solution. Examples of such a linear organic high-molecular-weight polymer include a polymer having carboxylic acid in a side chain thereof, such as a methacrylic acid copolymer, an acrylic acid copolymer, an itaconic acid copolymer, a crotonic acid copolymer, a maleic acid copolymer, or a partially esterified maleic acid copolymer as described in Japanese Patent Application Laid-Open (JP-A) No. 59-44615, Japanese Patent Application Publication (JP-B) Nos. 54-34327, 58-12577 and 54-25957, and JP-A Nos. 59-53836 and 59-71048. Similarly, an acidic cellulose derivative having carboxylic acid in a side chain thereof is also useful.

In addition to those described above, examples of the alkali-soluble resin include a hydroxyl group-containing polymer to which acid anhydride is added, a polyhydroxystyrene resin, a polysiloxane resin, poly(2-hydroxyethyl(meth)acrylate), polyvinylpyrrolidone, polyethylene oxide, and polyvinyl alcohol.

The linear organic high-molecular-weight polymer may be a copolymer of a monomer having a hydrophilic group. Examples thereof include alkoxyalkyl(meth)acrylate, hydroxyalkyl(meth)acrylate, glycerol(meth)acrylate, (meth)acrylamide, N-methylolacrylamide, secondary or tertiary alkylacrylamide, dialkylaminoalkyl(meth)acrylate, morpholine(meth)acrylate, N-vinylpyrrolidone, N-vinylcaprolactam, vinylimidazole, vinyltriazole, methyl(meth)acrylate, ethyl(meth)acrylate, branched or straight-chain propyl(meth)acrylate, branched or straight-chain butyl(meth)acrylate, and phenoxyhydroxypropyl(meth)acrylate.

Herein, "(meth)acrylate" indicates an acrylate or a methacrylate, "(meth)acryl" indicates an acryl or a methacryl, and "(meth)acrylamide" indicates an acrylamide or a methacrylamide.

Further, other examples of the monomer having a hydrophilic group include a monomer which includes a tetrahydrofurfuryl group, a phosphoric acid group, a phosphate ester group, a quaternary ammonium group, an ethyleneoxy chain, a propyleneoxy chain, a sulfonic acid group or a group derived from salt thereof, and a morpholinoethyl group.

In order to improve cross-linking efficiency, the alkali-soluble resin particularly preferably has a polymerizable group in its side chain. Useful examples thereof include a polymer which includes an allyl group, a (meth)acryl group, an allyloxyalkyl group or the like in its side chain.

Useful examples of a polymer having a polymerizable group include commercially available KS resist-106 (trade name, manufactured by OSAKA ORGANIC CHEMICAL INDUSTRY LTD.), and CYCLOMER P series (trade name, manufactured by DAICEL CHEMICAL INDUSTRIES, LTD.). In addition, to improve strength of a cured film, alcohol-soluble nylon or polyether of 2,2-bis-(4-hydroxyphenyl)-propane and epichlorohydrin is also useful.

Among these various alkali-soluble resins, a polyhydroxystyrene resin, a polysiloxane resin, an acryl resin, an acrylamide resin, and an acryl/acrylamide copolymer resin are preferred in terms of heat resistance. Further, in terms of control of a developing property, an acryl resin, an acrylamide resin and an acryl/acrylamide copolymer resin are preferred.

As for the acryl resin, a copolymer obtained from polymerization of monomers selected from benzyl(meth)acrylate, (meth)acrylic acid, hydroxyethyl(meth)acrylate, (meth)acrylamide and the like, or commercially available KS resist-106 (trade name, manufactured by OSAKA ORGANIC CHEMICAL INDUSTRY LTD.), CYCLOMER P series (trade name, manufactured by DAICEL CHEMICAL INDUSTRIES, LTD.) and the like are preferably used.

The alkali-soluble resin is preferably a polymer having a weight average molecular weight of from 1,000 to $2\times10^5$ (measured by Gel Permeation Chromatography (GPC) method in terms of polystyrene) from the viewpoints of developing property, liquid viscosity, and the like, more preferably a polymer having a weight average molecular weight of from 2,000 to $1\times10^5$, and still more preferably a polymer having a weight average molecular weight of from 5,000 to $5\times10^4$.

In the invention, the amount of the resin in the photosensitive resin composition is preferably from 10 to 90 mass %, more preferably from 20 to 60 mass %, and still more preferably from 30 to 50 mass %, with respect to the total solid content of the photosensitive resin composition, in terms of a developing property and the like.

In the present invention, the total solid content of the photosensitive resin composition indicates all of the components included therein except a solvent.

In an exemplary embodiment of the present invention, the ratio between the mass of a resin and the mass of all monomers including a monomer which has a hydrogen bonding group (i.e., total mass of resin components/total mass of monomer components) is preferably from 0.6 to 1.0, more preferably from 0.62 to 0.8 and still more preferably from 0.65 to 0.7, to obtain an appropriate pattern rectangularity.

2. Oxime Photopolymerization Initiator

The photosensitive resin composition according to an exemplary embodiment of the invention further includes at least one oxime photopolymerization initiator. The oxime photopolymerization initiator is preferably a compound which can be decomposed by light and can initiate and promote a polymerization reaction of a radical polymerizable monomer. Compounds having absorption in the wavelength range of 300 to 500 nm are more preferable. The reason why an oxime photopolymerization initiator is favored is that, since it has high decomposition efficiency by light and a high curing property, it is believed that a rectangular pattern can be easily obtained after development by the use thereof.

Examples of the oxime photopolymerization initiator to be used in the invention include the compounds described J. C. S. Perkin II (1979) 1653-1660, J. C. S. Perkin II (1979) 156-162, Journal of Photopolymer Science and Technology (1995) 202-232, JP-A Nos. 2000-66385 and 2000-80068, Japanese Patent Application National Publication (Laid-Open) No. 2004-534797, JP-A No. 2001-233842, or WO-02/100903 A1.

Specific examples of the oxime photopolymerization initiator include, but are not limited thereto, 2-(O-benzoyloxime)-1-[4-(phenylthio)phenyl]-1,2-butanedione, 2-(O-benzoyloxime)-1-[4-(phenylthio)phenyl]-1,2-pentanedione, 2-(O-benzoyloxime)-1-[4-(phenylthio)phenyl]-1,2-hexanedione, 2-(O-benzoyloxime)-1-[4-(phenylthio)phenyl]-1,2-heptanedione, 2-(O-benzoyloxime)-1-[4-(phenylthio)phenyl]-1,2-octanedione, 2-(O-benzoyloxime)-1-[4-(methylphenylthio)phenyl]-1,2-butanedione, 2-(O-benzoyloxime)-1-[4-(ethylphenylthio)phenyl]-1,2-butanedione, 2-(O-benzoyloxime)-1-[4-(butylphenylthio)phenyl]-1,2-butanedione, 1-(O-acetyloxime)-1-[9-ethyl-6-(2-methylbenzoyl)-9H-carbazol-3-yl]ethanone, 1-(O-acetyloxime)-1-[9-methyl-6-(2-methylbenzoyl)-9H-carbazol-3-yl]ethanone, 1-(O-acetyloxime)-1-[9-propyl-6-(2-methylbenzoyl)-9H-carbazol-3-yl]ethanone, 1-(O-acetyloxime)-1-[9-ethyl-6-(2-ethylbenzoyl)-9H-carbazol-3-yl]ethanone, and 1-(O-acetyloxime)-1-[9-ethyl-6-(2-butylbenzoyl)-9H-carbazol-3-yl]ethanone.

More preferred examples of the oxime photopolymerization initiator include 2-(O-benzoyloxime)-1-[4-(phenylthio)phenyl]-1,2-octanedione and 1-(O-acetyloxime)-1-[9-ethyl-6-(2-methylbenzoyl)-9H-carbazol-3-yl]ethanone. Examples of such oxime photopolymerization initiator also include CGI-124 and CGI-242 (both trade names, manufactured by Ciba Specialty Chemicals).

Further, the oxime photopolymerization initiator may also be a compound represented by the following Formula (1) (hereinbelow, sometimes referred to as "novel oxime compound") to obtain an appropriate rectangularity of a produced pattern.

Novel Oxime Compound

A novel oxime compound according to an exemplary embodiment of the invention is a compound represented by the following Formula (1).

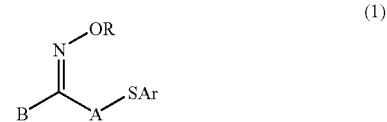

In Formula (1), R and B each independently represent a monovalent substituent; A represents a divalent organic group; and Ar represents an aryl group.

The monovalent substituent represented by R in Formula (1) is preferably a monovalent non-metal atom group described below.

Examples of the monovalent non-metal atom group represented by R include a substituted or unsubstituted alkyl group, a substituted or unsubstituted aryl group, a substituted or unsubstituted alkenyl group, a substituted or unsubstituted alkynyl group, a substituted or unsubstituted alkylsulfinyl group, a substituted or unsubstituted arylsulfinyl group, a substituted or unsubstituted alkylsulfonyl group, a substituted or unsubstituted arylsulfonyl group, a substituted or unsubstituted acyl group, a substituted or unsubstituted alkoxycarbonyl group, a substituted or unsubstituted aryloxycarbonyl group, a substituted or unsubstituted phosphinoyl group, a substituted or unsubstituted heterocyclic group, a substituted or unsubstituted alkylthiocarbonyl group, a substituted or unsubstituted arylthiocarbonyl group, a substituted or unsubstituted dialkylaminocarbonyl group, and a substituted or unsubstituted dialkylaminothiocarbonyl group.

The substituted or unsubstituted alkyl is preferably an alkyl group having 1 to 30 carbon atoms. Examples thereof include a methyl group, an ethyl group, a propyl group, a butyl group, a hexyl group, an octyl group, a decyl group, a dodecyl group, an octadecyl group, an isopropyl group, an isobutyl group, a sec-butyl group, a tert-butyl group, a 1-ethylpentyl group, a cyclopentyl group, a cyclohexyl group, a trifluoromethyl group, a 2-ethylhexyl group, a phenacyl group, a 1-naphthoylmethyl group, a 2-naphthoylmethyl group, a 4-methylsulfanylphenacyl group, a 4-phenylsulfanylphenacyl group, a 4-dimethylaminophenacyl group, a 4-cyanophenacyl group, a 4-methylphenacyl group, a 2-methylphenacyl group, a 3-fluorophenacyl group, a 3-trifluoromethylphenacyl group, and a 3-nitrophenacyl group.

The substituted or unsubstituted aryl group is preferably an aryl group having 6 to 30 carbon atoms. Examples thereof include a phenyl group, a biphenyl group, a 1-naphthyl group, a 2-naphthyl group, a 9-anthryl group, a 9-phenanthryl group, a 1-pyrenyl group, a 5-naphthacenyl group, a 1-indenyl group, a 2-azulenyl group, a 9-fluorenyl group, a terphenyl group, a quarterphenyl group, an o-tolyl group, a m-tolyl group, a p-tolyl group, a xylyl group, an o-cumenyl group, a m-cumenyl group, a p-cumenyl group, a mesityl group, a pentalenyl group, a binaphthalenyl group, a ternaphthalenyl group, a quarternaphthalenyl group, a heptalenyl group, a biphenylenyl group, an indacenyl group, a fluoranthenyl group, an acenaphthylenyl group, an aceanthrylenyl group, a phenalenyl group, a fluorenyl group, an anthryl group, a bianthracenyl group, a teranthracenyl group, a quarteranthracenyl group, an anthraquinonyl group, a phenanthryl group, a triphenylenyl group, a pyrenyl group, a chrysenyl group, a naphthacenyl group, a pleiadenyl group, a picenyl group, a perylenyl group, a pentaphenyl group, a pentacenyl group, a tetraphenylenyl group, a hexaphenyl group, a hexacenyl group, a rubicenyl group, a coronenyl group, a trinaphthylenyl group, a heptaphenyl group, a heptacenyl group, a pyranthrenyl group, and an ovalenyl group.

The substituted or unsubstituted alkenyl group is preferably an alkenyl group having 2 to 10 carbon atoms, and examples thereof include a vinyl group, an allyl group and a styryl group.

The substituted or unsubstituted alkynyl group is preferably an alkynyl group having 2 to 10 carbon atoms, and examples thereof include an ethynyl group, a propynyl group and a propargyl group.

The substituted or unsubstituted alkylsulfinyl group is preferably an alkylsulfinyl group having 1 to 20 carbon atoms, and examples thereof include a methylsulfinyl group, an ethylsulfinyl group, a propylsulfinyl group, an isopropylsulfinyl group, a butylsulfinyl group, a hexylsulfinyl group, a cyclohexylsulfinyl group, an octylsulfinyl group, a 2-ethylhexylsulfinyl group, a decanoylsulfinyl group, a dodecanoylsulfinyl group, an octadecanoylsulfinyl group, a cyanomethylsulfinyl group, and a methoxymethylsulfinyl group.

The substituted or unsubstituted arylsulfinyl group is preferably an arylsulfinyl group having 6 to 30 carbon atoms, and examples thereof include a phenylsulfinyl group, a 1-naphthylsulfinyl group, a 2-naphthylsulfinyl group, a 2-chlorophenylsulfinyl group, a 2-methylphenylsulfinyl group, a 2-methoxyphenylsulfinyl group, a 2-butoxyphenylsulfinyl group, a 3-chlorophenylsulfinyl group, a 3-trifluoromethylphenylsulfinyl group, a 3-cyanophenylsulfinyl group, a 3-nitrophenylsulfinyl group, a 4-fluorophenylsulfinyl group, a 4-cyanophenylsulfinyl group, a 4-methoxyphenylsulfinyl group, a 4-methylsulfanylphenylsulfinyl group, a 4-phenylsulfanylphenylsulfinyl group, and a 4-dimethylaminophenylsulfinyl group.

The substituted or unsubstituted alkylsulfonyl group is preferably an alkylsulfonyl group having 1 to 20 carbon atoms, and examples thereof include a methylsulfonyl group, an ethylsulfonyl group, a propylsulfonyl group, an isopropylsulfonyl group, a butylsulfonyl group, a hexylsulfonyl group, a cyclohexylsulfonyl group, an octylsulfonyl group, a 2-ethylhexylsulfonyl group, a decanoylsulfonyl group, a dodecanoylsulfonyl group, an octadecanoylsulfonyl group, a cyanomethylsulfonyl group, a methoxymethylsulfonyl group, and a perfluoroalkylsulfonyl group.

The substituted or unsubstituted arylsulfonyl group is preferably an arylsulfonyl group having 6 to 30 carbon atoms, and examples thereof include a phenylsulfonyl group, a 1-naphthylsulfonyl group, a 2-naphthylsulfonyl group, a 2-chlorophenylsulfonyl group, a 2-methylphenylsulfonyl group, a 2-methoxyphenylsulfonyl group, a 2-butoxyphenylsulfonyl group, a 3-chlorophenylsulfonyl group, a 3-trifluoromethylphenylsulfonyl group, a 3-cyanophenylsulfonyl group, a 3-nitrophenylsulfonyl group, a 4-fluorophenylsulfonyl group, a 4-cyanophenylsulfonyl group, a 4-methoxyphenylsulfonyl group, a 4-methylsulfanylphenylsulfonyl group, a 4-phenylsulfanylphenylsulfonyl group, and a 4-dimethylaminophenylsulfonyl group.

The substituted or unsubstituted acyl group is preferably an acyl group having 2 to 20 carbon atoms, and examples thereof include an acetyl group, a propanoyl group, a butanoyl group, a trifluoromethylcarbonyl group, a pentanoyl group, a benzoyl group, a 1-naphthoyl group, a 2-naphthoyl group, a 4-methylsulfanylbenzoyl group, a 4-phenylsulfanylbenzoyl group, a 4-dimethylaminobenzoyl group, a 4-diethylaminobenzoyl group, a 2-chlorobenzoyl group, a 2-methylbenzoyl group, a 2-methoxybenzoyl group, a 2-butoxybenzoyl group, a 3-chlorobenzoyl group, a 3-trifluoromethylbenzoyl group, a 3-cyanobenzoyl group, a 3-nitrobenzoyl group, a 4-fluorobenzoyl group, a 4-cyanobenzoyl group, and a 4-methoxybenzoyl group.

The substituted or unsubstituted alkoxycarbonyl group is preferably an alkoxycarbonyl group having 2 to 20 carbon atoms, and examples thereof include a methoxycarbonyl group, an ethoxycarbonyl group, a propoxycarbonyl group, a butoxycarbonyl group, a hexyloxycarbonyl group, an octyloxycarbonyl group, a decyloxycarbonyl group, an octadecyloxycarbonyl group, and a trifluoromethyloxycarbonyl group.

Examples of the substituted or unsubstituted aryloxycarbonyl group include a phenoxycarbonyl group, a 1-naphthyloxycarbonyl group, a 2-naphthyloxycarbonyl group, a 4-methylsulfanylphenyloxycarbonyl group, a 4-phenylsulfanylphenyloxycarbonyl group, a 4-dimethylaminophenyloxycarbonyl group, a 4-diethylaminophenyloxycarbonyl group, a 2-chlorophenyloxycarbonyl group, a 2-methylphenyloxycarbonyl group, a 2-methoxyphenyloxycarbonyl group, a 2-butoxyphenyloxycarbonyl group, a 3-chlorophenyloxycarbonyl group, a 3-trifluoromethylphenyloxycarbonyl group, a 3-cyanophenyloxycarbonyl group, a 3-nitrophenyloxycarbonyl group, a 4-fluorophenyloxycarbonyl group, a 4-cyanophenyloxycarbonyl group, and a 4-methoxyphenyloxycarbonyl group.

The substituted or unsubstituted phosphinoyl group is preferably a phosphinoyl group having 2 to 50 carbon atoms in total, and examples thereof include a dimethylphosphinoyl group, a diethylphosphinoyl group, a dipropylphosphinoyl group, a diphenylphosphinoyl group, a dimethoxyphosphinoyl group, a diethoxyphosphinoyl group, a dibenzoylphosphinoyl group, and a bis(2,4,6-trimethylphenyl)phosphinoyl group.

The substituted or unsubstituted heterocyclic group is preferably an aromatic or aliphatic heterocyclic group containing at least one heteroatom selected from nitrogen, oxygen, sulfur, and phosphorus atoms. Examples thereof include a thienyl group, a benzo[b]thienyl group, a naphtho[2,3-b]thienyl group, a thianthrenyl group, a furyl group, a pyranyl group, an isobenzofuranyl group, a chromenyl group, a xanthenyl group, a phenoxathiinyl group, a 2H-pyrrolyl group, a pyrrolyl group, an imidazolyl group, a pyrazolyl group, a pyridyl group, a pyrazinyl group, a pyrimidinyl group, a pyridazinyl group, an indolizinyl group, an isoindolyl group, a 3H-indolyl group, an indolyl group, a 1H-indazolyl group, a purinyl group, a 4H-quinolizinyl group, an isoquinolyl group, a quinolyl group, a phthalazinyl group, a naphthyridinyl group, a quinoxalinyl group, a quinazolinyl group, a cinnolinyl group, a pteridinyl group, a 4aH-carbazolyl group, a carbazolyl group, a β-carbolinyl group, a phenanthridinyl group, an acrindinyl group, a perimidinyl group, a phenanthrolinyl group, a phenazinyl group, a phenarsazinyl group, an isothiazolyl group, a phenothiazinyl group, an isoxazolyl group, a furazanyl group, a phenoxazinyl group, an isochromanyl group, a chromanyl group, a pyrrolidinyl group, a pyrrolinyl group, an imidazolidinyl group, an imidazolinyl group, a pyrazolidinyl group, a pyrazolinyl group, a piperidyl group, a piperazinyl group, an indolinyl group, an isoindolinyl group, a quinuclidinyl group, a morpholinyl group, and a thioxanthonyl group.

Examples of the substituted or unsubstituted alkylthiocarbonyl group include a methylthiocarbonyl group, a propylthiocarbonyl group, a butylthiocarbonyl group, a hexylthiocarbonyl group, an octylthiocarbonyl group, a decylthiocarbonyl group, an octadecylthiocarbonyl group, and a trifluoromethylthiocarbonyl group.

Examples of the substituted or unsubstituted arylthiocarbonyl group include a 1-naphthylthiocarbonyl group, a 2-naphthylthiocarbonyl group, a 4-methylsulfanylphenylthiocarbonyl group, a 4-phenylsulfanylphenylthiocarbonyl group, a 4-dimethylaminophenylthiocarbonyl group, a 4-diethylaminophenylthiocarbonyl group, a 2-chlorophenylthiocarbonyl group, a 2-methylphenylthiocarbonyl group, a 2-methoxyphenylhiocarbonyl group, a 2-butoxyphenylthiocarbonyl group, a 3-chlorophenylthiocarbonyl group, a 3-trifluoromethylphenylthiocarbonyl group, a 3-cyanophenylthiocarbonyl group, a 3-nitrophenylthiocarbonyl group, a 4-fluorophenylthiocarbonyl group, a 4-cyanophenylthiocarbonyl group, and a 4-methoxyphenylthiocarbonyl group.

Examples of the substituted or unsubstituted dialkylaminocarbonyl group include a dimethylaminocarbonyl group, a diethylaminocarbonyl group, a dipropylaminocarbonyl group, and a dibutylaminocarbonyl group.

Examples of the substituted or unsubstituted dialkylaminothiocarbonyl group include a dimethylaminothiocarbonyl group, a dipropylaminothiocarbonyl group, and a dibutylaminothiocarbonyl group.

Among these, from the viewpoint of increasing the sensitivity, the acyl group is more preferable as the monovalent organic group represented by R. Specifically, an acetyl group, a propionyl group, a benzoyl, and a toluoyl group are preferable.

Examples of the monovalent substituent represented by B include a substituted or unsubstituted aryl group, a substituted or unsubstituted heterocyclic group, a substituted or unsubstituted arylcarbonyl group, and a substituted or unsubstituted heterocyclic carbonyl group. Among these, more preferred is the one having the following chemical structure.

Y, X and n in the following chemical structure respectively have the same definitions as those of Y, X and n in Formula (2), which will be explained below, and preferred examples thereof are also the same.

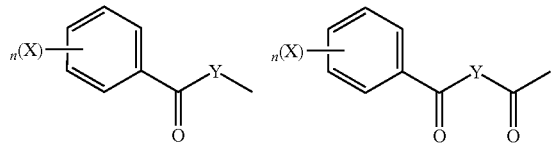

Examples of the divalent organic group represented by A include a substituted or unsubstituted alkylene group having 1 to 12 carbon atoms, a substituted or unsubstituted cyclohexylene group and a substituted or unsubstituted alkynylene group.

Examples of a substituent which may be introduced to these groups include a halogen group such as a fluorine atom, a chlorine atom, a bromine atom or an iodine atom, an alkoxy group such as a methoxy group, an ethoxy group or a tert-butoxy group, an aryloxy group such as a phenoxy group or a p-tolyloxy group, an alkoxycarbonyl group such as a methoxycarbonyl group, a butoxycarbonyl group or a phenoxycarbonyl group, an acyloxy group such as an acetoxy group, a propionyloxy group or a benzoyloxy group, an acyl group such as an acetyl group, a benzoyl group, an isobutyryl group, an acryloyl group, a methacryloyl group or a methoxalyl group, an alkylsulfanyl group such as a methylsulfanyl group or a tert-butylsulfanyl group, an arylsulfanyl group such as a phenylsulfanyl group or a p-tolylsulfanyl group, an alkylamino group such as a methylamino group or a cyclohexylamino group, a dialkylamino group such as a dimethylamino group, a diethylamino group, a morpholino group or a piperidino group, an arylamino group such as a phenylamino group or a p-tolylamino group, an alkyl group such as a methyl group, an ethyl group, a tert-butyl group or a dodecyl group, and an aryl group such as a phenyl group, a p-tolyl group, a xylyl group, a cumenyl group, a naphthyl group, an anthryl group or a phenanthryl group. Additional examples thereof include a hydroxy group, a carboxyl group, a formyl group, a mercapto group, a sulfo group, a mesyl group, a p-toluene sulfonyl group, an amino group, a nitro group, a cyano group, a trifluoromethyl group, a trichloromethyl group, a trimethylsilyl group, a phosphinico group, a phosphono group, a trimethylammoniumyl group, a dimethylsulfoniumyl group and a triphenylphenacyl phosphoniumyl group.

Among these, for improving sensitivity and inhibiting coloration by heating over time, an unsubstituted alkylene group, an alkylene group substituted by an alkyl group (e.g., methyl group, ethyl group, tert-butyl group, dodecyl group), an alkylene group substituted by an alkenyl group (e.g., vinyl group, allyl group), and an alkylene group substituted by an aryl group (e.g., phenyl group, p-tolyl group, xylyl group, cumenyl group, naphthyl group, anthryl group, phenanthryl group, styryl group) are preferred as group A.

The aryl group represented by Ar is preferably an aryl group having 6 to 30 carbon atoms. The aryl group may have a substituent.

Specific examples thereof include a phenyl group, a biphenyl group, a 1-naphthyl group, a 2-naphthyl group, a 9-anthryl group, a 9-phenanthryl group, a 1-pyrenyl group, a 5-naphthacenyl group, a 1-indenyl group, a 2-azulenyl group, a 9-fluorenyl group, a terphenyl group, a quaterphenyl group, an o-tolyl group, a m-tolyl group, a p-tolyl group, a xylyl group, an o-cumenyl group, a m-cumenyl group, a p-cumenyl group, a mesityl group, a pentalenyl group, a binaphthalenyl group, a ternaphthalenyl group, a quaternaphthalenyl group, a heptalenyl group, a biphenylenyl group, an indacenyl group, a fluoranthenyl group, an acenaphthylenyl group, an aceanthrylenyl group, a phenalenyl group, a fluorenyl group, an anthryl group, a bianthracenyl group, a teranthracenyl group, a quateranthracenyl group, an anthraquinolyl group, a phenanthryl group, a triphenylenyl group, a pyrenyl group, a chrysenyl group, a naphthacenyl group, a pleiadenyl group, a picenyl group, a perylenyl group, a pentaphenyl group, a pentacenyl group, a tetraphenylenyl group, a hexaphenyl group, a hexacenyl group, a rubicenyl group, a coronenyl group, a trinaphthylenyl group, a heptaphenyl group, a heptacenyl group, a pyranthrenyl group and an ovalenyl group. Among these, for improving sensitivity and inhibiting coloration by heating over time, a substituted or unsubstituted phenyl group is preferable.

Examples of the substituent of the substituted phenyl group include a halogen group such as a fluorine, chlorine, bromine, or iodine atom; an alkoxy group such as a methoxy group, an ethoxy group, or a tert-butoxy group; an aryloxy group such as a phenoxy group or a p-tolyloxy group; an alkylthioxy group such as a methylthioxy group, an ethylthioxy group or a tert-butylthioxy group; an arylthioxy group such as a phenylthioxy group or a p-tolylthioxy group; an alkoxycarbonyl group such as a methoxycarbonyl group, a butoxycarbonyl group or a phenoxycarbonyl group; an acyloxy group such as an acetoxy group, a propionyloxy group or a benzoyloxy group; an acyl group such as an acetyl group, a benzoyl group, an isobutyryl group, an acryloyl group, a methacryloyl group, or a methoxalyl group; an alkylsulfanyl group such as a methylsulfanyl group or a tert-butylsulfanyl group; an arylsulfanyl group such as a phenylsulfanyl group or a p-tolylsulfanyl group; an alkylamino group such as a methylamino group or a cyclohexylamino group; a dialkylamino group such as a dimethylamino group, a diethylamino group, a morpholino group, or a piperidino group; an arylamino group such as a phenylamino group or a p-tolylamino group; an alkyl group such as an ethyl group, a tert-butyl group or a dodecyl group; a hydroxyl group, a carboxyl group, a formyl group, a mercapto group, a sulfo group, a mesyl group, a p-toluenesulfonyl group, an amino group, a nitro group, a cyano group, a trifluoromethy group, a trichloromethyl group, a trimethylsilyl group, a phosphinico group, a phosphono group, a trimethylammoniumyl group, a dimethylsulfoniumyl group, or a triphenylphenacylphosphoniumyl group.

In Formula (1), the SAr structure composed of the substituent Ar and the adjacent S is preferably any of the structures shown below, in view of sensitivity.

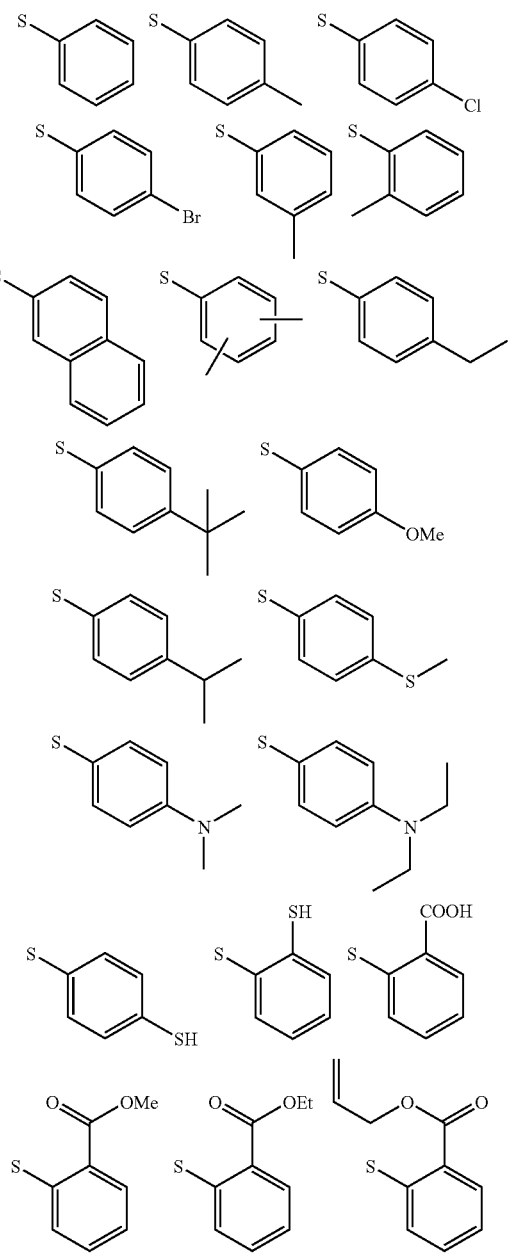

The novel oxime compound of the invention is preferably a compound that is represented by the following Formula (2) to obtain an appropriate rectangularity of a produced pattern or the like.

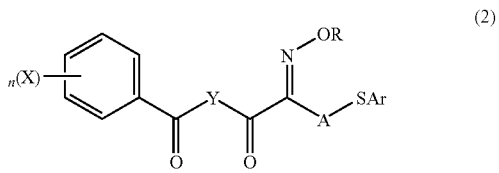

In Formula (2), R and X each independently represent a monovalent substituent, A and Y each independently represent a divalent organic group, Ar represents an aryl group, and n represents an integer of 0 to 5. Plural Xs may be the same as or different from each other.

In Formula (2), R, A and Ar respectively have the same definitions as those of R, A and Ar in Formula (1), and preferred examples are also the same.

Examples of the monovalent substituent represented by X include a substituted or unsubstituted alkyl group, a substituted or unsubstituted aryl group, a substituted or unsubstituted alkenyl group, a substituted or unsubstituted alkynyl group, a substituted or unsubstituted alkoxy group, a substituted or unsubstituted aryloxy group, a substituted or unsubstituted alkylthioxy group, a substituted or unsubstituted arylthioxy group, a substituted or unsubstituted acyloxy group, a substituted or unsubstituted alkylsulfanyl group, a substituted or unsubstituted arylsulfanyl group, a substituted or unsubstituted alkylsulfinyl group, a substituted or unsubstituted arylsulfinyl group, a substituted or unsubstituted alkylsulfonyl group, a substituted or unsubstituted arylsulfonyl group, a substituted or unsubstituted acyl group, a substituted or unsubstituted alkoxycarbonyl group, a substituted or unsubstituted carbamoyl group, a substituted or unsubstituted sulfamoyl group, a substituted or unsubstituted amino group, a substituted or unsubstituted phosphinoyl group, a substituted or unsubstituted heterocyclic group, and a halogen group.

The substituted or unsubstituted alkyl group is preferably an alkyl group having 1 to 30 carbon atoms, and examples thereof include a methyl group, an ethyl group, a propyl group, a butyl group, a hexyl group, an octyl group, a decyl group, a dodecyl group, an octadecyl group, an isopropyl group, an isobutyl group, a sec-butyl group, a tert-butyl group, a 1-ethylpentyl group, a cyclopentyl group, a cyclohexyl group, a trifluoromethyl group, a 2-ethylhexyl group, a phenacyl group, a 1-naphthoylmethyl group, a 2-naphthoylmethyl group, a 4-methylsulfanylphenacyl group, a 4-phenylsulfanylphenacyl group, a 4-dimethylaminophenacyl group, a 4-cyanophenacyl group, a 4-methylphenacyl group, a 2-methylphenacyl group, a 3-fluorophenacyl group, a 3-trifluoromethylphenacyl group, and a 3-nitrophenacyl group.

The substituted or unsubstituted aryl group is preferably an aryl group having 6 to 30 carbon atoms, and examples include a phenyl group, a biphenyl group, a 1-naphthyl group, a 2-naphthyl group, a 9-anthryl group, a 9-phenanthryl group, a 1-pyrenyl group, a 5-naphthacenyl group, a 1-indenyl group, a 2-azulenyl group, a 9-fluorenyl group, a terphenyl group, a quarterphenyl group, an o-tolyl group, a m-tolyl group, a p-tolyl group, a xylyl group, an o-cumenyl group, a m-cumenyl group, a p-cumenyl group, a mesityl group, a pentalenyl group, a binaphthalenyl group, a ternaphthalenyl group, a quarternaphthalenyl group, a heptalenyl group, a biphenylenyl group, an indacenyl group, a fluoranthenyl group, an acenaphthylenyl group, an aceanthrylenyl group, a phenalenyl group, a fluorenyl group, an anthryl group, a bianthracenyl group, a teranthracenyl group, a quarteranthracenyl group, an anthraquinonyl group, a phenanthryl group, a triphenylenyl group, a pyrenyl group, a chrysenyl group, a naphthacenyl group, a pleiadenyl group, a picenyl group, a perylenyl group, a pentaphenyl group, a pentacenyl group, a tetraphenylenyl group, a hexaphenyl group, a hexacenyl group, a rubicenyl group, a coronenyl group, a trinaphthylenyl group, a heptaphenyl group, a heptacenyl group, a pyranthrenyl group, and an ovalenyl group.

The substituted or unsubstituted alkenyl group is preferably an alkenyl group having 2 to 10 carbon atoms, and examples include a vinyl group, an allyl group and a styryl group.

The substituted or unsubstituted alkynyl group is preferably an alkynyl group having 2 to 10 carbon atoms, and examples include an ethynyl group, a propynyl group and a propargyl group.

The substituted or unsubstituted alkoxy group is preferably an alkoxy group having 1 to 30 carbon atoms, and examples include a methoxy group, an ethoxy group, a propyloxy group, an isopropyloxy group, a butoxy group, an isobutoxy group, a sec-butoxy group, a tert-butoxy group, a pentyloxy group, an isopentyloxy group, a hexyloxy group, a heptyloxy group, an octyloxy group, a 2-ethylhexyloxy group, a decyloxy group, a dodecyloxy group, an octadecyloxy group, an ethoxycarbonylmethyl group, a 2-ethylhexyloxycarbonylmethyloxy group, an aminocarbonylmethyloxy group, an N,N-dibutylaminocarbonylmethyloxy group, an N-methylaminocarbonylmethyloxy group, an N-ethylaminocarbonylmethyloxy group, an N-octylaminocarbonylmethyloxy group, an N-methyl-N-benzylaminocarbonylmethyloxy group, a benzyloxy group, and a cyanomethyloxy group.

The substituted or unsubstituted aryloxy group is preferably an aryloxy group having 6 to 30 carbon atoms, and examples include a phenyloxy group, a 1-naphthyloxy group, a 2-naphthyloxy group, a 2-chlorophenyloxy group, a 2-methylphenyloxy group, a 2-methoxyphenyloxy group, a 2-butoxyphenyloxy group, a 3-chlorophenyloxy group, a 3-trifluoromethylphenyloxy group, a 3-cyanophenyloxy group, a 3-nitrophenyloxy group, a 4-fluorophenyloxy group, a 4-cyanophenyloxy group, a 4-methoxyphenyloxy group, a 4-dimethylaminophenyloxy group, a 4-methylsulfanylphenyloxy group, and a 4-phenylsulfanylphenyloxy group.

The substituted or unsubstituted alkylthioxy group is preferably a thioalkoxy group having 1 to 30 carbon atoms, and examples include a methylthioxy group, an ethylthioxy group, a propylthioxy group, an isopropylthioxy group, a butylthioxy group, an isobutylthioxy group, a sec-butylthioxy group, a tert-butylthioxy group, a pentylthioxy group, an isopentylthioxy group, a hexylthioxy group, a heptylthioxy group, an octylthioxy group, a 2-ethylhexylthioxy group, a decylthioxy group, a dodecylthioxy group, an octadecylthioxy group, and a benzylthioxy group.

The substituted or unsubstituted arylthioxy group is preferably an arylthioxy group having 6 to 30 carbon atoms, and examples include a phenylthioxy group, a 1-naphthylthioxy group, a 2-naphthylthioxy group, a 2-chlorophenylthioxy group, a 2-methylphenylthioxy group, a 2-methoxyphenylthioxy group, a 2-butoxyphenylthioxy group, a 3-chlorophenylthioxy group, a 3-trifluoromethylphenylthioxy group, a 3-cyanophenylthioxy group, a 3-nitrophenylthioxy group, a 4-fluorophenylthioxy group, a 4-cyanophenylthioxy group, a 4-methoxyphenylthioxy group, a 4-dimethylaminophenylthioxy group, a 4-methylsulfanylphenylthioxy group, and a 4-phenylsulfanylphenylthioxy group.

The substituted or unsubstituted acyloxy group is preferably an acyloxy group having 2 to 20 carbon atoms, and examples include an acetyloxy group, a propanoyloxy group, a butanoyloxy group, a pentanoyloxy group, a trifluoromethylcarbonyloxy group, a benzoyloxy group, a 1-naphthylcarbonyloxy group, and a 2-naphthylcarbonyloxy group.

The substituted or unsubstituted alkylsulfanyl group is preferably an alkylsulfanyl group having 1 to 20 carbon atoms, and examples include a methylsulfanyl group, an ethylsulfanyl group, a propylsulfanyl group, an isopropylsulfanyl group, a butylsulfanyl group, a hexylsulfanyl group, a cyclohexylsulfanyl group, an octylsulfanyl group, a 2-ethylhexylsulfanyl group, a decanoylsulfanyl group, a dodecanoylsulfanyl group, an octadecanoylsulfanyl group, a cyanomethylsulfanyl group, and a methoxymethylsulfanyl group.

The substituted or unsubstituted arylsulfanyl group is preferably an arylsulfanyl group having 6 to 30 carbon atoms, and examples include a phenylsulfanyl group, a 1-naphthylsulfanyl group, a 2-naphthylsulfanyl group, a 2-chlorophenylsulfanyl group, a 2-methylphenylsulfanyl group, a 2-methoxyphenylsulfanyl group, a 2-butoxyphenylsulfanyl group, a 3-chlorophenylsulfanyl group, a 3-trifluoromethylphenylsulfanyl group, a 3-cyanophenylsulfanyl group, a 3-nitrophenylsulfanyl group, a 4-fluorophenylsulfanyl group, a 4-cyanophenylsulfanyl group, a 4-methoxyphenylsulfanyl group, a 4-methylsulfanylphenylsulfanyl group, a 4-phenylsulfanylphenylsulfanyl group, and a 4-dimethylaminophenylsulfanyl group.

The substituted or unsubstituted alkylsulfinyl group is preferably an alkylsulfinyl group having 1 to 20 carbon atoms, and examples include a methylsulfinyl group, an ethylsulfinyl group, a propylsulfinyl group, an isopropylsulfinyl group, a butylsulfinyl group, a hexylsulfinyl group, a cyclohexylsulfinyl group, an octylsulfinyl group, a 2-ethylhexylsulfinyl group, a decanoylsulfinyl group, a dodecanoylsulfinyl group, an octadecanoylsulfinyl group, a cyanomethylsulfinyl group, and a methoxymethylsulfinyl group.

The substituted or unsubstituted arylsulfinyl group is preferably an arylsulfinyl group having 6 to 30 carbon atoms, and examples include a phenylsulfinyl group, a 1-naphthylsulfinyl group, a 2-naphthylsulfinyl group, a 2-chlorophenylsulfinyl group, a 2-methylphenylsulfinyl group, a 2-methoxyphenylsulfinyl group, a 2-butoxyphenylsulfinyl group, a 3-chlorophenylsulfinyl group, a 3-trifluoromethylphenylsulfinyl group, a 3-cyanophenylsulfinyl group, a 3-nitrophenylsulfinyl group, a 4-fluorophenylsulfinyl group, a 4-cyanophenylsulfinyl group, a 4-methoxyphenylsulfinyl group, a 4-methylsulfanylphenylsulfinyl group, a 4-phenylsulfanylphenylsulfinyl group, and a 4-dimethylaminophenylsulfinyl group.

The substituted or unsubstituted alkylsulfonyl group is preferably an alkylsulfonyl group having 1 to 20 carbon atoms, and examples include a methylsulfonyl group, an ethylsulfonyl group, a propylsulfonyl group, an isopropylsulfonyl group, a butylsulfonyl group, a hexylsulfonyl group, a cyclohexylsulfonyl group, an octylsulfonyl group, a 2-ethylhexylsulfonyl group, a decanoylsulfonyl group, a dodecanoylsulfonyl group, an octadecanoylsulfonyl group, a cyanomethylsulfonyl group, and a methoxymethylsulfonyl group.

The substituted or unsubstituted arylsulfonyl group is preferably an arylsulfonyl group having 6 to 30 carbon atoms, and examples include a phenylsulfonyl group, a 1-naphthylsulfonyl group, a 2-naphthylsulfonyl group, a 2-chlorophenylsulfonyl group, a 2-methylphenylsulfonyl group, a 2-methoxyphenylsulfonyl group, a 2-butoxyphenylsulfonyl group, a 3-chlorophenylsulfonyl group, a 3-trifluoromethylphenylsulfonyl group, a 3-cyanophenylsulfonyl group, a 3-nitrophenylsulfonyl group, a 4-fluorophenylsulfonyl group, a 4-cyanophenylsulfonyl group, a 4-methoxyphenylsulfonyl group, a 4-methylsulfanylphenylsulfonyl group, a 4-phenylsulfanylphenylsulfonyl group, and a 4-dimethylaminophenylsulfonyl group.

The substituted or unsubstituted acyl group is preferably an acyl group having 2 to 20 carbon atoms, and examples include an acetyl group, a propanoyl group, a butanoyl group, a trifluoromethylcarbonyl group, a pentanoyl group, a benzoyl group, a 1-naphthoyl group, a 2-naphthoyl group, a 4-methylsulfanylbenzoyl group, a 4-phenylsulfanylbenzoyl group, a 4-dimethylaminobenzoyl group, a 4-diethylaminobenzoyl group, a 2-chlorobenzoyl group, a 2-methylbenzoyl group, a 2-methoxybenzoyl group, a 2-butoxybenzoyl group, a 3-chlorobenzoyl group, a 3-trifluoromethylbenzoyl group, a 3-cyanobenzoyl group, a 3-nitrobenzoyl group, a 4-fluorobenzoyl group, a 4-cyanobenzoyl group, and a 4-methoxybenzoyl group.

The substituted or unsubstituted alkoxycarbonyl group is preferably an alkoxycarbonyl group having 2 to 20 carbon atoms, and examples thereof include a methoxycarbonyl group, an ethoxycarbonyl group, a propoxycarbonyl group, a butoxycarbonyl group, a hexyloxycarbonyl group, an octyloxycarbonyl group, a decyloxycarbonyl group, an octadecyloxycarbonyl group, a phenoxycarbonyl group, a trifluoromethyloxycarbonyl group, a 1-naphthyloxycarbonyl group, a 2-naphthyloxycarbonyl group, a 4-methylsulfanylphenyloxycarbonyl group, a 4-phenylsulfanylphenyloxycarbonyl group, a 4-dimethylaminophenyloxycarbonyl group, a 4-diethylaminophenyloxycarbonyl group, a 2-chlorophenyloxycarbonyl group, a 2-methylphenyloxycarbonyl group, a 2-methoxyphenyloxycarbonyl group, a 2-butoxyphenyloxycarbonyl group, a 3-chlorophenyloxycarbonyl group, a 3-trifluoromethylphenyloxycarbonyl group, a 3-cyanophenyloxycarbonyl group, a 3-nitrophenyloxycarbonyl group, a 4-fluorophenyloxycarbonyl group, a 4-cyanophenyloxycarbonyl group and a 4-methoxyphenyloxycarbonyl group.

The substituted or unsubstituted carbamoyl group is preferably a carbamoyl group having 1 to 30 carbon atoms in total, and examples include a N-methylcarbamoyl group, an N-ethylcarbamoyl group, an N-propylcarbamoyl group, an N-butylcarbamoyl group, an N-hexylcarbamoyl group, an N-cyclohexylcarbamoyl group, an N-octylcarbamoyl group, an N-decylcarbamoyl group, an N-octadecylcarbamoyl group, an N-phenylcarbamoyl group, an N-2-methylphenylcarbamoyl group, an N-2-chlorophenylcarbamoyl group, an N-2-isopropoxyphenylcarbamoyl group, an N-2-(2-ethylhexyl)phenylcarbamoyl group, an N-3-chlorophenylcarbamoyl group, an N-3-nitrophenylcarbamoyl group, an N-3-cyanophenylcarbamoyl group, an N-4-methoxyphenylcarbamoyl group, an N-4-cyanophenylcarbamoyl group, an N-4-methylsulfanylphenylcarbamoyl group, an N-4-phenylsulfanylphenylcarbamoyl group, an N-methyl-N-phenylcarbamoyl group, an N,N-dimethylcarbamoyl group, an N,N-dibutylcarbamoyl group, and an N,N-diphenylcarbamoyl group.

The substituted or unsubstituted sulfamoyl group is preferably a sulfamoyl group having 0 to 30 carbon atoms in total, and examples include a sulfamoyl group, an N-alkylsulfamoyl group, an N-arylsulfamoyl group, an N,N-dialkylsulfamoyl group, an N,N-diarylsulfamoyl group, and an N-alkyl-N-arylsulfamoyl group. More specifically, examples thereof include an N-methylsulfamoyl group, an N-ethylsulfamoyl group, an N-propylsulfamoyl group, an N-butylsulfamoyl group, an N-hexylsulfamoyl group, an N-cyclohexylsulfamoyl group, an N-octylsulfamoyl group, an N-2-ethylhexylsulfamoyl group, an N-decylsulfamoyl group, an N-octadecylsulfamoyl group, an N-phenylsulfamoyl group, an N-2-methylphenylsulfamoyl group, an N-2-chlorophenylsulfamoyl group, an N-2-methoxyphenylsulfamoyl group, an N-2-isopropoxyphenylsulfamoyl group, an N-3-chlorophenylsulfamoyl group, an N-3-nitrophenylsulfamoyl group, an N-3-cyanophenylsulfamoyl group, an N-4-methoxyphenylsulfamoyl group, an N-4-cyanophenylsulfamoyl group, an N-4-dimethylaminophenylsulfamoyl group, an N-4-methylsulfanylphenylsulfamoyl group, an N-4-phenylsulfanylphenylsulfamoyl group, an N-methyl-N-phenylsulfamoyl group, an N,N-dimethylsulfamoyl group, an N,N-dibutylsulfamoyl group, and an N,N-diphenylsulfamoyl group.

The substituted or unsubstituted amino group is preferably an amino group having 0 to 50 carbon atoms in total, and examples include —NH$_2$, an N-alkylamino group, an N-arylamino group, an N-acylamino group, an N-sulfonylamino group, an N,N-dialkylamino group, an N,N-diarylamino group, an N-alkyl-N-arylamino group, and an N,N-disulfonylamino group. More specifically, examples thereof include an N-methylamino group, an N-ethylamino group, an N-propylamino group, an N-isopropylamino group, an N-butylamino group, an N-tert-butylamino group, an N-hexylamino group, an N-cyclohexylamino group, an N-octylamino group, an N-2-ethylhexylamino group, an N-decylamino group, an N-octadecylamino group, an N-benzylamino group, an N-phenylamino group, an N-2-methylphenylamino group, an N-2-chlorophenylamino group, an N-2-methoxyphenylamino group, an N-2-isopropoxyphenylamino group, an N-2-(2-ethylhexyl)phenylamino group, an N-3-chlorophenylamino group, an N-3-nitrophenylamino group, an N-3-cyanophenylamino group, an N-3-trifluoromethylphenylamino group, an N-4-methoxyphenylamino group, an N-4-cyanophenylamino group, an N-4-trifluoromethylphenylamino group, an N-4-methylsulfanylphenylamino group, an N-4-phenylsulfanylphenylamino group, an N-4-dimethylaminophenylamino group, an N-methyl-N-phenylamino group, an N,N-dimethylamino group, an N,N-diethylamino group, an N,N-dibutylamino group, an N,N-diphenylamino group, an N,N-diacetylamino group, an N,N-dibenzoylamino group, an N,N-(dibutylcarbonyl)amino group, an N,N-(dimethylsulfonyl)amino group, an N,N-(diethylsulfonyl)amino group, an N,N-(dibutylsulfonyl)amino group, an N,N-(diphenylsulfonyl)amino group, a morpholino group, a 3,5-dimethylmorpholino group, and a carbazole group.

The substituted or unsubstituted phosphinoyl group is preferably a phosphinoyl group having 2 to 50 carbon atoms in total, and examples include a dimethylphosphinoyl group, a diethylphosphinoyl group, a dipropylphosphinoyl group, a diphenylphosphinoyl group, a dimethoxyphosphinoyl group, a diethoxyphosphinoyl group, a dibenzoylphosphinoyl group, and a bis(2,4,6-trimethylphenyl)phosphinoyl group.

The substituted or unsubstituted heterocyclic group is preferably an aromatic or aliphatic heterocyclic group which includes a nitrogen atom, an oxygen atom, a sulfur atom, or a phosphorous atom. Examples thereof include a thienyl group, a benzo[b]thienyl group, a naphtho[2,3-b]thienyl group, a thianthrenyl group, a furyl group, a pyranyl group, an isobenzofuranyl group, a chromenyl group, a xanthenyl group, a phenoxathiinyl group, a 2H-pyrrolyl group, a pyrrolyl group, an imidazolyl group, a pyrazolyl group, a pyridyl group, a pyrazinyl group, a pyrimidinyl group, a pyridazinyl group, an indolizinyl group, an isoindolyl group, a 3H-indolyl group, an indolyl group, a 1H-indazolyl group, a purinyl group, a 4H-quinolizinyl group, an isoquinolyl group, a quinolyl group, a phthalazinyl group, a naphthylidinyl group, a quinoxalinyl group, a quinazolinyl group, a cinnolynyl group, a pteridinyl group, a 4aH-carbazolyl group, a carbazolyl group, a β-carbolinyl group, a phenanthridinyl group, an acridinyl group, a perimidinyl group, a phenanthrolinyl group, a phenazinyl group, a phenarsazinyl group, an isothiazolyl group, a phenothiazinyl group, an isoxazolyl group, a furazanyl group, a phenoxazinyl group, an isochromanyl group, a chromanyl group, a pyrrolidinyl group, a pyrrolinyl group, an imidazolidinyl group, an imidazolinyl group, a pyrazolidinyl group, a pyrazolinyl group, a piperidyl group, a piperazinyl group, an indolinyl group, an isoindolinyl group, a quinuclidinyl group, a morpholinyl group and a thioxanthonyl group.

The halogen group may be a fluorine atom, a chlorine atom, a bromine atom, an iodine atom, or the like.

The substituted or unsubstituted alkyl group, substituted or unsubstituted aryl group, substituted or unsubstituted alkenyl group, substituted or unsubstituted alkynyl group, substituted or unsubstituted alkoxy group, substituted or unsubstituted aryloxy group, substituted or unsubstituted alkylthioxy group, substituted or unsubstituted arylthioxy group, substituted or unsubstituted acyloxy group, substituted or unsubstituted alkylsulfanyl group, substituted or unsubstituted arylsulfanyl group, substituted or unsubstituted alkylsulfinyl group, substituted or unsubstituted arylsulfinyl group, substituted or unsubstituted alkylsulfonyl group, substituted or unsubstituted arylsulfonyl group, substituted or unsubstituted acyl group, substituted or unsubstituted alkoxycarbonyl group, substituted or unsubstituted carbamoyl group, substituted or unsubstituted sulfamoyl group, substituted or unsubstituted amino group, or substituted or unsubstituted heterocyclic group may themselves be further substituted by any other substituent.

Examples of such a substituent include a halogen group such as a fluorine atom, a chlorine atom, a bromine atom or an iodine atom, an alkoxy group such as a methoxy group, an ethoxy group or a tert-butoxy group, an aryloxy group such as a phenoxy group or a p-tolyloxy group, an alkoxycarbonyl group such as a methoxycarbonyl group, a butoxycarbonyl group or a phenoxycarbonyl group, an acyloxy group such as an acetoxy group, a propionyloxy group or a benzoyloxy group, an acyl group such as an acetyl group, a benzoyl group, an isobutyryl group, an acryloyl group, a methacryloyl group or a methoxalyl group, an alkylsulfanyl group such as a methylsulfanyl group or a tert-butylsulfanyl group, an arylsulfanyl group such as a phenylsulfanyl group or a p-tolylsulfanyl group, an alkylamino group such as a methylamino group or a cyclohexylamino group, a dialkylamino group such as a dimethylamino group, a diethylamino group, a morpholino group or a piperidino group, an arylamino group such as a phenylamino group or a p-tolylamino group, an alkyl group such as a methyl group, an ethyl group, a tert-butyl group or a dodecyl group, and an aryl group such as a phenyl group, a p-tolyl group, a xylyl group, a cumenyl group, a naphthyl group, an anthryl group or a phenanthryl group. Additional examples includes a hydroxy group, a carboxyl group, a formyl group, a mercapto group, a sulfo group, a mesyl group, a p-toluene sulfonyl group, an amino group, a nitro group, a cyano group, a trifluoromethyl group, a trichloromethyl group, a trimethylsilyl group, a phosphinico group, a phosphono group, a trimethylammoniumyl group, a dimethylsulfoniumyl group and a triphenylphenacyl phosphoniumyl group.

Above all, X is preferably a substituted or unsubstituted alkyl group, a substituted or unsubstituted aryl group, a substituted or unsubstituted alkenyl group, a substituted or unsubstituted alkynyl group, a substituted or unsubstituted alkoxy group, a substituted or unsubstituted aryloxy group, a substituted or unsubstituted alkylthioxy group, a substituted or unsubstituted arylthioxy group, or a substituted or unsubstituted amino group, in terms of improving solubility in solvents and absorption efficiency in a long wavelength region.

In Formula (2), n represents an integer of 0 to 5, preferably of 0 to 2.

Examples of the divalent organic group represented by Y include the structures shown below. In the groups shown below, the marks* indicate the positions of the bonds to the carbon atoms adjacent to Y in Formula (2).

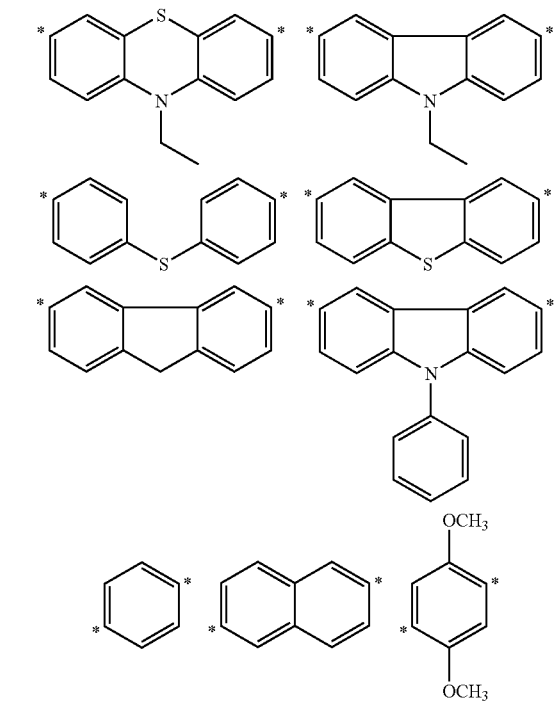

In terms of increasing sensitivity, the structures shown below are particularly preferred.

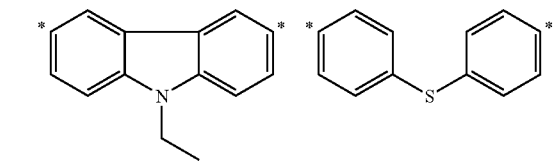

The novel oxime compound of the invention is preferably a compound that is represented by the following Formula (3) to obtain an appropriate rectangularity of a produced pattern or the like.

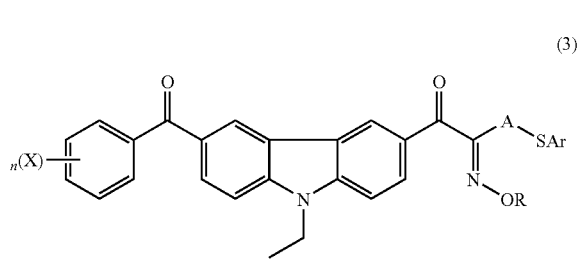

(3)

In Formula (3), R and X each independently represent a monovalent substituent; A represents a divalent organic group; Ar represents an aryl group; and n indicates an integer of 0 to 5. Plural Xs may be the same as or different from each other.

R, X, A, Ar and n in Formula (3) respectively have the same as those of R, X, A, Ar and n in Formula (2), and preferred examples thereof are also the same.

Hereinbelow, specific examples of the novel oxime compound of the invention will be described. However, the present invention is not limited to these compounds.

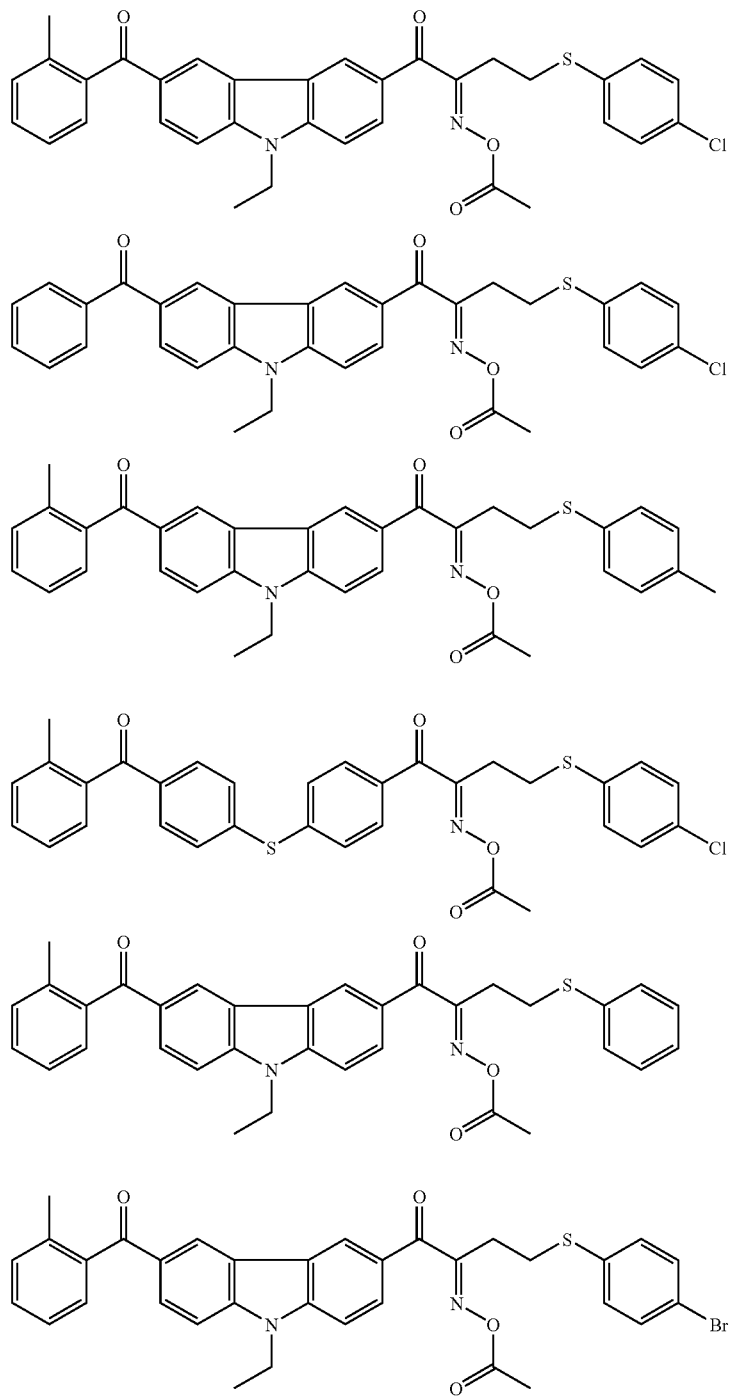

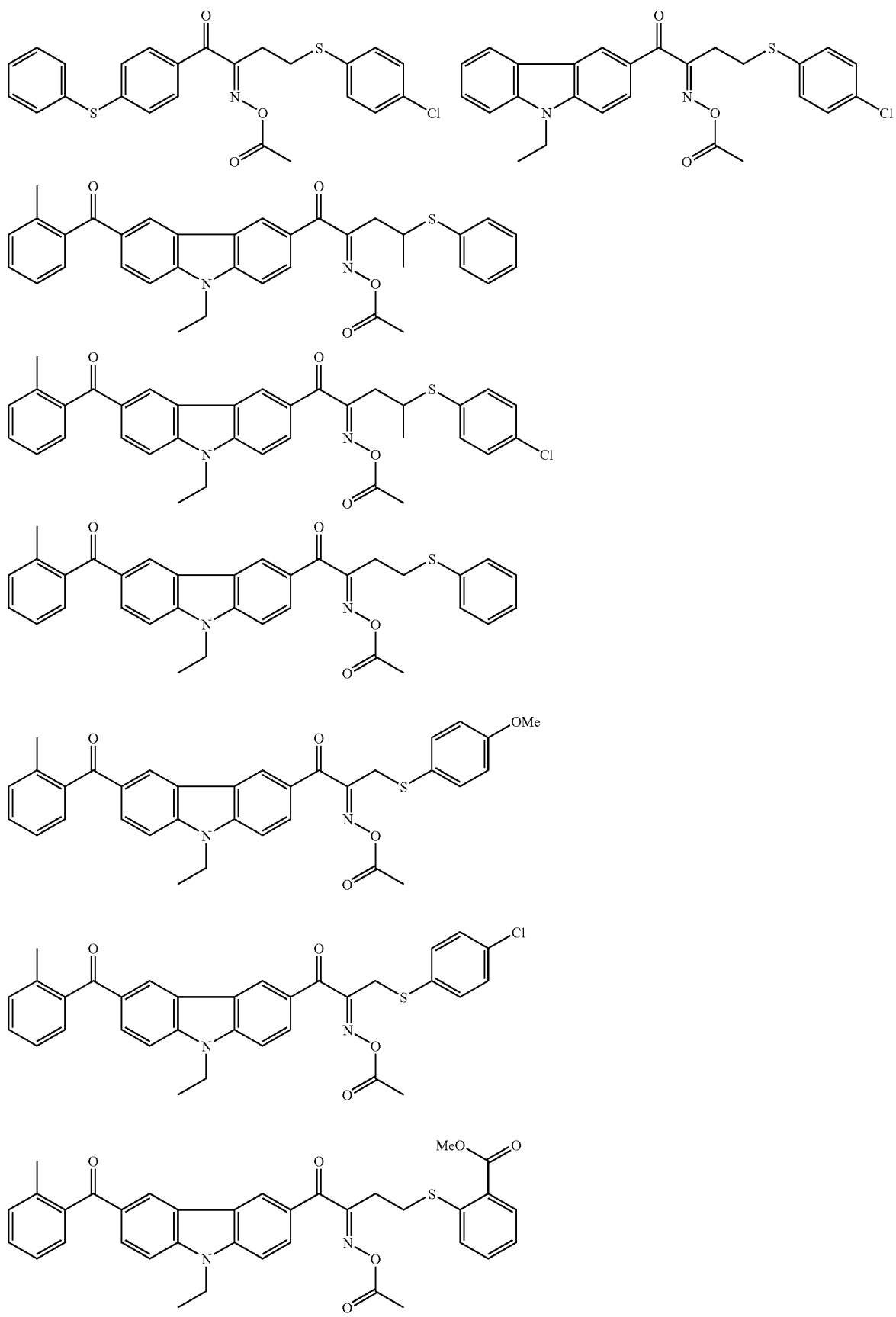

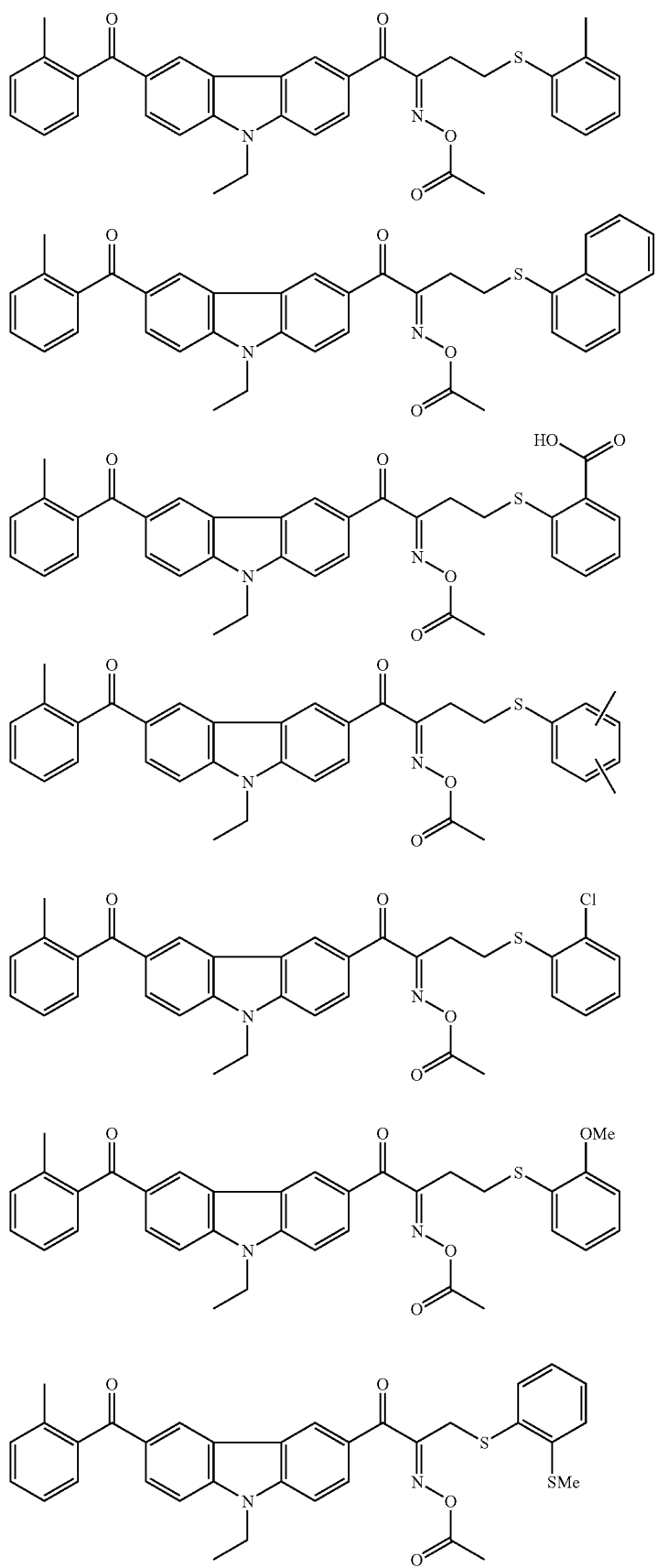

-continued
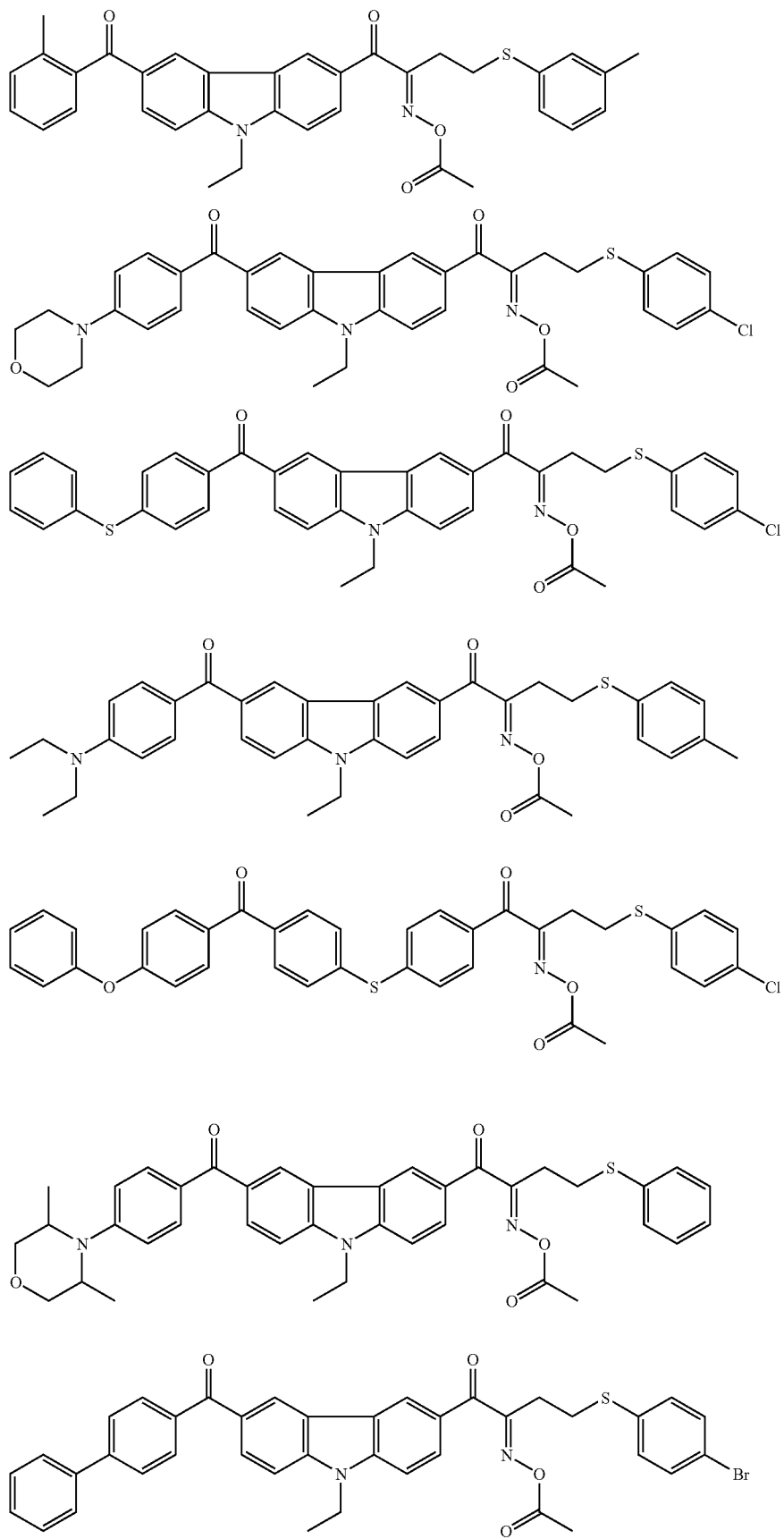

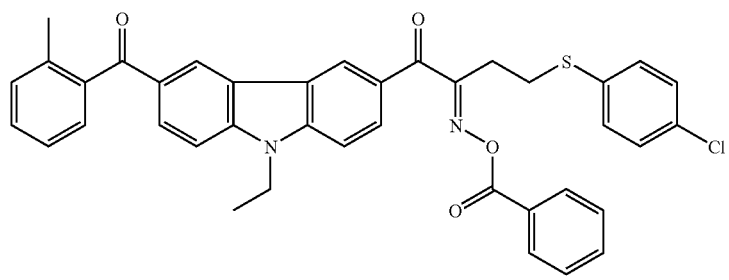
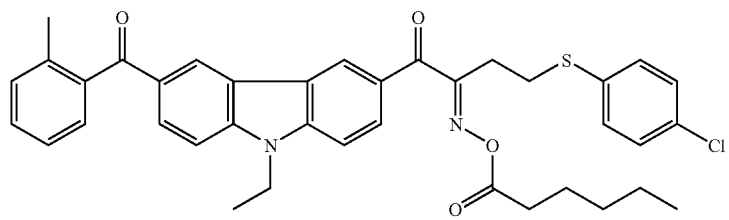
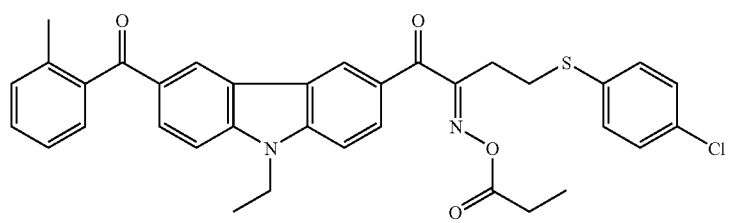
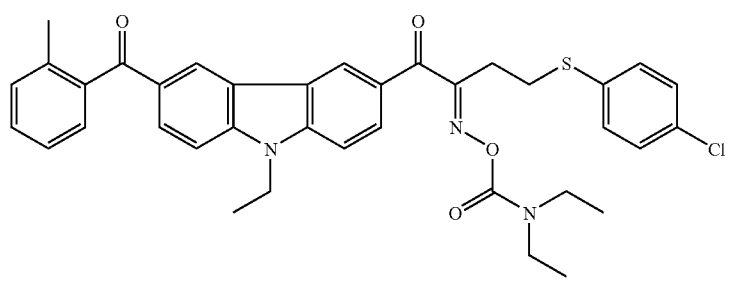
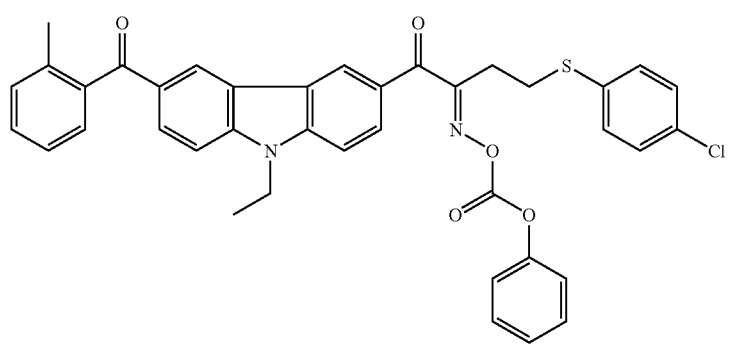
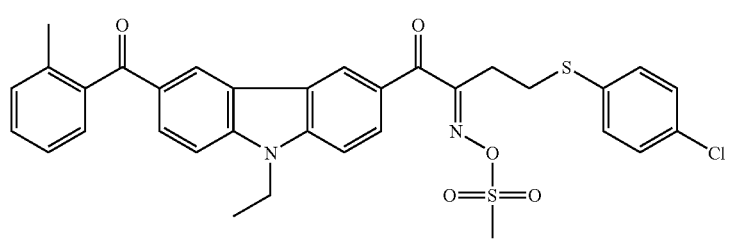

-continued
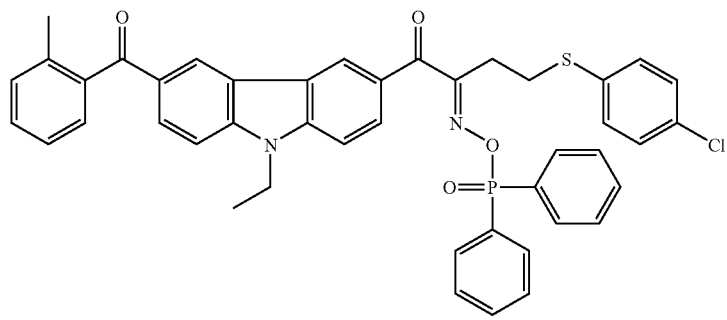
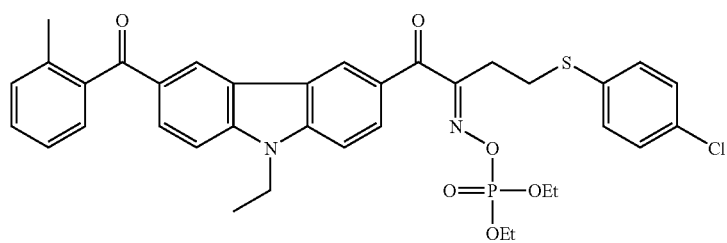
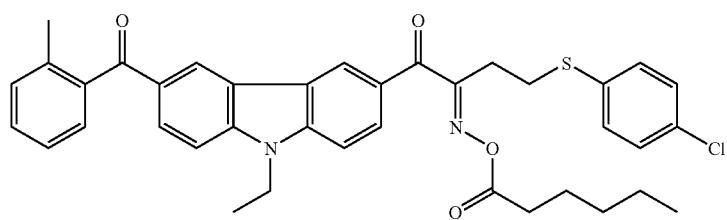
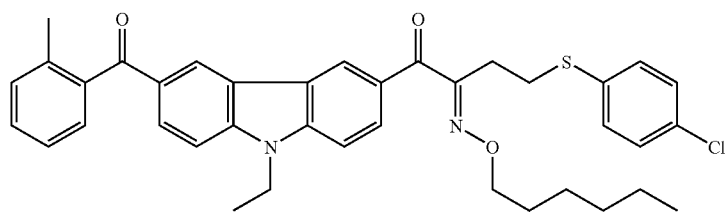
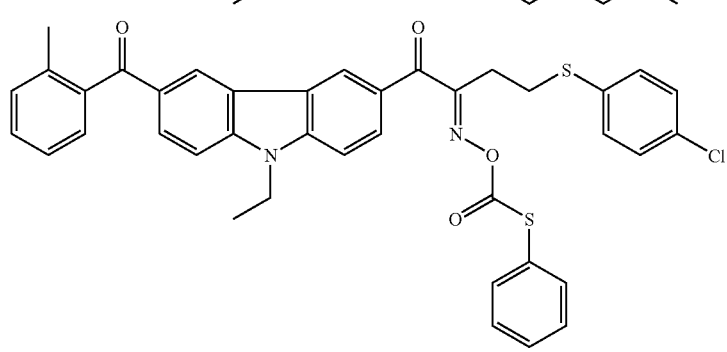
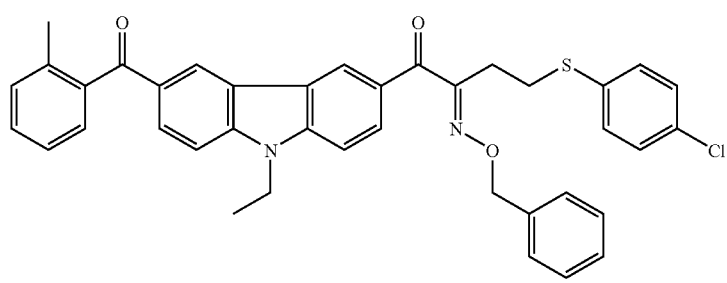

-continued
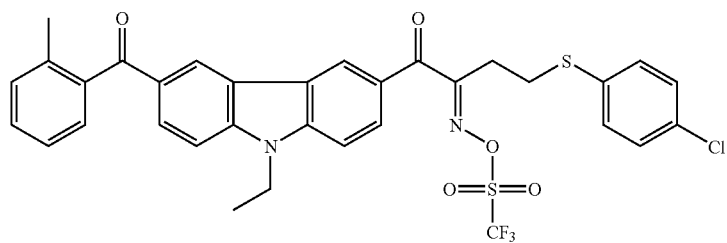
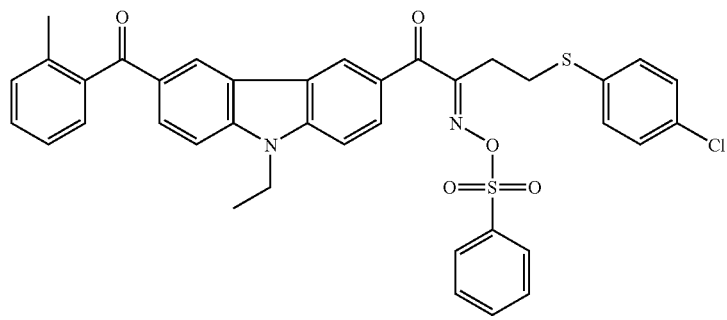
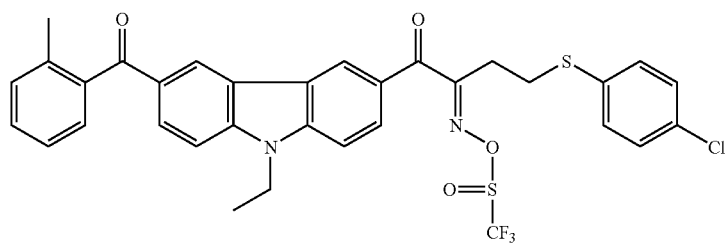
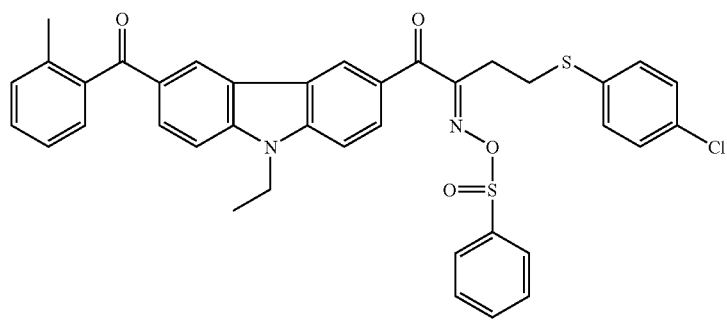
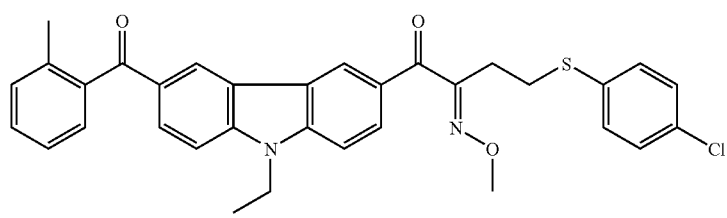
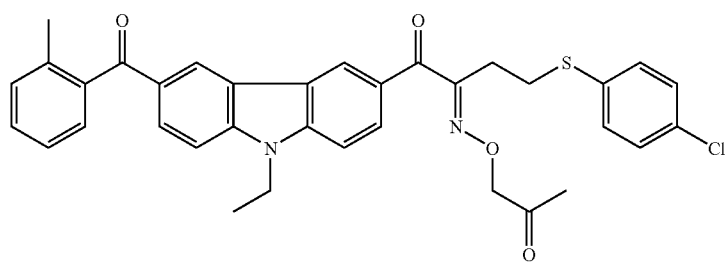

-continued
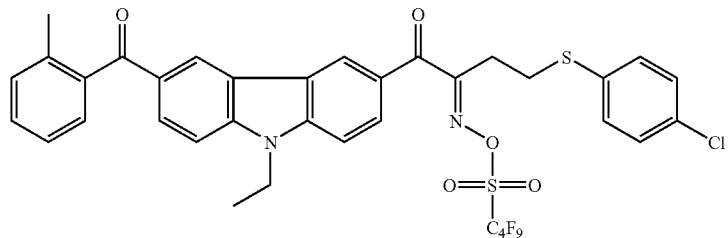
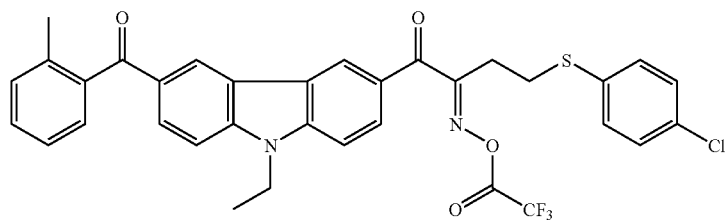
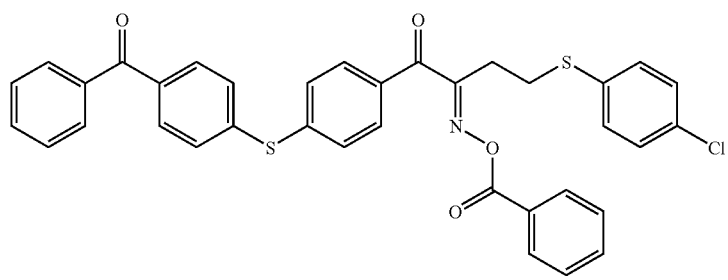
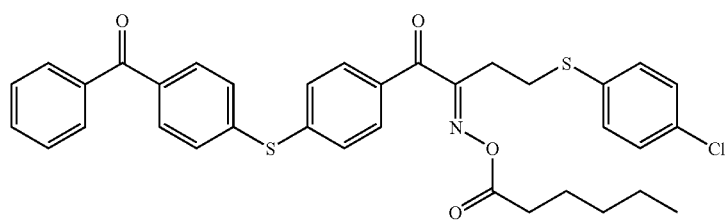
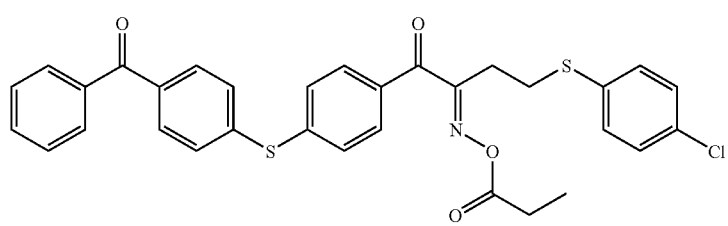
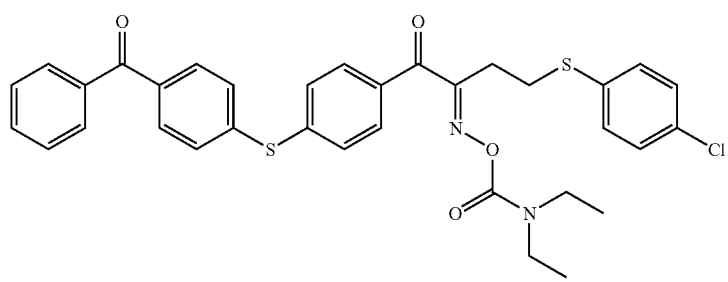

-continued
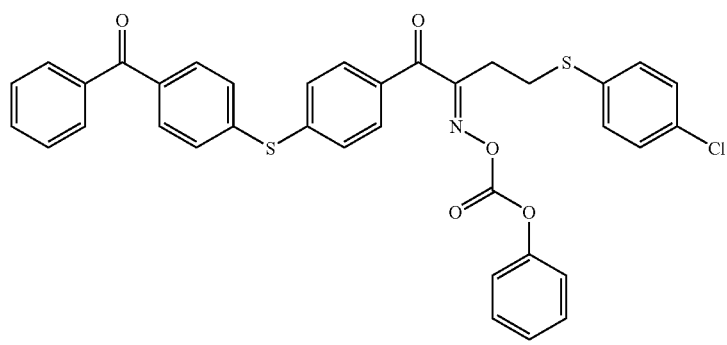
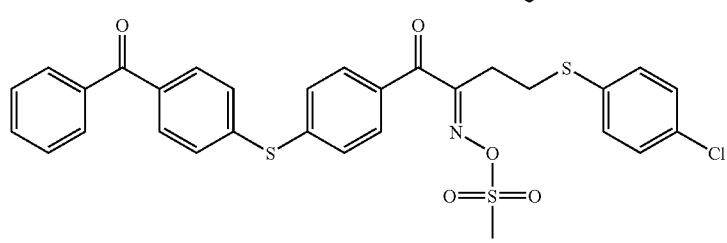
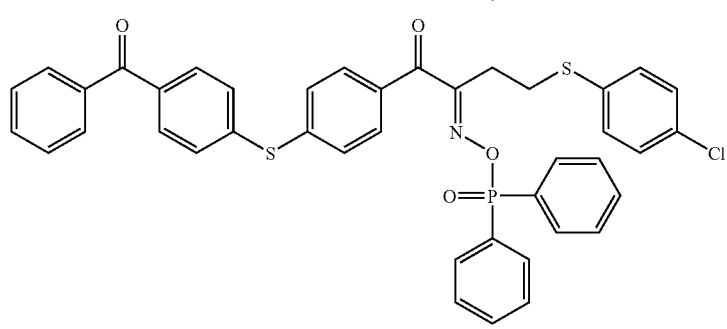
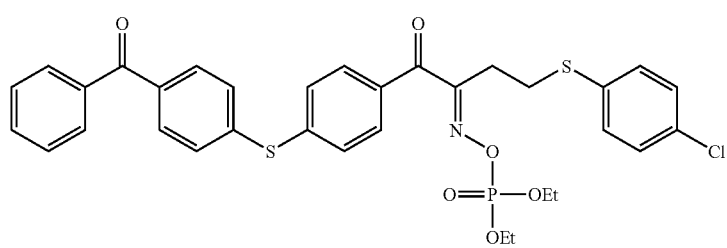
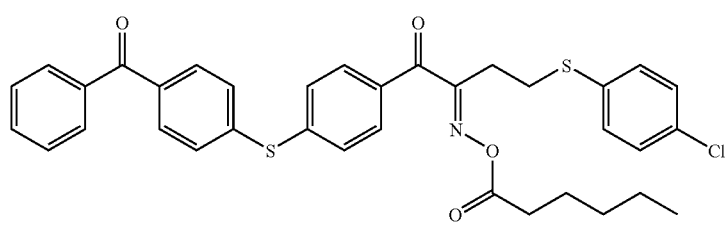
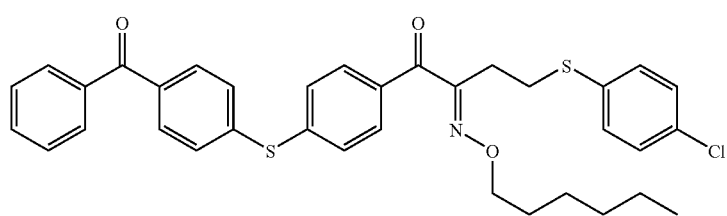

-continued
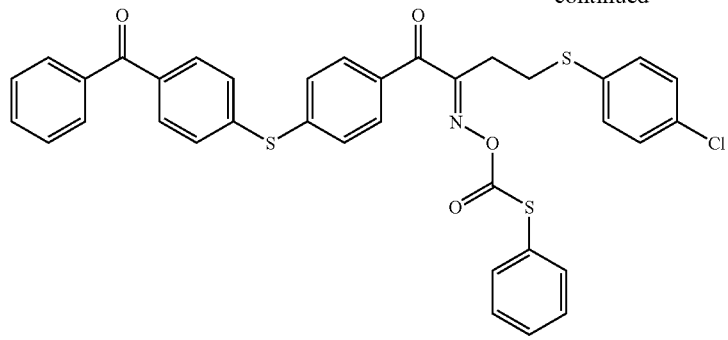
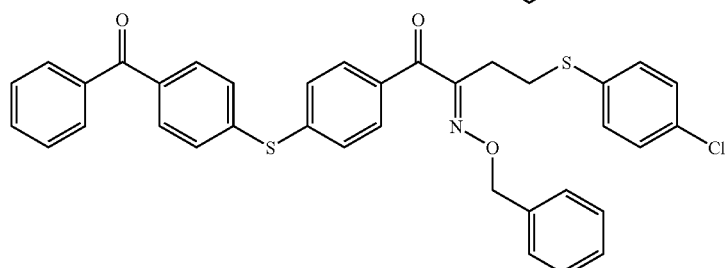
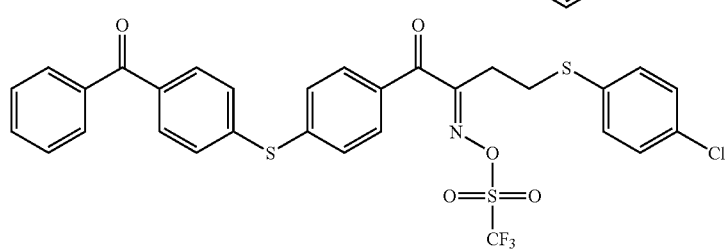
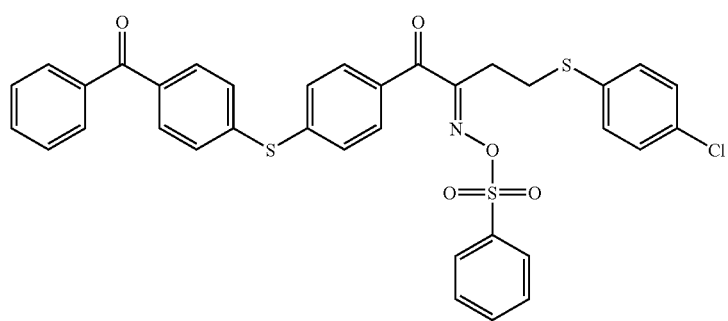
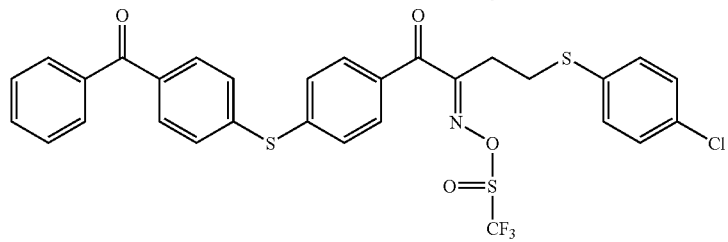
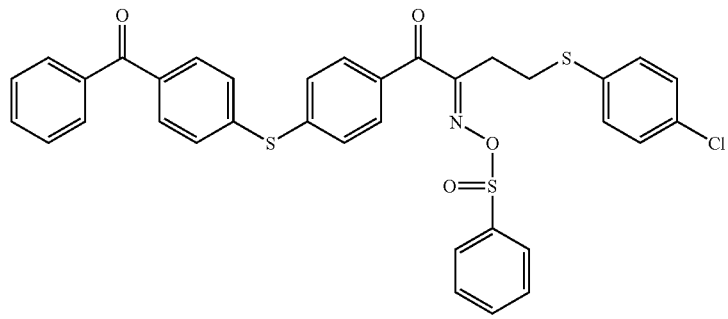

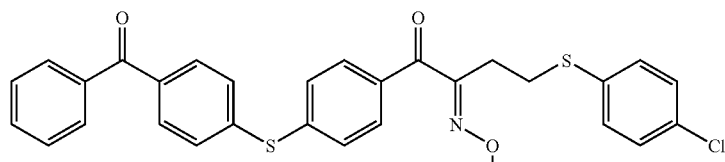
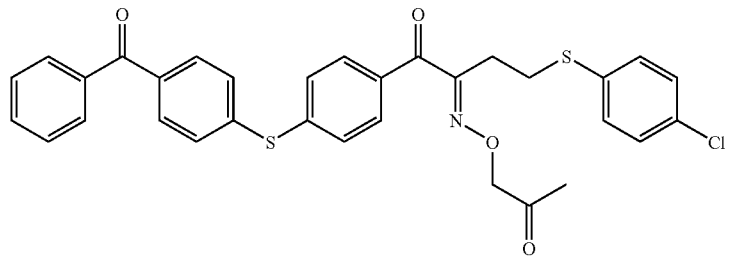
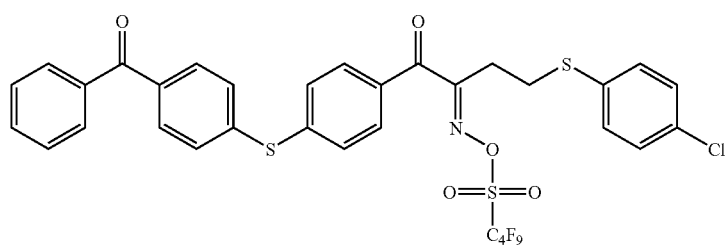
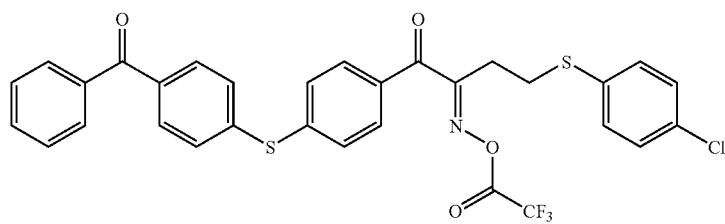
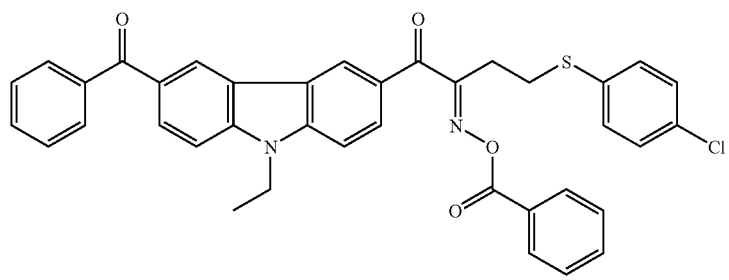
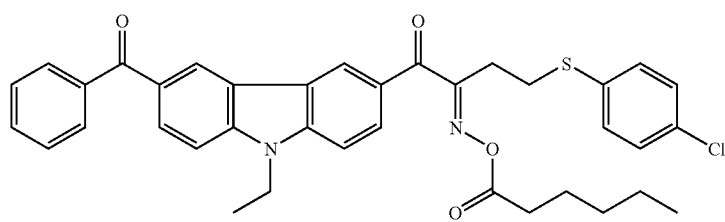
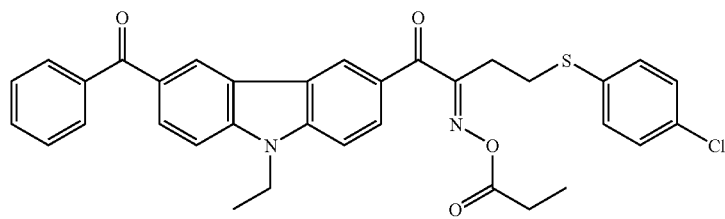

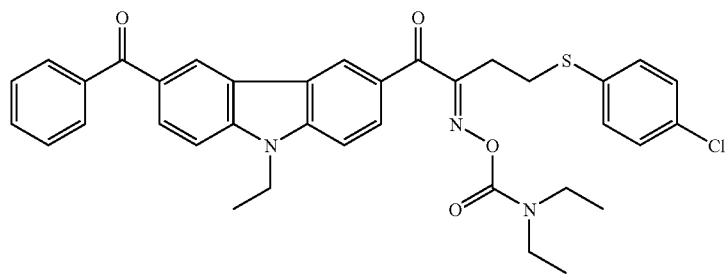
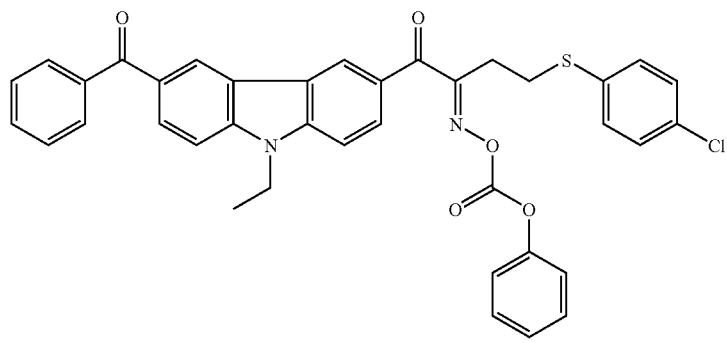
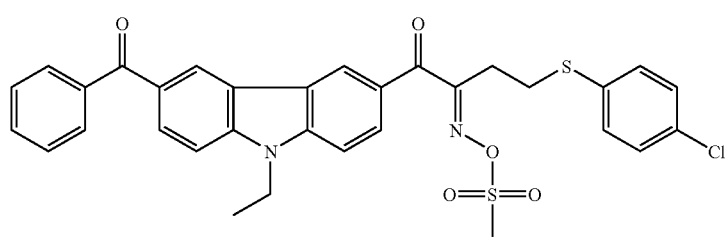
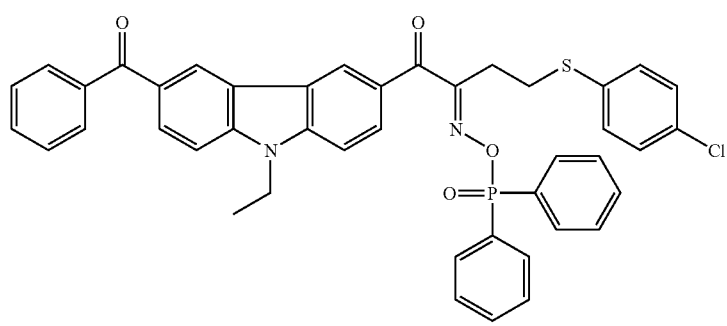
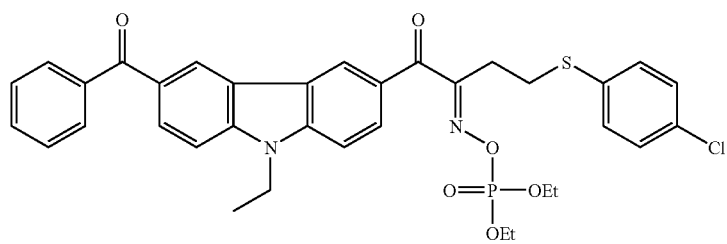
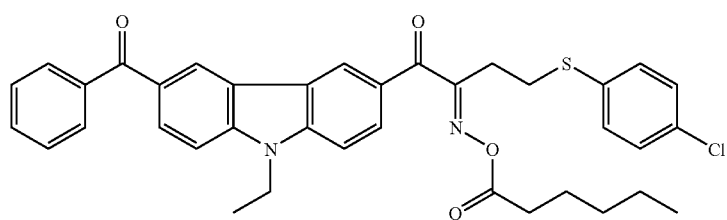

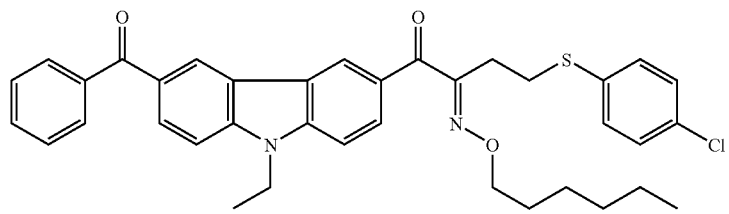
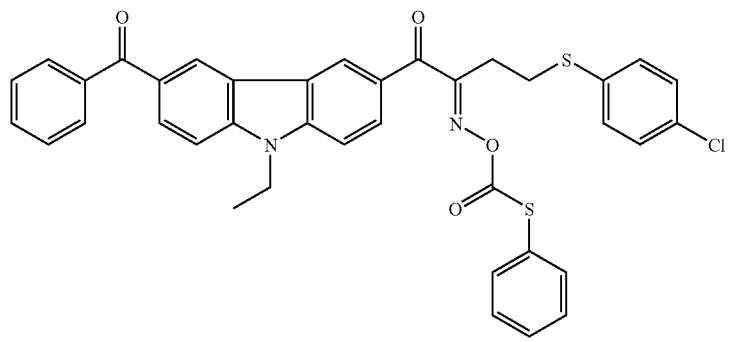
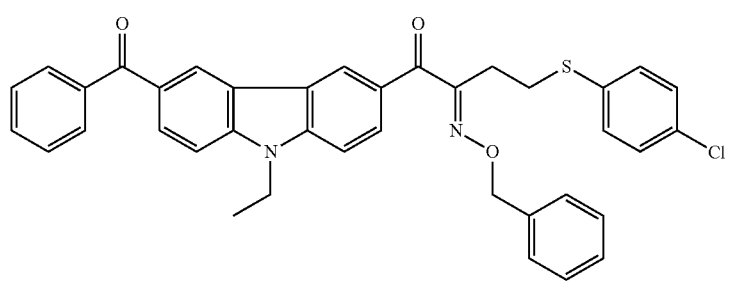
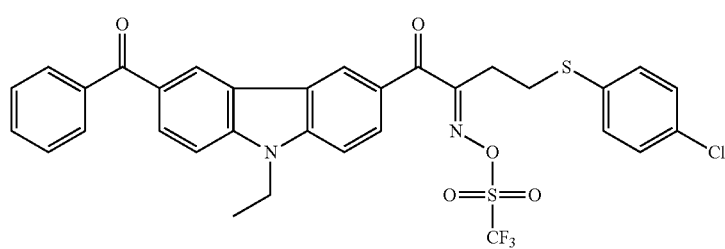
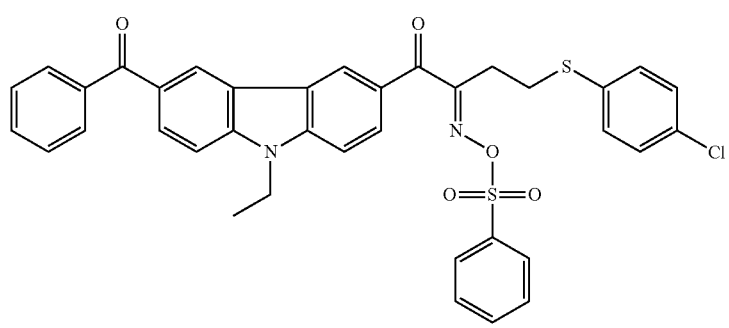
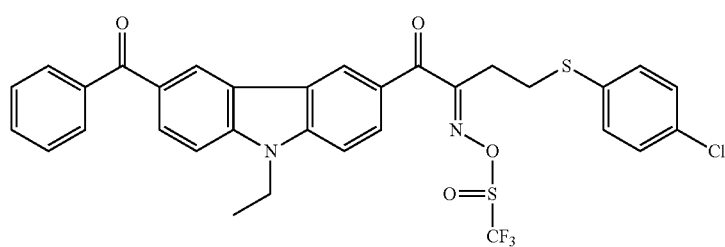

-continued

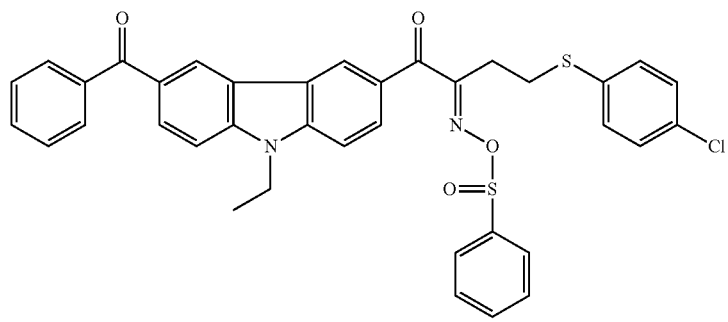

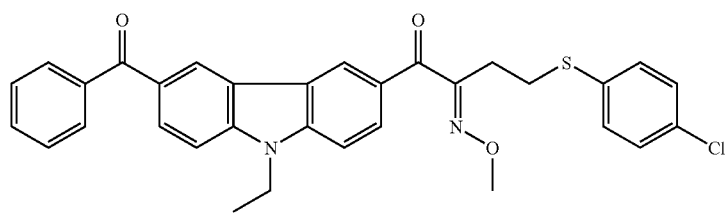

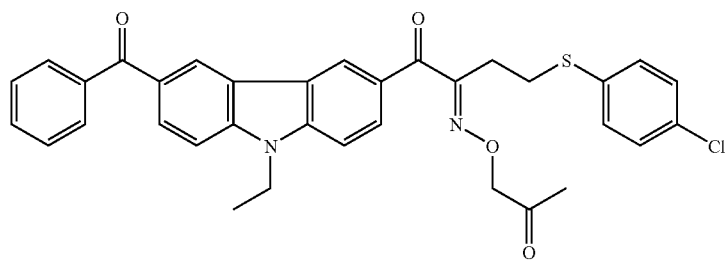

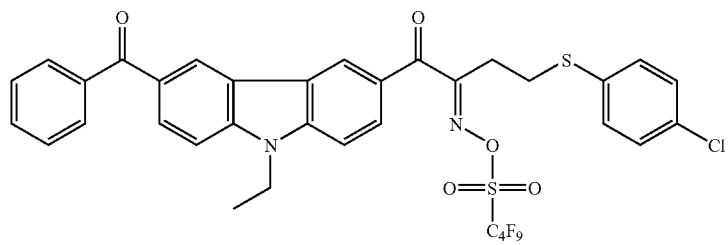

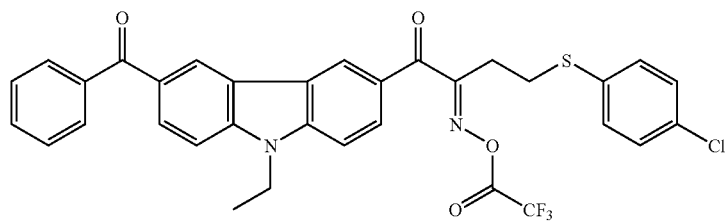

The novel oxime compound of the invention has a maximum absorption wavelength in the wavelength range of 350 nm to 500 nm, and preferably has a maximum absorption wavelength in the wavelength range of 360 nm to 480 nm. In particular, the novel oxime compound preferably has a high absorption at 365 nm and 455 nm.

Therefore, the novel oxime compound has absorption in a longer wavelength region as compared to conventional oxime compounds, so that the novel oxime compound can exhibit high sensitivity when it is exposed to light from a light source having a wavelength of 365 nm or 405 nm.

The novel oxime compound of the invention preferably has a molar absorption coefficient of 10,000 to 300,000, more preferably of 15,000 to 300,000, and still more preferably of 20,000 to 200,000 at 365 nm or 405 nm in view of sensitivity.

The molar absorption coefficient of the novel oxime compound is measured at a concentration of 0.01 g/L in a solvent of ethyl acetate with a UV-visible spectrophotometer (trade name: CARRY-5 Spectrophotometer, manufactured by Varian Inc.).

For example, the novel oxime compound of the invention may be synthesized by the method described below, while the synthesis method is not limited thereto.

Synthesis of the Compound represented by Formula (2)

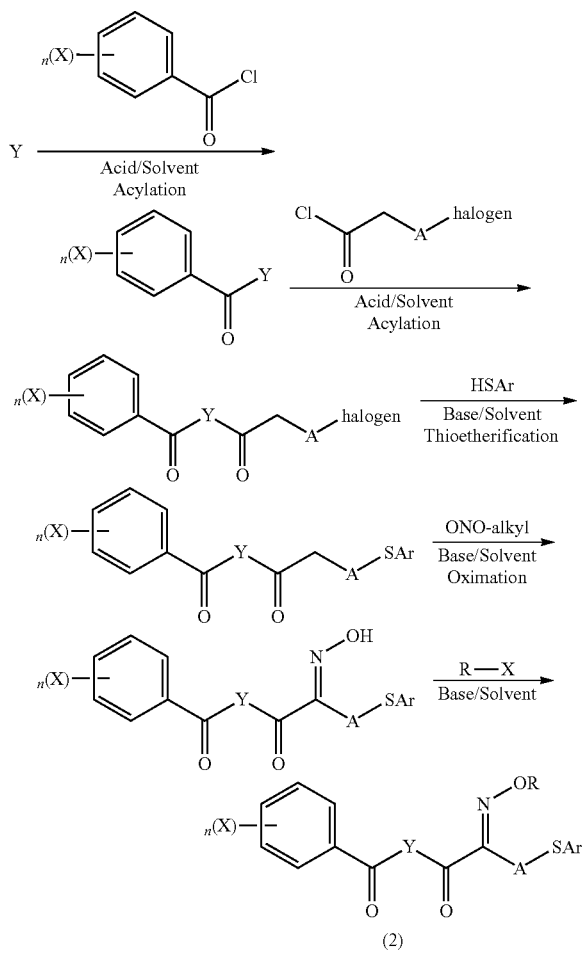

The oxime photopolymerization initiator described above may be used alone or in combination of two or more.

The amount of the oxime photopolymerization initiator in the photosensitive resin composition (total amount of initiators when two or more initiators are used) is preferably from 0.1 to 20 mass %, more preferably from 0.5 to 10 mass %, and still more preferably from 1 to 8 mass %, with respect to the mass of the total solid content of the photosensitive resin composition. Within this range, favorable sensitivity and pattern formability are attained.

The photosensitive resin composition according to an exemplary embodiment of the invention may further include another photopolymerization initiator in addition to the oxime photopolymerization initiator. Examples of a photopolymerization initiator which may be used in combination with the oxime photopolymerization initiator include an organic halogenated compound, an oxadiazole compound, a carbonyl compound, a ketal compound, a benzoin compound, an acridine compound, an organic peroxide compound, an azo compound, a coumarine compound, an azide compound, a metallocene compound, a hexaarylbiimidazole compound, an organic borate compound, a disulfone compound, an onium salt compound and an acylphosphine oxide compound.

Specific examples of the organic halogenated compound include those described in Wakabayashi, et. al., "Bull Chem. Soc Japan" 42, 2924 (1969), U.S. Pat. No. 3,905,815, Japanese Patent Application Publication (JP-B) No. 46-4605, JP-A Nos. 48-36281, 55-32070, 60-239736, 61-169835, 61-169837, 62-58241, 62-212401, 63-70243 and 63-298339, and M. P. Hutt "Journal of Heterocyclic Chemistry" 1 (No. 3), (1970). In particular, an oxazole compound and an s-triazine compound which are substituted by a trihalomethyl group may be used.

Preferred examples of the s-triazine compound include an s-triazine derivative in which at least one mono-, di- or trihalogen substituted methyl group is bonded to an s-triazine ring. Specific examples thereof include 2,4,6-tris(monochloromethyl)-s-triazine, 2,4,6-tris(dichloromethyl)-s-triazine, 2,4,6-tris(trichloromethyl)-s-triazine, 2-methyl-4,6-bis(trichloromethyl)-s-triazine, 2-n-propyl-4,6-bis(trichloromethyl)-s-triazine, 2-($\alpha,\alpha,\beta$-trichloroethyl)-4,6-bis(trichloromethyl)-s-triazine, 2-phenyl-4,6-bis(trichloromethyl)-s-triazine, 2-(p-methoxyphenyl)-4,6-bis(trichloromethyl)-s-triazine, 2-(3,4-epoxyphenyl)-4,6-bis(trichloromethyl)-s-triazine, 2-(p-chlorophenyl)-4,6-bis(trichloromethyl)-s-triazine, 2-[1-(p-methoxyphenyl)-2,4-butadienyl]-4,6-bis(trichloromethyl)-s-triazine, 2-styryl-4,6-bis(trichloromethyl)-s-triazine, 2-(p-methoxystyryl)-4,6-bis(trichloromethyl)-s-triazine, 2-(p-i-propyloxystyryl)-4,6-bis(trichloromethyl)-s-triazine, 2-(p-tolyl)-4,6-bis(trichloromethyl)-s-triazine, 2-(4-methoxynaphthyl)-4,6-bis(trichloromethyl)-s-triazine, 2-phenylthio-4,6-bis(trichloromethyl)-s-triazine, 2-benzylthio-4,6-bis(trichloromethyl)-s-triazine, 2,4,6-tris(dibromomethyl)-s-triazine, 2,4,6-tris(tribromomethyl)-s-triazine, 2-methyl-4,6-bis(tribromomethyl)-s-triazine, and 2-methoxy-4,6-bis(tribromomethyl)-s-triazine.

Examples of the oxadiazole compound include 2-trichloromethyl-5-styryl-1,3,4-oxodiazole, 2-trichloromethyl-5-(cyanostyryl)-1,3,4-oxodiazole, 2-trichloromethyl-5-(naphtho-1-yl)-1,3,4-oxodiazole, and 2-trichloromethyl-5-(4-styryl)styryl-1,3,4-oxodiazole.

Examples of the carbonyl compound include a benzophenone derivative such as benzophenone, Michler's ketone, 2-methylbenzophenone, 3-methylbenzophenone, 4-methylbenzophenone, 2-chlorobenzophenone, 4-bromobenzophenone or 2-carboxybenzophenone, an acetophenone derivative such as 2,2-dimethoxy-2-phenylacetophenone, 2,2-diethoxyacetophenone, 1-hydroxycyclohexylphenylketone, $\alpha$-hydroxy-2-methylphenylpropanone, 1-hydroxy-1-methylethyl-(p-isopropylphenyl)ketone, 1-hydroxy-1-(p-dodecylphenyl)ketone, 2-methyl-(4'-(methylthio)phenyl)-2-morpholino-1-propanone, 1,1,1-trichloromethyl-(p-butylphenyl) ketone or 2-benzyl-2-dimethylamino-4-morpholinobutyrophenone, a thioxanthone derivative such as thioxanthone, 2-ethylthioxanthone, 2-isopropylthioxanthone, 2-chlorothioxanthone, 2,4-dimethylthioxanthone, 2,4-diethylthioxanthone or 2,4-diisopropylthioxanthone, and a benzoic acid ester derivative such as ethyl p-dimethylaminobenzoate or ethyl p-diethylaminobenzoate.

Examples of the ketal compound include benzylmethyl ketal and benzyl-$\beta$-methoxyethylethyl acetal.

Examples of the benzoin compound include m-benzoin isopropyl ether, benzoin isobutyl ether, benzoin methyl ether and methyl o-benzoylbenzoate.

Examples of the acridine compound include 9-phenylacridine and 1,7-bis(9-aciridinyl)heptane.

Examples of the organic peroxide compound include trimethylcyclohexanone peroxide, acetylacetone peroxide, 1,1-bis(tert-butylperoxy)-3,3,5-trimethylcyclohexane, 1,1-bis(tert-butylperoxy)cyclohexane, 2,2-bis(tert-butylperoxy) butane, tert-butyl hydroperoxide, cumene hydroperoxide, diisopropylbenzene hydroperoxide, 2,5-dimethylhexane-2, 5-dihydroperoxide, 1,1,3,3-tetramethylbutyl hydroperoxide, tert-butylcumyl peroxide, dicumyl peroxide, 2,5-dimethyl-2, 5-di(tert-butylperoxy)hexane, 2,5-oxanoyl peroxide, succinic acid peroxide, benzoyl peroxide, 2,4-dichlorobenzoyl peroxide, diisopropyl peroxydicarbonate, di-2-ethylhexyl peroxydicarbonate, di-2-ethoxyethyl peroxydicarbonate, dimethoxyisopropyl peroxycarbonate, di(3-methyl-3-methoxybutyl) peroxydicarbonate, tert-butyl peroxyacetate, tert-butyl peroxypyvalate, tert-butyl peroxyneodecanoate, tert-butyl peroxyoctanoate, tert-butyl peroxylaurate, 3,3',4,4'-tetra-(t-butylperoxycarbonyl)benzophenone, 3,3',4,4'-tetra-(t-hexyl peroxycarbonyl)benzophenone, 3,3',4,4'-tetra-(p-isopropylcumyl peroxycarbonyl)benzophenone, carbonyldi (t-butyl peroxydihydrodiphthalate) and carbonyldi(t-hexylperoxy dihydrodiphthalate).

The azo compound may be any of those described in JP-A No. 8-108621 and the like.

Examples of the coumarine compound include 3-methyl-5-amino-((s-triazin-2-yl)amino)-3-phenyl coumarine, 3-chloro-5-diethylamino-((s-triazin-2-yl)amino)-3-phenyl coumarine and 3-butyl-5-dimethylamino-((s-triazin-2-yl) amino)-3-phenyl coumarine.

Examples of the azide compound include the organic azide compounds described in U.S. Pat. Nos. 2,848,328, 2,852,379 and 2,940,853, and 2,6-bis(4-azidobenzylidene)-4-ethylcyclohexanone (BAC-E).

Examples of the metallocene compound include titanocene compounds described in JP-A Nos. 59-152396, 61-151197, 63-41484, 2-249, 2-4705 and 5-83588, such as di-cyclopentadienyl-Ti-bis-phenyl, di-cyclopentadienyl-Ti-bis-2,6-difluorophenyl-1-yl, di-cyclopentadienyl-Ti-bis-2,4-di-fluorophenyl-1-yl, di-cyclopentadienyl-Ti-bis-2,4,6-trifluorophenyl-1-yl, di-cyclopentadienyl-Ti-bis-2,3,5,6-tetrafluorophenyl-1-yl, di-cyclopentadienyl-Ti-bis-2,3,4,5,6-pentafluorophenyl-1-yl, di-methylcyclopentadienyl-Ti-bis-2,6-difluorophenyl-1-yl, di-methylcyclopentadienyl-Ti-bis-2,4,6-trifluorophenyl-1-yl, di-methylcyclopentadienyl-Ti-bis-2,3,5,6-tetrafluorophenyl-1-yl, or di-methylcyclopentadienyl-Ti-bis-2,3,4,5,6-pentafluorophenyl-1-yl, and iron-arene complexes described in JP-A Nos. 1-304453 and 1-152109.

Examples of the hexaarylbiimidazole compound include those described in JP-B No. 6-29285, U.S. Pat. Nos. 3,479, 185, 4,311,783, and 4,622,286, specific examples of which include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4, 4',5,5'-tetraphenylbiimidazole, 2,2'-bis(o-methylphenyl)-4, 4',5,5'-tetraphenylbiimidazole, and 2,2'-bis(o-trifluorophenyl)-4,4',5,5'-tetraphenylbiimidazole.

Specific examples of the organic borate compound include organic boric acid salts described in JP-A Nos. 62-143044, 62-150242, 9-188685, 9-188686, 9-188710, 2000-131837 and 2002-107916, Japanese Patent No. 2764769, JP-A No. 2002-116539, Kunz, Martin "Rad Tech '98. Proceeding Apr. 19-22, 1998, Chicago", and the like, organic boron sulfonium complexes or organic boron oxosulfonium complexes described in JP-A Nos. 6-157623, 6-175564 and 6-175561, organic boron iodonium complexes described in JP-A Nos. 6-175554 and 6-175553, organic boron phosphonium complexes described in JP-A No. 9-188710, and organic boron transition metal coordination complexes described in JP-A Nos. 6-348011, 7-128785, 7-140589, 7-306527 and 7-292014.

Examples of the disulfone compound include those described in JP-A Nos. 61-166544 and 2002-328465, and the like.

Examples of the onium salt compound include diazonium salts described in S. I. Schlesinger, Photogr. Sci. Eng., 18,387 (1974), T. S. Bal et al, Polymer, 21,423 (1980), ammonium salts described in U.S. Pat. No. 4,069,055, JP-A No. 4-365049 and the like, phosphonium salts described in U.S. Pat. Nos. 4,069,055 and 4,069,056, and an iodonium salt described in European Patent No. 104,143, Japanese Patent Application Laid-Open (JP-A) Nos. 2-150848 and 2-296514.

The iodonium salt is preferably a diaryl iodonium salt, and is more preferably substituted by at least two electron donating groups, such as an alkyl group, an alkoxy group or an aryloxy group, in terms of stability.

The sulfonium salt may be a sulfonium salt in which one substituent of a triaryl sulfonium salt has a coumarine structure or an anthraquinone structure, and which has absorption at the wavelength of 300 nm or more.

Examples of the sulfonium salt include those described in European Patent Nos. 370,693, 390,214, 233,567, 297,443 and 297,442, U.S. Pat. Nos. 4,933,377, 4,760,013, 4,734,444 and 2,833,827, German Patent Nos. 2,904,626, 3,604,580 and 3,604,581. In terms of stability and sensitivity, the sulfonium salt is preferably substituted by an electron withdrawing group. The electron withdrawing group preferably has a Hammett value of more than 0. Preferred examples of the electron withdrawing group include a halogen atom and carboxylic acid.

Other preferred examples of the sulfonium salt include a sulfonium salt which has absorption in the wavelength range of 300 nm or more and has a coumarine or anthraquinone structure for one substituent of the triaryl sulfonium salt. Other preferred examples of the sulfonium salt include a sulfonium salt which has absorption in the wavelength range of 300 nm or more and in which the triaryl sulfonium salt has an aryloxy group or an arylthio group as a substituent.

Examples of the onium salt compound include a selenonium salt described in J. V. Crivello et al., Macromolecules, 10 (6), 1307 (1977) and J. V. Crivello et. al., J. Polymer Sci., Polymer Chem. Ed., 17, 1047 (1979), and an arsonium salt described in C. S. Wen et al, Ten, Proc. Conf. Rad. Curing ASIA, p 478 Tokyo, October (1988).

Examples of the acylphosphine oxide compound include IRGACURE 819, DAROCURE 4265 and DAROCURE TPO (all registered names, manufactured by Ciba Specialty Chemicals).

3. UV Absorbing Agent

The photosensitive resin composition according to an exemplary embodiment of the invention further includes at least one UV absorbing agent. As a result, an increase in line width during light exposure is inhibited. Examples of the UV absorbing agent include a compound which has a maximum absorbance in the wavelength range of 250 nm to 400 nm.

Specific examples of the UV absorbing agent include:

benzophenone compounds such as SUMISORB 130 (registered name, manufactured by SUMITOMO CHEMICAL Co., Ltd.), EVERSORB 10, EVERSORB 11, EVERSORB 12 (all trade names, manufactured by Everlight Chemical Industrial Corp.), TOMISORB 800 (trade name, manufactured by API Corp.), or SEESORB 100, SEESORB 101, SEESORB 101S, SEESORB 102, SEESORB 103, SEESORB 105, SEESORB 106, SEESORB 107, SEESORB 151 (all trade names, manufactured by SHIPRO KASEI KAISHA, Ltd.);

benzotriazole compounds such as SUMISORB 200, SUMISORB 250, SUMISORB 300, SUMISORB 340, SUMISORB 350 (all registered names, manufactured by SUMITOMO CHEMICAL Co., Ltd.), JF 77, JF 78, JF 79, JF 80, JF 83 (all trade names, manufactured by JOHOKU CHEMICAL Co., Ltd.), TINUVIN PS, TINUVIN 99-2, TINUVIN 109, TINUVIN 384-2, TINUVIN 900, TINUVIN 928, TINUVIN 1130 (all registered names, manufactured by Ciba Specialty Chemicals), EVERSORB 70, EVERSORB 71, EVERSORB 72, EVERSORB 73, EVERSORB 74, EVERSORB 75, EVERSORB 76, EVERSORB 234, EVERSORB 77, EVERSORB 78, EVERSORB 80, EVERSORB 81 (all trade names, manufactured by Everlight Chemical Industrial Corp.), TOMISORB 100, TOMISORB 600 (all trade names, manufactured by API Corp.), or SEESORB 701, SEESORB 702, SEESORB 703, SEESORB 704, SEESORB 706, SEESORB 707, SEESORB 709 (all trade names, manufactured by SHIPRO KASEI KAISHA, Ltd.);

benzoate compounds such as SUMISORB 400 (registered name, manufactured by SUMITOMO CHEMICAL Co., Ltd.) or phenyl salicylate; and hydroxyphenyltriazine compounds such as TINUVIN 400, TINUVIN 405, TINUVIN 460, TINUVIN 477DW, TINUVIN 479 (all registered names, manufactured by Ciba Specialty Chemicals).

As the UV absorbing agent, a conjugated diene compound is preferable. Of these, the compound represented by the following Formula (I) is particularly preferable. By using a conjugated diene compound such as this, variations in developing properties that occur after low light intensity exposure are inhibited, and thereby it is possible to reduce the influence of exposure light intensity on a line width of a pattern, a film thickness, a spectrum, and the like, which can affect pattern formability.

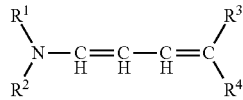

Formula (I)

In Formula (I), $R^1$ and $R^2$ each independently represent a hydrogen atom, an alkyl group having 1 to 20 carbon atoms, or an aryl group having 6 to 20 carbon atoms. $R^1$ and $R^2$ may be the same as or different from each other, but may not both be a hydrogen atom.

Examples of the alkyl group having 1 to 20 carbon atoms represented by $R^1$ or $R^2$ include a methyl group, an ethyl group, a propyl group, an n-butyl group, an n-hexyl group, a cyclohexyl group, an n-decyl group, an n-dodecyl group, an n-octadecyl group, an eicosyl group, a methoxyethyl group, an ethoxypropyl group, a 2-ethylhexyl group, a hydroxyethyl group, a chloropropyl group, an N,N-diethylaminopropyl group, a cyanoethyl group, a phenethyl group, a benzyl group, a p-t-butylphenethyl group, a p-t-octylphenoxyethyl group, a 3-(2,4-di-t-amylphenoxy)propyl group, an ethoxycarbonylmethyl group, a 2-(2-hydroxyethoxy)ethyl group and 2-furylethyl group.

The aryl group having 6 to 20 carbon atoms represented by $R^1$ or $R^2$ may be either a monocycle or a fused cycle, and may be any one of a substituted aryl group and an unsubstituted aryl group. Examples of a substituent for the substituted aryl group include an alkyl group, an aryl group, an alkoxy group, an aryloxy group, an acyloxy group, a halogen atom, an acylamino group, an acyl group, an alkylthio group, an arylthio group, a hydroxy group, a cyano group, an alkyloxycarbonyl group, an aryloxycarbonyl group, a substituted carbamoyl group, a substituted sulfamoyl group, a nitro group, a substituted amino group, an alkylsulfonyl group and an arylsulfonyl group. Among these, a substituted or unsubstituted phenyl group, a 1-naphthyl group, and a 2-naphthyl group are preferable.

Further, $R^1$ and $R^2$ may bind to each other to form a cyclic amino group together with the nitrogen atom. Examples of the cyclic amino group include a piperidino group, a morpholino group, a pyrrolidino group, a hexahydroazepino group and a piperazino group.

Among all, it is preferable that $R^1$ and $R^2$ each independently represent a lower alkyl group having 1 to 8 carbon atoms (such as a methyl, ethyl, isopropyl, butyl, sec-butyl, tert-butyl, pentyl, tert-pentyl, hexyl, octyl, 2-ethylhexyl or tert-octyl group), or a substituted or unsubstituted phenyl group (such as a tolyl group, a phenyl group, an anisyl group, a mesityl group, a chlorophenyl group or a 2,4-di-t-amylphenyl group). In addition, it is also preferable that $R^1$ and $R^2$ bind to each other to form a ring which contains the nitrogen atom represented by N in Formula (I) (for example, a piperidine ring, a pyrrolidine ring or a morpholine ring).

In Formula (I), $R^3$ and $R^4$ each independently represent an electron withdrawing group. Herein, the electron withdrawing group indicates an electron withdrawing group which has a Hammett substituent constant $\sigma_p$ (hereinbelow, this may simply be referred to as "σp value") of from 0.20 to 1.0, and preferably from 0.30 to 0.8.

The Hammett equation is an empirical rule developed by L. P. Hammett in 1935 in order to quantitatively explain the effect of a substituent on a reaction or equilibrium of benzene derivatives, and it is widely accepted today. There are two substituent constants, $\sigma_p$ and $\sigma_m$, which are described in detail in general textbooks and literature such as "Lange's Handbook of Chemistry" (J. A. Dean ed. $12^{th}$ edition, 1979, Mc Graw-Hill), "Chemical world publication" (Vol. 122, pages 96-103, 1979, Nankodo Co., Ltd.), and Chemical Reviews (Vol. 91, pages 165-195, 1991). However, the present invention is not limited to specific substituents having the values known and described in the literature, and values that are not disclosed in the literature may be included provided they fall within the stated range when measured by the Hammett equation.

Specific examples of the electron withdrawing group which has a $\sigma_p$ value of from 0.20 to 1.0 include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, an alkyl group substituted by at least two halogen atoms, an alkoxy group substituted by at least two halogen atoms, an aryloxy group substituted by at least two halogen atoms, an alkylamino group substituted by at least two halogen atoms, an alkylthio group substituted by at least two halogen atoms, an aryl group substituted by another electron withdrawing group having a $\sigma_p$ value of 0.20 or more, a heterocyclic group, a chlorine atom, a bromine atom, an azo group, and a selenocyanate group. Among these substituents, those capable of having an additional substituent may have a substituent as exemplified above.

Among these, in the invention, $R^3$ is preferably a group selected from a cyano group, —COOR$^5$, —CONHR$^5$, —COR$^5$, and —SO$_2$R$^5$, and R$^4$ is preferably a group selected from a cyano group, —COOR$^6$, —CONHR$^6$, —COR$^6$, and —SO$_2$R$^6$. R$^5$ and R$^6$ each independently represent an alkyl group having 1 to 20 carbon atoms, or an aryl group having 6 to 20 carbon atoms. The alkyl group having 1 to 20 carbon atoms and the aryl group having 6 to 20 carbon atoms, which are represented by $R^5$ or $R^6$, respectively have the same definitions as those of $R^1$ and $R^2$, and preferred examples are also the same.

Among these, preferred examples of $R^3$ or $R^4$ include an acyl group, a carbamoyl group, an alkyloxycarbonyl group, an aryloxycarbonyl group, a cyano group, a nitro group, an alkylsulfonyl group, an arylsulfonyl group, a sulfonyloxy group, and a sulfamoyl group. More preferred examples include an acyl group, a carbamoyl group, an alkyloxycarbonyl group, an aryloxycarbonyl group, a cyano group, an alkylsulfonyl group, an arylsulfonyl group, a sulfonyloxy group, and a sulfamoyl group.

Further, at least one of $R^1$, $R^2$, $R^3$, and $R^4$ may be in a polymer form which is derived from a monomer bonded to a vinyl group via a linking group.

Hereinbelow, specific examples of the compound represented by Formula (I) [i.e., Exemplary Compounds (1) to (14)] will be shown. However, the present invention is not limited thereto.

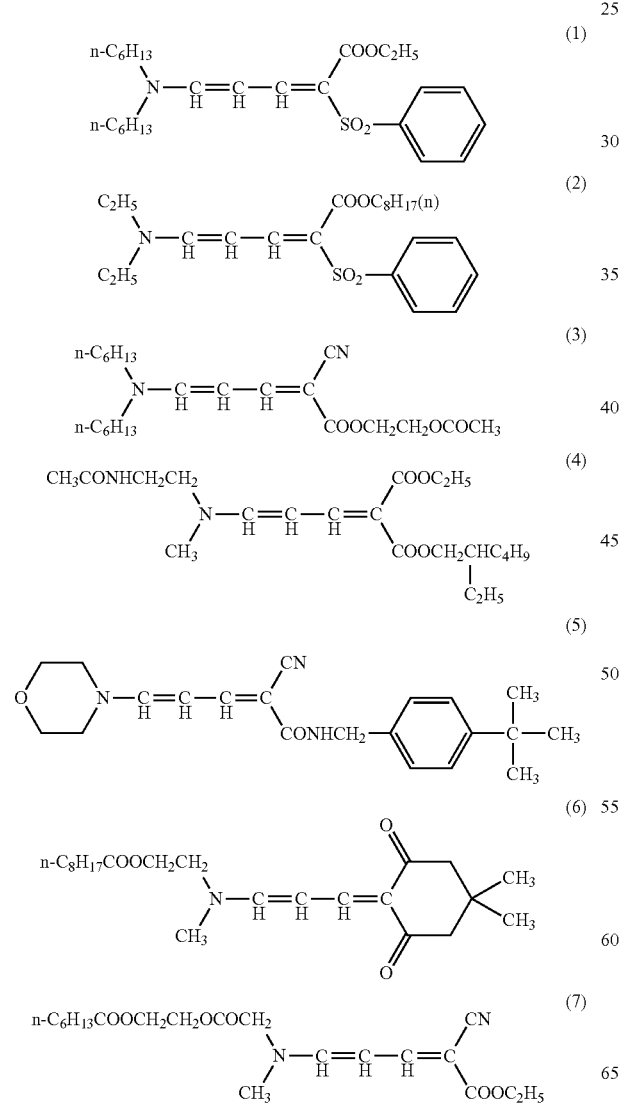

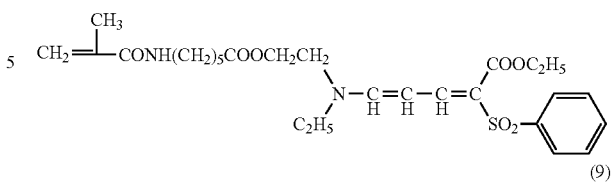

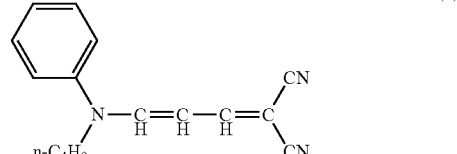

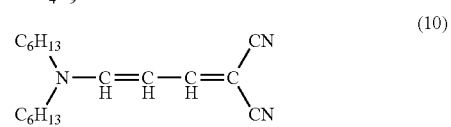

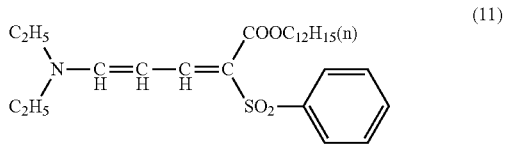

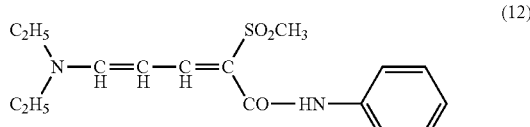

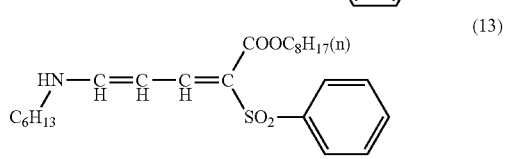

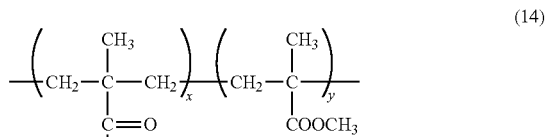

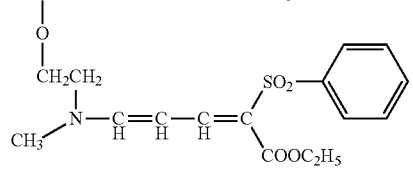

x:y = 80:20
(Weight ratio)

The compound represented by Formula (I) may also be synthesized according to the methods described in JP-B No. 44-29620, JP-A Nos. 53-128333, 61-169831, 63-53543, 63-53544 and 63-56651.

Hereinbelow, a specific method for synthesizing a representative compound of the compounds represented by Formula (I) will be described.

Method for Synthesizing Exemplary Compound (1)

3-Anilino-acrolein-anyl (13.3 g) and ethylphenylsulfonyl acetate (14.3 g) are heated at 85 to 90° C. for 2 hours in acetic anhydride (40 ml). Acetic anhydride is then removed under reduced pressure, and ethanol (40 ml) and di-n-hexylamine (24.1 g) are added, followed by refluxing the mixture for 2 hours. After ethanol is removed, residues are purified by column chromatography and recrystallized with ethanol, thereby obtaining a desired product. The melting point thereof is 95 to 96° C.

The amount of the UV absorbing agent (for example, the compound represented by Formula (I)) in the photosensitive resin composition of the invention is preferably from 0.01 mass % to 30 mass %, more preferably from 0.01 mass % to 20 mass %, still more preferably from 0.01 mass % to 15 mass % and most preferably from 3 mass % to 10 mass %, with respect to the total solid content of the composition. When the amount of the UV absorbing agent is 0.01 mass % or more, a light blocking property during light exposure is favorable, whereby an increase in line width of a pattern due to excessive polymerization is inhibited, and a desired line width can be easily obtained. In addition, generation of background residue (development residue) is inhibited more effectively. Meanwhile, when the amount of the UV absorbing agent is 30 mass % or less, a light blocking property during light exposure is not excessively strong, and thereby polymerization can be carried out more favorably.

As described above, variation in pattern line width is more significant with a transparent photocurable composition which has little absorbance of UV light such as g-rays, h-rays or i-rays which are exposure light sources. Thus, the compound represented by Formula (I) (i.e., a conjugated diene compound) is particularly useful when included in a transparent photosensitive resin composition.

4. Monomer

The photosensitive resin composition according to an exemplary embodiment of the invention further includes a monomer which has a hydrogen bonding group (hereinbelow, also referred to as "hydrogen bonding group-containing monomer") in an amount of 30 mass % or more with respect to the total solid content of the composition.

As a result, hydrogen bonding may be effectively formed among the hydrogen bonding group-containing monomers (or hydrogen bonding between a hydrogen bonding group-containing monomer and other monomers that will be explained below). Thus, heat sag caused by a post baking process may be inhibited and deterioration in desired pattern rectangularity may be also inhibited.

The photosensitive resin composition of the invention may include only one hydrogen bonding group-containing monomer, or may include two or more types of them. In a case in which two or more types of the monomers are included, their total amount is 30 mass % or more with respect to the total solid content of the composition.

Specifically, examples of the hydrogen bonding group include a hydroxyl group, a carboxyl group, an amino group, an ureido group, an alkoxycarbonylamino group, a sulfo group, a sulfoneamide group and an amide group. Among these, a group which has both a hydrogen which can be a donor for a hydrogen bond and a substituent which can be an acceptor for a hydrogen bond is preferable.

From the viewpoints of obtaining an appropriate pattern rectangularity, more preferred examples of the hydrogen bonding group is at least one selected from a carboxyl group, an alkoxycarbonylamino group, and an ureido group.

Further, the hydrogen bonding group-containing monomer is preferably a polyfunctional polymer (hereinbelow, may be referred to as "polyfunctional polymerizable monomer").

Hereinbelow, specific examples of the polyfunctional polymerizable monomer containing a hydrogen bonding group will be described.

Examples of the polyfunctional polymerizable monomer containing a hydroxy group include pentaerythritol triacrylate, ECH-modified ethyleneglycol diacrylate, ECH-modified glycerol triacrylate, ECH-modified phthalic acid diacrylate, triglycerol diacrylate, and ECH-modified trimethylolpropane triacrylate.

Examples of a polyfunctional polymerizable monomer containing a carboxyl group include the compounds represented by the following Formula (III-1) or Formula (II-2). However, the present invention is not limited thereto.

With regard to the following formulae, when T or G is an oxyalkylene group, the bonding arm at the carbon atom side of the oxyalkylene group is linked to R, X or W.

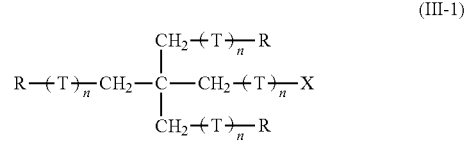

(III-1)

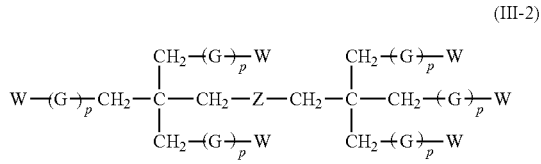

(III-2)

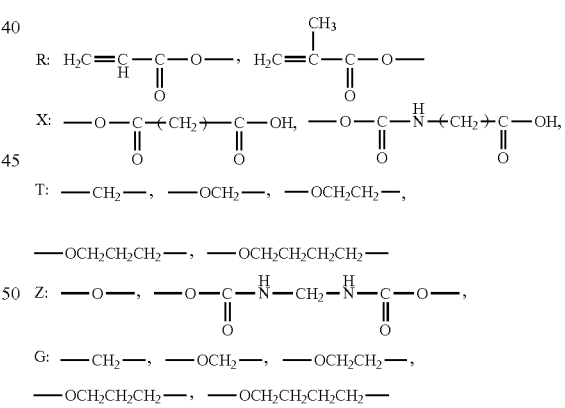

In Formula (III-1), n is an integer of from 0 to 14 and m is an integer of from 1 to 8. In Formula (III-2), W has the same definitions as those of R or X in Formula (III-1), and three to five Ws among total of six Ws are the same as R; p is an integer of from 0 to 14, and q is an integer of from 1 to 8. R, W, T and G, which are present in plurality in one molecule, may be the same as or different from each other, respectively.

Hereinbelow, specific examples of the compound represented by Formula (III-1) or Formula (III-2) will be shown. However, the present invention is not limited thereto.

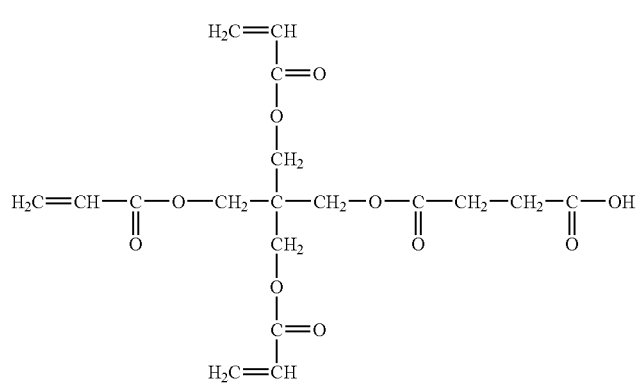
(M-1)
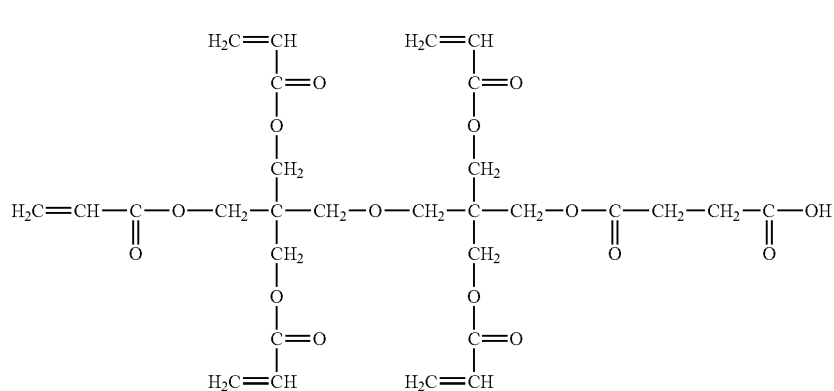
(M-2)
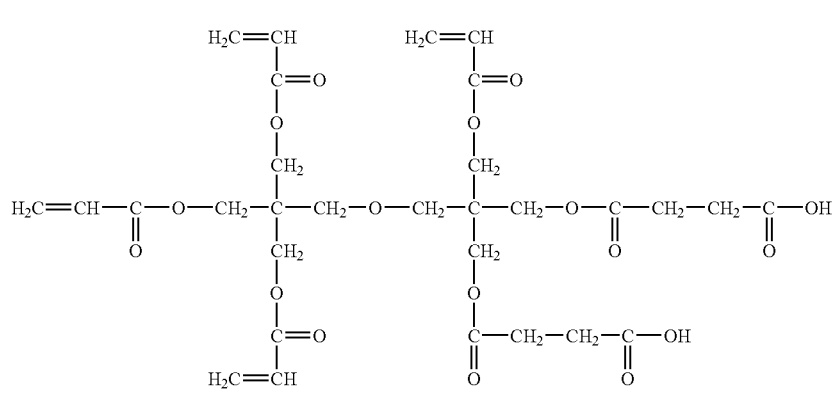
(M-3)
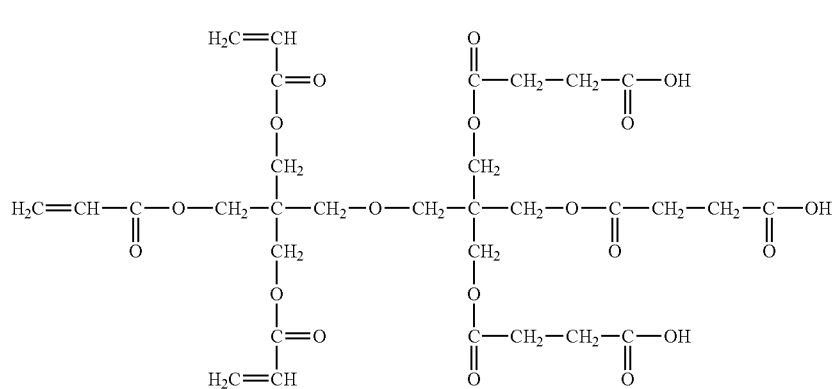
(M-4)

-continued
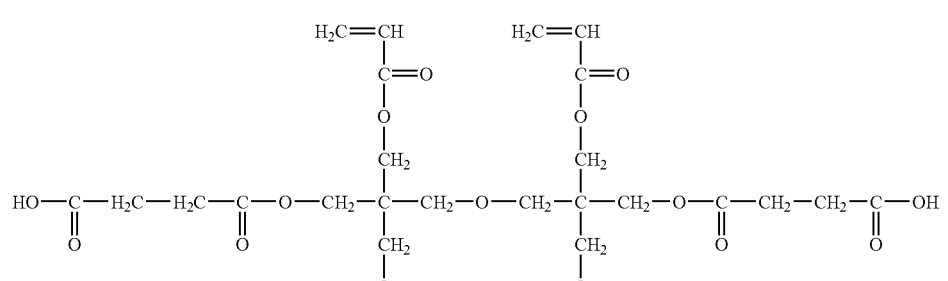
(M-5)
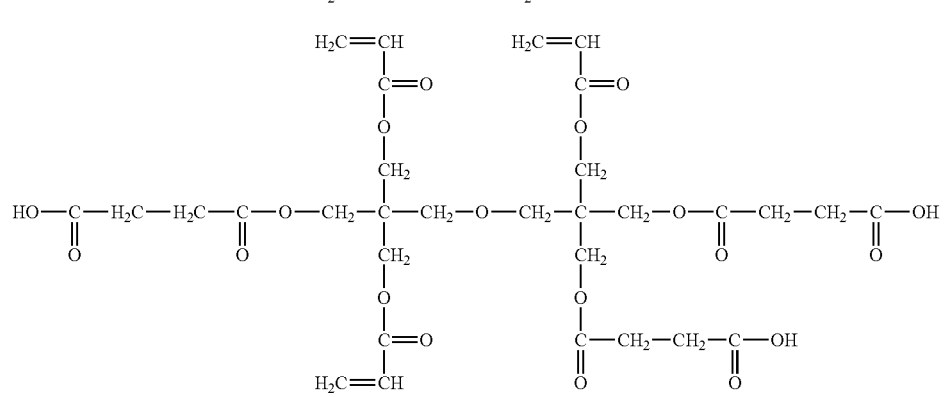
(M-6)
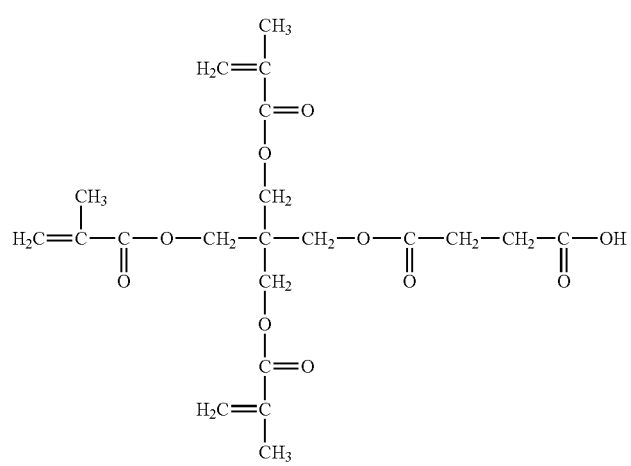
(M-7)
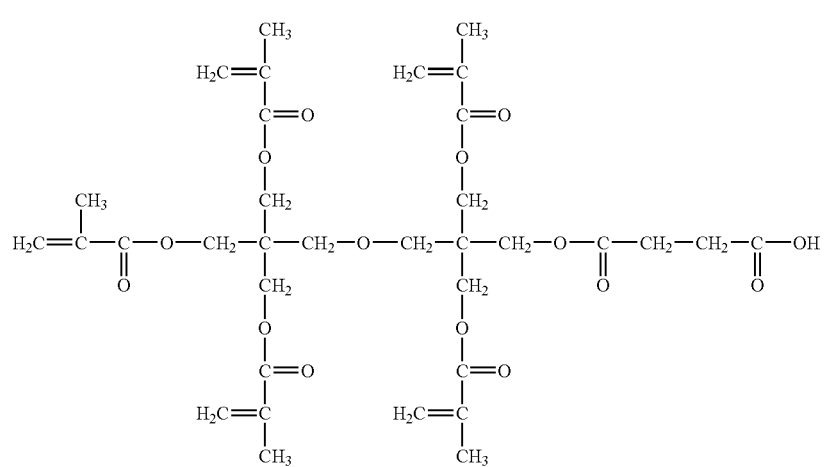
(M-8)

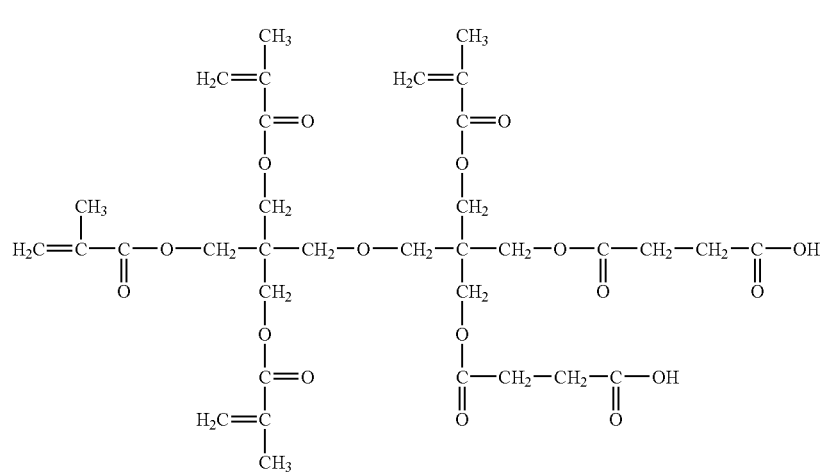
(M-9)
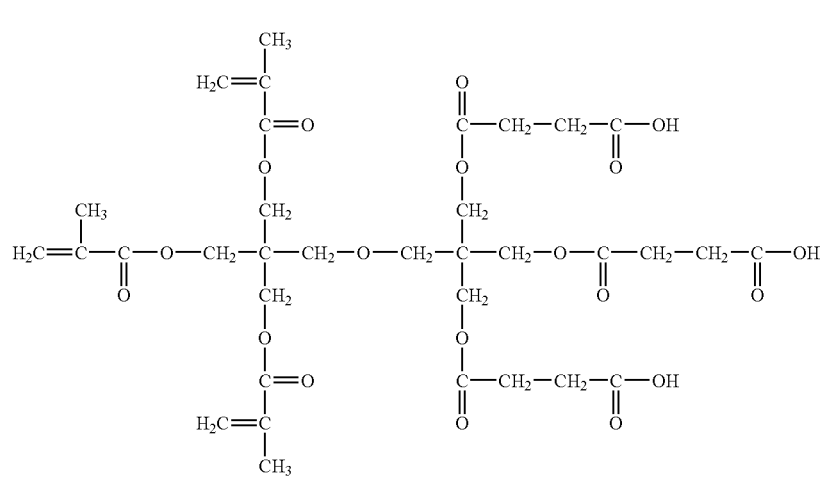
(M-10)
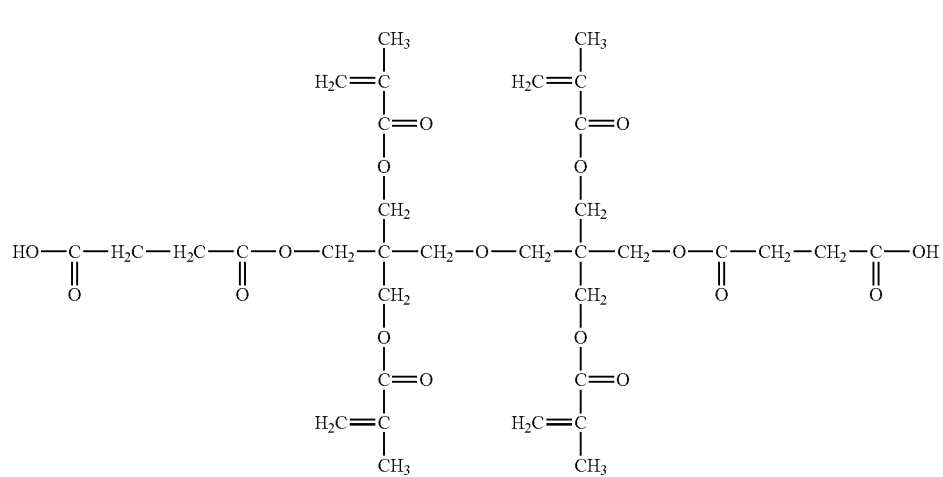
(M-11)

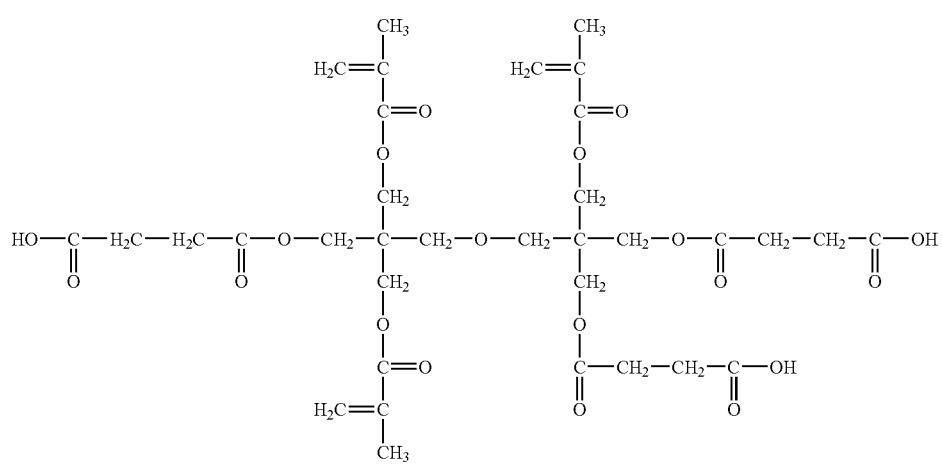

(M-12)

Examples of a combination of the polyfunctional polymerizable monomer containing a carboxyl group and another monomer include commercially available products such as TO-2359, TO-2360, TO-2348, and TO-756 (all trade names, manufactured by TOAGOSEI Co., Ltd.).

Examples of a polyfunctional monomer having an alkoxycarbonylamino group include U-6LHA, U-6LYXA and U-12LMA (all trade names, manufactured by Shin-Nakamura Chemical Co., Ltd.).

Examples of a polyfunctional monomer having an amide group include M-315 and M-215 (all trade names, manufactured by TOAGOSEI Co., Ltd.).

Further, examples of other polyfunctional monomers containing a hydrogen bonding group include the following exemplary compounds.

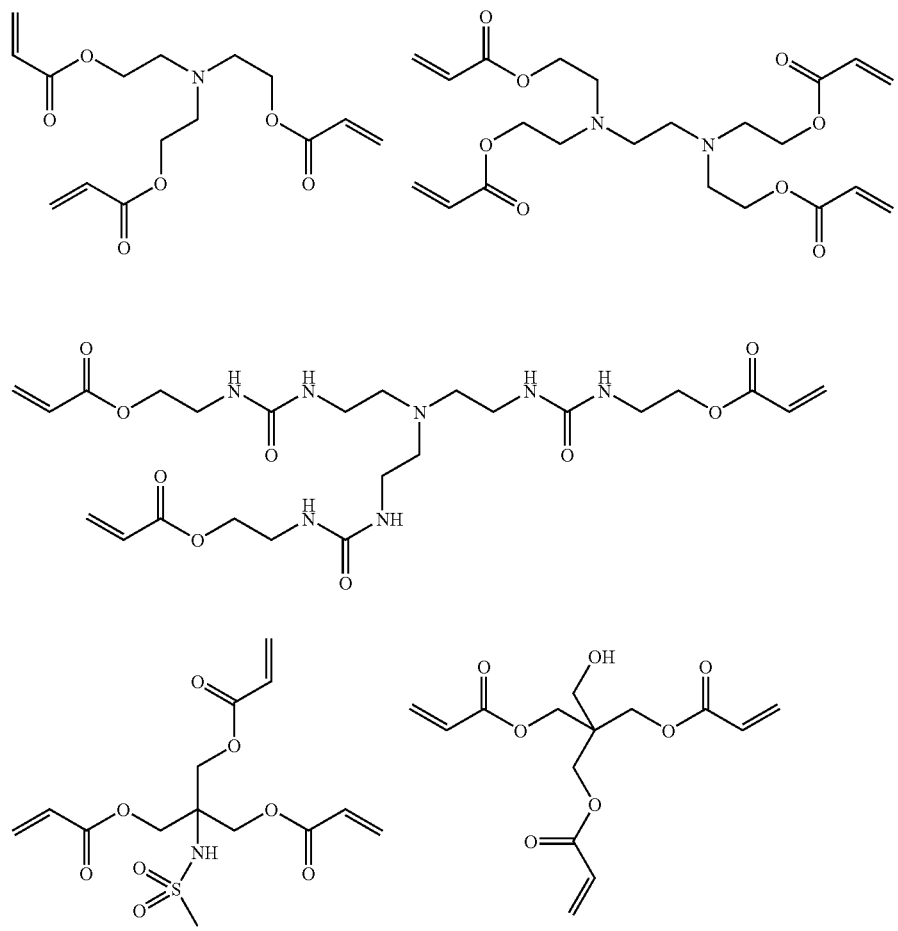

-continued

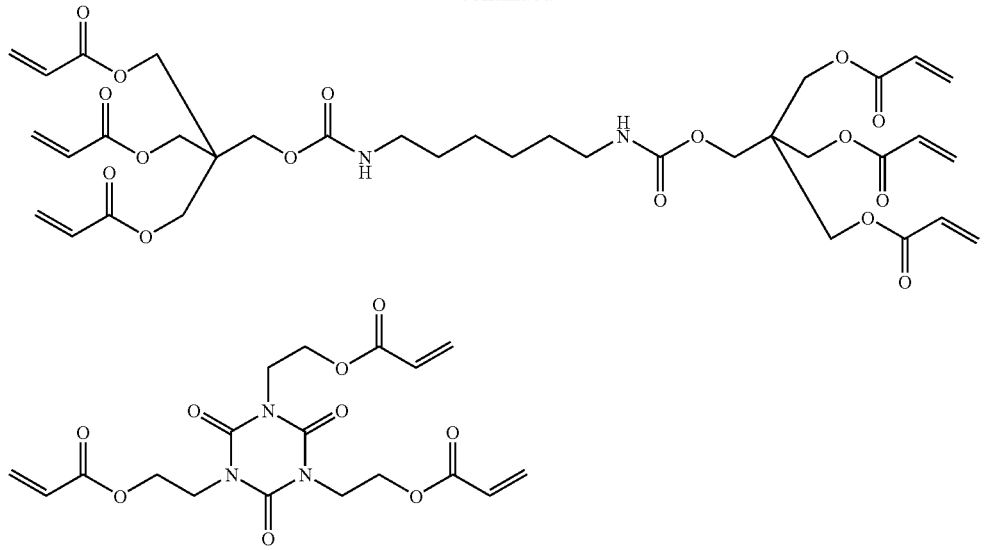

Among the hydrogen bonding group-containing monomers, preferred examples include a monomer containing a carboxyl group, a monomer containing an alkoxycarbonylamino group, and a monomer containing an ureido group. A still more preferred example is a monomer containing a carboxyl group.

The photosensitive resin composition of the invention includes the hydrogen bonding group-containing monomer in an amount of 30 mass % or more with respect to the total solid content of the composition. As a result, deterioration in rectangularity of a pattern during a post baking process may be inhibited. The photosensitive resin composition of the invention includes the hydrogen bonding group-containing monomer preferably in an amount of 33 mass % or more, and more preferably in an amount of 35 mass % or more, with respect to the total solid content of the composition.

In the photosensitive resin composition of the invention, another monomer (hereinbelow, may also be referred to as "additional polymerizable monomer") may be used in combination with the hydrogen bonding group-containing monomer.

As for the additional polymerizable monomer, those having at least one ethylenic double bond which is useful for addition polymerization and has boiling point of 100° C. or more at normal pressure are preferable. By including the photopolymerization initiator in combination with the polymerizable monomer, a negative photosensitive resin composition may be prepared.

Examples of the additional polymerizable monomer include a monofunctional acrylate or methacrylate such as polyethylene glycol mono(meth)acrylate, polypropylene glycol mono(meth)acrylate or phenoxyethyl(meth)acrylate; polyethylene glycol di(meth)acrylate, trimethylolethane tri(meth)acrylate, neopentyl glycol di(meth)acrylate, pentaerythritol tri(meth)acrylate, pentaerythritol tetra(meth)acrylate, dipentaerythritol penta(meth)acrylate, dipentaerythritol hexa(meth)acrylate, hexanediol(meth)acrylate, trimethylolpropanetri(acryloyloxypropyl)ether, tri(acryloyloxyethyl)isocyanurate, a methacrylate adduct in which a polyfunctional alcohol such as glycerin or trimethylol ethane is added with ethylene oxide or propylene oxide and then converted into methacrylate; a urethane acrylate such as those described in JP-B Nos. 48-41708 and 50-6034, and JP-A No. 51-37193; a polyester acrylate such as those described in JP-A No. 48-64183, JP-B Nos. 49-43191 and 52-30490; a polyfunctional acrylate or methacrylate such as epoxyacrylate, which is a reaction product between an epoxy resin and (meth)acrylic acid, and a mixture thereof.

In addition, the photocurable monomers and oligomers which are described in Journal of the Adhesion Society of Japan Vol. 20, No. 7, pages 300-308 may be also used.

Among these, more preferred additional polymerizable monomer is a polyfunctional (meth) acrylic compound. Still more preferred is a polyfunctional (meth)acrylate which has no hydrogen bonding group.

In exemplary embodiments of the invention, the amount of all monomers (i.e., monomers including at least a hydrogen bonding group-containing monomer, and if necessary, other monomers) in the photosensitive resin composition is preferably from 10 to 80 mass %, more preferably 10 to 70 mass % and still more preferably 10 to 60 mass %, with respect to the total solid content of the composition. When the amount of the all monomers is 10 mass % or more, a favorable cured film is obtained. Meanwhile, when the amount of the all monomers is 80 mass % or less, generation of development residues may be more efficiently inhibited.

As for the combination of the hydrogen bonding group-containing monomer and a UV absorbing agent for the photosensitive resin composition of the invention, the following combination is preferable in terms of attaining both the reduction in development residues and the improvement in pattern rectangularity.

Specifically, a combination in which the hydrogen bonding group-containing monomer is a polyfunctional monomer containing a hydrogen bonding group selected from a carboxyl group, an alkoxycarbonylamino group, and an ureido group, and the UV absorbing agent is a compound represented by Formula (I) is preferable.

In particular, it is more preferred that the photosensitive resin composition of the invention further includes a polyfunctional (meth)acrylate having no hydrogen bonding group as a monomer.

5. Organic Solvent

In general, the photosensitive resin composition of the invention may be prepared using an organic solvent.

The organic solvent is not specifically limited as long as it provides sufficient solubility of each component or sufficient application properties of the photosensitive resin composition. The organic solvent is preferably selected in view of the solubility of a UV absorbing agent and a binder, the application property and safety. When the photosensitive resin composition of the invention is prepared, it is preferable that at least two organic solvents are used.

Examples of the organic solvent include:

esters such as ethyl acetate, n-butyl acetate, iso-butyl acetate, amyl formate, iso-amyl acetate, iso-butyl acetate, butyl propionate, iso-propyl butyrate, ethyl butyrate, butyl butyrate, an alkyl ester, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate and ethyl ethoxyacetate;

3-oxypropionic acid alkyl esters such as methyl 3-oxypropionate or ethyl 3-oxypropionate, for example, methyl 3-methoxypropionate, ethyl 3-methoxypropionate, methyl 3-ethoxypropionate or ethyl 3-ethoxypropionate;

2-oxypropionic acid alkyl esters such as methyl 2-oxypropionate, ethyl 2-oxypropionate or propyl 2-oxypropionate, for example, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate or ethyl 2-ethoxy-2-methylpropionate;

methyl pyruvate, ethyl pyruvate, propyl pyruvate, methyl acetoacetate, ethyl acetoacetate, methyl 2-oxobutanoate and ethyl 2-oxobutanoate;

ethers such as diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol monomethyl ether, propylene glycol monoethyl ether acetate, propylene glycol monoethyl ether acetate or propylene glycol monopropyl ether acetate;

ketones such as methyl ethyl ketone, cyclohexanone, 2-heptanone or 3-heptanone; and aromatic hydrocarbons such as toluene or xylene.

As described above, these organic solvents may be used in combination of two or more thereof, for improvement of solubility of a UV absorbing agent and the alkali soluble resin, the application property and the like. In particular, a mixture solution containing two or more solvents selected from methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, ethylcarbitol acetate, butylcarbitol acetate, propylene glycol methyl ether, and propylene glycol methyl ether acetate is preferably used.

The total amount of the organic solvent in the photosensitive resin composition is preferably set so that the concentration of the total solid content in the composition is from 5 to 90 mass %, more preferably from 5 to 87 mass %, and still more preferably from 10 to 85 mass %, in terms of application property.

6. Other Additives

The photosensitive resin composition according to an exemplary embodiment of the invention may further include various additives such as a filler, a polymer compound which is different from those described above, a surfactant, an adhesion promoter, an anti-oxidant or an anti-coagulant, if necessary.

Specific examples of such additives include: a filler such as glass or alumina; a polymer compound other than a binder resin, such as polyvinyl alcohol, polyacrylic acid, polyethylene glycol monoalkyl ether or polyfluoroalkyl acrylate; a surfactant such as a nonionic surfactant, a cationic surfactant or an anionic surfactant; an adhesion promoter such as vinyltrimethoxysilane, vinyltriethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane or 3-mercaptopropyltrimethoxysilane; an anti-oxidant such as 2,2-thiobis(4-methyl-6-t-butylphenol) or 2,6-di-t-butyl phenol; and an anti-coagulant such as sodium polyacrylate.

Further, when alkali solubility of a non-UV exposed region is to be increased and the developability is desired to be more improved, the photosensitive resin composition of the invention may include an organic carboxylic acid, preferably a low-molecular-weight organic carboxylic acid having a molecular weight of 1,000 or less.

Specific examples of the organic carboxylic acid include: an aliphatic monocarboxylic acid such as formic acid, acetic acid, propionic acid, butyric acid, valeric acid, pivalic acid, caproic acid, diethyl acetic acid, enanthic acid or caprylic acid; an aliphatic dicarboxylic acid such as oxalic acid, malonic acid, succinic acid, glutaric acid, adipic acid, pimeric acid, suberic acid, azelaic acid, sebacic acid, brasillic acid, methyl malonic acid, ethyl malonic acid, dimethyl malonic acid, methyl succinic acid, tetramethyl succinic acid or citraconic acid; an aliphatic tricarboxylic acid such as tricarballylic acid, aconitic acid or camphoronic acid; an aromatic monocarboxylic acid such as benzoic acid, toluic acid, cuminic acid, hemellitic acid or mesitylene acid; an aromatic polycarboxylic acid such as phthalic acid, isophthalic acid, terephthalic acid, trimellitic acid, trimesic acid, mellophanic acid or pyromellitic acid; and other carboxylic acids such as phenyl acetic acid, hydratropic acid, hydrocinnamic acid, mandellic acid, phenylsuccinic acid, atropic acid, cinnamic acid, methyl cinnamic acid, benzyl cinnamic acid, cinnamylidene acetic acid, coumaric acid or unberic acid.

Further, the photosensitive resin composition of the invention may contain a small amount of a colorant (for example, a known pigment or dye, including a blackening agent such as carbon black or titanium black) as long as a white (transparent) pattern for a solid-state imaging device of the invention can be formed. However, it is preferable that the composition does not include colorants.

Specifically, the amount of a colorant with respect to the total solid content of the photosensitive resin composition is preferably 3.0 mass % or less, more preferably 1.0 mass % or less, in view of light transmittance of a transparent pattern. The amount of a colorant is still more preferably 0 mass % (i.e., the composition does not include colorants at all).

As explained above, the photosensitive resin composition of the invention is used for forming pixels of a solid-state imaging device (in particular for forming transparent pixels which form a transparent pattern).

In terms of achieving efficient use as described above, the photosensitive resin composition of the invention preferably has a light transmittance of 90% or more, more preferably 95% or more, in the wavelength range of from 400 nm to 700 nm when it is formed into a film having a thickness of 1 μm.

Color Filter and Method for Producing the Same

A method for producing the color filter according to an exemplary embodiment of the present invention includes: applying the photosensitive resin composition of the invention; exposing the thus-formed coating layer at least with UV light through a photomask; developing the coating layer to form a pattern (preferably a transparent pattern); and post-baking the thus-formed pattern.

The color filter of the invention is produced by the production method described above.

In the method for producing a color filter of the invention, the photosensitive resin composition which provides a high resolution and inhibits deterioration in pattern rectangularity during the post-baking process as a post treatment is used. Thus, a color filter which has excellent pixel (pattern) rectangularity and can provide fine and high-quality image display may be obtained.

With respect to the color filter of the invention, the term "color" indicates "color" in a broad sense, and includes not only a chromatic color such as red color, blue color or green color but also an achromatic color such as transparent color. That is, the pattern of the color filter of the invention may be a chromatic pattern having red color, blue color, green color, or the like, or may be an achromatic pattern that is transparent or the like.

Moreover, the color filter of the invention may have a combination of at least one chromatic color pattern having red color, blue color, green color, or the like and at least one achromatic color pattern that is transparent or the like. Examples thereof include a color filter having a red pattern (red pixel), a blue pattern (blue pixel), a green pattern (green pixel) and a transparent pattern (transparent pixel).

In the invention, the term "transparent pattern" indicates a pattern which has high light transmittance over the entire range of visible light. Specifically, when a film thickness is 1 μm, a pattern having a light transmittance of 90% or more, more preferably a light transmittance of 95% or more, over the wavelength range of from 400 nm to 700 nm is preferable.

As an example of a method for producing the color filter of the invention, a method for forming a transparent pattern for a color filter of an image sensor will be described below.

The method includes forming a coating layer by coating a silicon wafer with the photosensitive resin composition either directly or via another layer, followed by drying (coating layer forming step); exposing the coating layer to at least UV light through a photomask to obtain a pattern (exposure step); treating the exposed coating layer with an alkaline developer to form a pattern (developing step); and heating the pattern obtained by the development (post baking step). In addition, if necessary, the method may further include a curing step in which the coating layer or the pattern is cured by heating or light exposure.

As a method for applying the photosensitive resin composition, any of various methods such as a spray method, a roll coating method or a spin coating method may be used.

The UV ray that is used for the exposure is preferably at least one of g-line, h-line and i-line, and more preferably i-line.

As an exposure apparatus, a stepper may be preferably used, for example.

Examples of the alkali developer include solutions of for example, an inorganic alkali such as sodium hydroxide, potassium hydroxide, sodium carbonate, sodium silicate, sodium metasilicate or ammonia; a primary amine such as ethyl amine or n-propyl amine; a secondary amine such as diethyl amine or di-n-propyl amine; a tertiary amine such as trimethyl amine, methyl diethyl amine, dimethyl ethyl amine or triethyl amine; an alkanol amine such as dimethyl ethanol amine, methyl diethanol amine or triethanol amine; a cyclic tertiary amine such as pyrrole, piperidine, N-methyl piperidine, N-methylpyrrolidine, 1,8-diazabicyclo[5.4.0]-7-undecene or 1,5-diazabicyclo[4.3.0]-5-nonene; an aromatic tertiary amine such as pyridine, collidine, lutidine or quinoline; and a quaternary ammonium salt such as tetramethyl ammonium hydroxide or tetraethyl ammonium hydroxide.

Further, the alkali developer may further include an appropriate amount of a water-soluble organic solvent such as methanol or ethanol and/or an appropriate amount of a surfactant.

With respect to a developing method, any one selected from a puddle method, a dipping method, a shower method and the like can be employed. Time for development is generally in the range of 30 to 180 seconds.

After the alkali development, washing with running water is carried out for 30 to 90 seconds, for example, followed by drying with pressurized air or pressurized nitrogen gas to form a pattern.

Subsequently, the pattern obtained after the alkali development is again exposed with UV light and then subjected to a post-baking process by heating with a heating apparatus such as a hot plate or an oven at specific temperature, for example, of from 150 to 250° C., for a specific period of time, i.e., 5 to 30 minutes on the hot plate or 30 to 90 minutes in the oven. As a result, a desired transparent pattern can be formed.

The transparent pattern thus obtained has plural pixels having a rectangular shape on the substrate. The length of one side of the pixel (i.e., longest side) is generally from 1.0 to 20 μm or less. However, for efficient use of a substrate such as a silicon wafer, minimization of a device which uses a solid-state imaging device, and high speed operation of a solid-state imaging device, the length is preferably 5 μm or less, more preferably 4 μm or less, and still more preferably 3 μm or less.

The thickness of a pixel for the color filter of the invention is not specifically limited. However, for efficient use of a substrate such as a silicon wafer, and shading of a device using the solid-state imaging device, the thickness tends to be small. Preferably, the thickness is 2 μm or less, more preferably 1.5 μm or less, and still more preferably 1.0 μm or less.

Solid-State Imaging Device

The solid-state imaging device according to an exemplary embodiment of the invention includes at least the color filter of the invention as described above.

Since it includes the color filter of the invention which has excellent pixel (pattern) rectangularity, the solid-state imaging device of the invention has excellent color reproducibility.

The configuration of the solid-state imaging device of the invention is not specifically limited, as long as the solid-state imaging device includes the color filter of the invention and can function as a solid-state imaging device. For example, the following configurations can be employed.

Specifically, a solid-state imaging device may have, on a support; plural photodiodes that constitute a photodetecting area of a solid-state imaging device (for example, a CDC image sensor, a CMOS image sensor) and a transport electrode composed of polysilicone or the like; a light-blocking film which is formed on the photodiodes and the transport electrode, and which is composed of tungsten or the like, and which has an aperture only on the photodetecting area of the photodiode; a device protective film which is composed of silicon nitride or the like and is formed on the light-blocking film so as to cover the entire surface of the light-blocking film and the photodiode detecting area; and the color filter of the invention provided on the device protective film.

Alternatively, a configuration in which a light collecting member or apparatus (for example, a micro lens, and "light collecting member" has this meaning in the description below) is provided on the device protective layer and under the color filter (i.e., at a side close to the support), or a configuration in which a light collecting member or apparatus is provided on the color filter, or the like, may also be employed.

EXAMPLES

Hereinbelow, the present invention will be described in more detail using examples. However, the present invention is not limited to the examples, without departing from the subject of the invention. Further, the term "part" is on mass basis, unless otherwise noted.

Example 1

Formation of Transparent Pattern of Color Filter for Solid-State Imaging Device Preparation of Resist Solution for Planarization Film The following components were mixed and stirred using a homogenizing stirrer to prepare a resist solution for a planarization film.

Composition of Resist Solution for Planarization Film

| | |
|---|---|
| Propyleneglycol monomethyl ether acetate solution of benzylmethacrylate/methacrylic acid copolymer (=70/30 [molar ratio], 20%, weight average molecular weight of 30,000, trade name: ACRYBASE FF-187, manufactured by FUJIKURA KASEI Co., Ltd.): | 22 parts |
| Dipentaerythritol hexaacrylate (trade name: KAYARAD DPHA, manufactured by NIPPON KAYAKU Co., Ltd.): | 6.5 parts |
| Propyleneglycol monomethyl ether acetate (trade name: MMPGAC, manufactured by DAICEL CHEMICAL INDUSTRIES, Ltd.): | 13.8 parts |
| Ethyl-3-ethoxy propionate (trade name: Ethyl-3-ethoxy propionate, manufactured by NAGASE & Co., Ltd.): | 12.3 parts |
| Halomethyltriazine compound (the following Compound I) (trade name: Triazine PP, manufactured by PANCHIM): | 0.3 parts |

Compound I

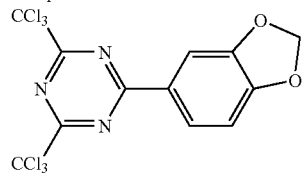

Formation of Planarization Film

The resist solution for a planarization film thus obtained was applied on a 6-inch silicon wafer by a spin coating method. The wafer was heat-treated at a surface temperature of 100° C. for 120 seconds on a hot plate, thereby obtaining a coating layer having a uniform thickness of about 1.0 μm formed on the silicon wafer. Subsequently, the coating layer was cured by heating in an oven at the temperature of 230° C. for one hour, thereby obtaining a planarization film.

Preparation of Photosensitive Transparent Resin Composition

The following components were mixed and stirred using a magnetic stirrer to obtain a photosensitive transparent resin composition, which was a photosensitive resin composition of the present invention.

Composition of Photosensitive Transparent Resin Composition

| | |
|---|---|
| CYCLOMER P-ACA (solid content: 50 mass %, weight average molecular weight of 30,000) (trade name, manufactured by DAICEL CHEMICAL INDUSTRIES, Ltd.): | 13.66 parts |
| TO-2349 (trade name, manufactured by TOAGOSEI Co., Ltd.; a mixture containing the following monomer A and dipentaerythritol hexaacrylate (DPHA) in 7:3 ratio): | 10.25 parts |
| Initiator A (the following compound II; an oxime photopolymerization initiator, product name: CGI-124, manufactured by Ciba Specialty Chemicals): | 0.98 parts |
| The following compound III (UV absorbing agent): | 1.03 parts |
| Solvent A (organic solvent) (propyleneglycol monomethyl ether acetate, trade name: MMPGAC, manufactured by DAICEL CHEMICAL INDUSTRIES, Ltd.): | 69.82 parts |
| Surfactant A (fluorine surfactant; trade name: MEGAFAC F-144, manufactured by Dainippon Ink and Chemicals Incorporated): | 0.01 parts |
| Polymerization inhibitor A (p-methoxyphenol; trade name: p-methoxyphenol, manufactured by KANTO CHEMICAL Co., Ltd.): | 0.0051 parts |

Compound II

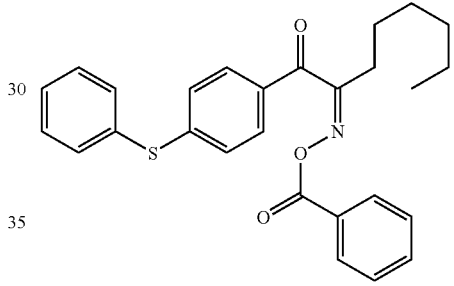

Compound III

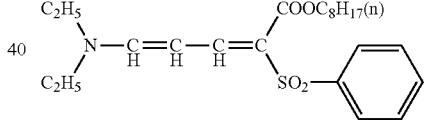

Formation of Coating Layer

The photosensitive transparent resin composition thus obtained was applied on the planarization film formed on a silicon wafer by a spin coating method. The wafer was heat-treated at a surface temperature of 100° C. for 120 seconds on a hot plate for drying, thereby obtaining a coating layer having a thickness of about 0.8 μm after drying.

Formation of Transparent Pattern of Color Filter for Solid-State Imaging Device

Next, the dried coating layer after drying was exposed with exposure amount of 100 mJ/cm$^2$ using an i-line stepper (trade name: FPA-3000i5+ manufactured by Canon Inc.) through a mask pattern in which 1.2 μm square patterns were aligned in a 4 mm×3 mm area of the substrate.

The coating layer subjected to the pattern exposure was subjected to puddle development using a 60% aqueous solution of an organic alkali developer (trade name: CD-2000 manufactured by FUJIFILM Electronic Materials Co., Ltd.) at room temperature for 60 seconds, followed by rinsing with pure water using spin shower for 20 seconds. The coating layer was then washed with pure water again. Water drops on the substrate were blown by highly pressurized air. Then, the substrate was dried in atmosphere, and subjected to a post-baking treatment on a hot plate at 220° C. for 300 seconds, thereby forming a transparent pattern on the silicon wafer.

As described above, 1.2 μm-square transparent patterns were formed on the planarization film on the silicon wafer, whereby a transparent pattern of the color filter for a solid-state imaging device was obtained.

Next, with the same conditions as in the formation of a transparent pattern on a planarization film of a silicon wafer as described above, the photosensitive transparent resin composition was applied on Corning 1737 (trade name, manufactured by Corning, Inc.) to form a coating film. The resultant coating film was subjected to entire surface exposure, development, rinse, washing and post-baking in this order, whereby a transparent film having a thickness of 1 μm was obtained. The transparent film was used as a sample for measurement of light transmittance.

Then, the light transmittance of this transparent film was determined by using MCPD-3000 (trade name, manufactured by OTSUKA ELECTRONICS Co., Ltd.). The light transmittance was found to be 93% or more in the wavelength range of from 400 nm to 700 nm.

Evaluation

For the 1.2 μm square transparent patterns which had been formed on the planarization film of the silicon wafer as above, the following evaluation and measurement were carried out. Results of the evaluation and measurement are summarized in Table 1.

(1) Sectional View of Transparent Pattern

The thus-obtained 1.2 μm square transparent pattern of the color filter was cut along a plane orthogonal to the color filter plane (silicon wafer plane). A sectional view thereof was then observed using a SEM (trade name, S-4800, manufactured by Hitachi High-Technologies Corporation.) at a magnification of 30,000. The resultant sectional view was evaluated according to the following evaluation criteria.

Evaluation Criteria

A: The ratio of the length of an upper side of the pattern to the length of a lower side of the pattern (length of upper side/length of lower side) is from 0.9 to 1.1. This corresponds to a rectangular shape and thus a favorable shape was obtained.
B: The ratio of the length of an upper side of the pattern to the length of a lower side of the pattern is from 0.7 to 0.9, or from 1.1 to 1.3. This is within a level that is practically acceptable.
C: The ratio of the length of an upper side of the pattern to the length of a lower side of the pattern is from 0.7 to 1.3. In this case no rectangular shape was obtained.

(2) Development Residues

The pixel patterns of the color filter after post-baking were observed from the upper side of the color filter on the silicon wafer by using a SEM (S-7800H, manufactured by Hitachi, Ltd.) at a magnification of 30,000, and the generation of development residue was determined by sight based on the following evaluation criteria.

A smaller amount of development residue indicates a superior pattern resolution.

Evaluation Criteria

A: No development residue was generated.
B: Some development residue was generated, but within a level that is practically acceptable.
C: Significant development residue was generated.

Examples 2 to 18

Formation of Transparent Pattern of Color Filter for Solid-State Imaging Device

Except that the photosensitive transparent resin composition of Example 1 was replaced with those described in the following Table 1, respectively, photosensitive transparent resin compositions were respectively prepared and color filters were produced, in the same manner as in Example 1. Further, evaluation was carried out in the same manner as in Example 1. Results of the evaluation were summarized in Table 1.

Comparative Examples 1 to 3

Formation of Transparent Pattern of Color Filter for Solid-State Imaging Device

Except that the photosensitive transparent resin composition of Example 1 was replaced with those described in the following Table 1, respectively, photosensitive transparent resin compositions were respectively prepared and color filters were produced, in the same manner as in Example 1. Further, evaluation was carried out in the same manner as in Example 1. Results of the evaluation were summarized in Table 1.

TABLE 1

| | Resin | Hydrogen bonding group-containing monomer | Other monomers | UV absorbing agent | Photo-polymerization initiator | All resins/all monomers | Rectangularity index | Rectangularity evaluation | Development residues |
|---|---|---|---|---|---|---|---|---|---|
| Example 1 | CYCLOMER P-ACA (35.7 mass %) | Monomer A (37.6 mass %) | DPHA (16.1 mass %) | Compound III (5.4 mass %) | CGI-124 | 0.66 | 1.00 | A | A |
| Example 2 | CYCLOMER P-ACA (35.7 mass %) | Monomer B (37.6 mass %) | DPHA (16.1 mass %) | Compound III (5.4 mass %) | CGI-124 | 0.66 | 0.95 | A | A |
| Example 3 | CYCLOMER P-ACA (35.7 mass %) | Monomer C (37.6 mass %) | DPHA (16.1 mass %) | Compound III (5.4 mass %) | CGI-124 | 0.66 | 0.97 | A | A |
| Example 4 | CYCLOMER P-ACA (35.7 mass %) | Monomer D (37.6 mass %) | DPHA (16.1 mass %) | Compound III (5.4 mass %) | CGI-124 | 0.66 | 0.95 | A | A |
| Example 5 | CYCLOMER P-ACA (35.7 mass %) | Monomer E (37.6 mass %) | DPHA (16.1 mass %) | Compound III (5.4 mass %) | CGI-124 | 0.66 | 0.93 | A | A |
| Example 6 | CYCLOMER P-ACA (35.7 mass %) | Monomer F (37.6 mass %) | DPHA (16.1 mass %) | Compound III (5.4 mass %) | CGI-124 | 0.66 | 0.98 | A | A |
| Example 7 | CYCLOMER P-ACA (35.7 mass %) | Monomer G (37.6 mass %) | DPHA (16.1 mass %) | Compound III (5.4 mass %) | CGI-124 | 0.66 | 0.95 | A | A |
| Example 8 | CYCLOMER P-ACA (35.7 mass %) | Monomer A (30.0 mass %) | DPHA (23.7 mass %) | Compound III (5.4 mass %) | CGI-124 | 0.66 | 0.90 | A | A |

TABLE 1-continued

| | Resin | Hydrogen bonding group-containing monomer | Other monomers | UV absorbing agent | Photo-polymerization initiator | All resins/all monomers | Rectan-gularity index | Rectan-gularity evaluation | Development residues |
|---|---|---|---|---|---|---|---|---|---|
| Example 9 | CYCLOMER P-ACA (33.6 mass %) | Monomer A (37.6 mass %) | DPHA (18.2 mass %) | Compound III (5.4 mass %) | CGI-124 | 0.59 | 0.91 | A | A |
| Example 10 | CYCLOMER P-ACA (44.7 mass %) | Monomer A (31.3 mass %) | DPHA (13.4 mass %) | Compound III (5.4 mass %) | CGI-124 | 1.00 | 1.08 | A | A |
| Example 11 | CYCLOMER P-ACA (32.6 mass %) | Monomer A (38.3 mass %) | DPHA (18.5 mass %) | Compound III (5.4 mass %) | CGI-124 | 0.57 | 0.82 | B | A |
| Example 12 | CYCLOMER P-ACA (45.7 mass %) | Monomer A (30.6 mass %) | DPHA (13.1 mass %) | Compound III (5.4 mass %) | CGI-124 | 1.05 | 1.12 | B | A |
| Example 13 | CYCLOMER P-ACA (38.1 mass %) | Monomer A (37.6 mass %) | DPHA (16.1 mass %) | Compound III (3.0 mass %) | CGI-124 | 0.71 | 0.92 | A | A |
| Example 14 | CYCLOMER P-ACA (33.8 mass %) | Monomer A (37.6 mass %) | DPHA (13.6 mass %) | Compound III (10.0 mass %) | CGI-124 | 0.66 | 1.10 | A | A |
| Example 15 | CYCLOMER P-ACA (38.2 mass %) | Monomer A (37.6 mass %) | DPHA (16.1 mass %) | Compound III (2.9 mass %) | CGI-124 | 0.71 | 0.86 | B | A |
| Example 16 | CYCLOMER P-ACA (33.3 mass %) | Monomer A (37.6 mass %) | DPHA (13.6 mass %) | Compound III (10.3 mass %) | CGI-124 | 0.65 | 1.15 | B | A |
| Example 17 | CYCLOMER P-ACA (35.7 mass %) | Monomer A (37.6 mass %) | DPHA (16.1 mass %) | TINUVIN460 (5.4 mass %) | CGI-124 | 0.66 | 0.94 | A | B |
| Example 18 | CYCLOMER P-ACA (33.3 mass %) | Monomer A (37.6 mass %) | DPHA (13.6 mass %) | Compound III (10.3 mass %) | Compound A | 0.65 | 1.09 | A | A |
| Comparative Example 1 | CYCLOMER P-ACA (35.7 mass %) | Monomer A (29.0 mass %) | DPHA (24.7 mass %) | Compound III (5.4 mass %) | CGI-124 | 0.66 | 0.68 | C | A |
| Comparative Example 2 | CYCLOMER P-ACA (35.7 mass %) | Monomer A (41.4 mass %) | DPHA (17.7 mass %) | — | CGI-124 | 0.60 | 0.65 | C | A |
| Comparative Example 3 | CYCLOMER P-ACA (35.7 mass %) | Monomer A (37.6 mass %) | DPHA (16.1 mass %) | Compound III (5.4 mass %) | IRGACURE 369 | 0.66 | 0.68 | C | A |

Description of Table 1

Values in parentheses (unit: mass %) for each component indicate the amount thereof (mass %) with respect to the total solid content of the photosensitive resin composition; in the case of the resin, the value in parentheses indicates a solid content thereof.

The column "All resins/all monomers" indicates the mass ratio of all resins to all monomers (including a hydrogen bonding group-containing monomer and other monomers).

DPHA indicates dipentaerythritol hexaacrylate.

TINUVIN 460 is a UV absorbing agent hydroxyphenyltriazine (HPT), manufactured by Ciba Specialty Chemicals.

IRGACURE 369 is an aminoalkylphenone photopolymerization initiator (a photopolymerization initiator other than the oxime photopolymerization initiator).

Monomer A to Monomer G respectively have the chemical structures as shown below.

Compound A (oxime photopolymerization initiator) has the chemical structure as shown below.

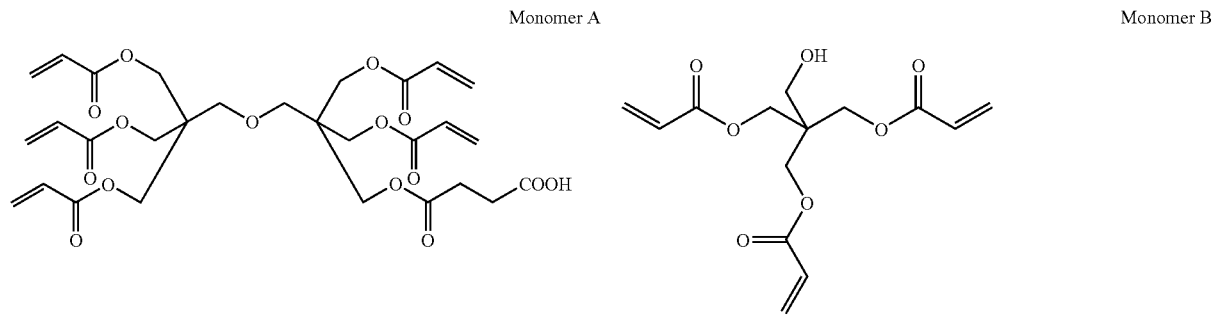

Monomer A

Monomer B

Monomer C

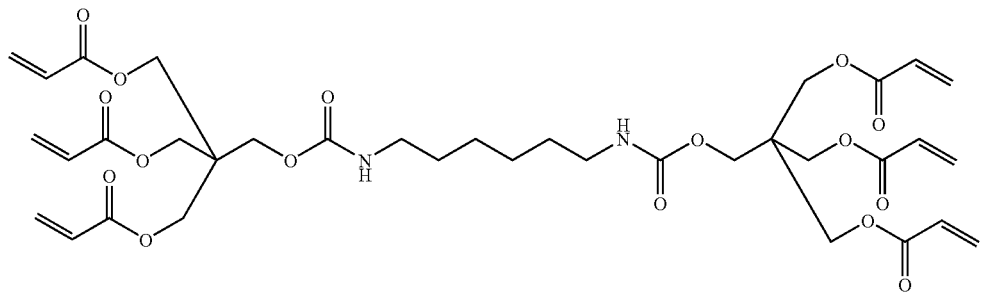

Monomer D

Monomer E

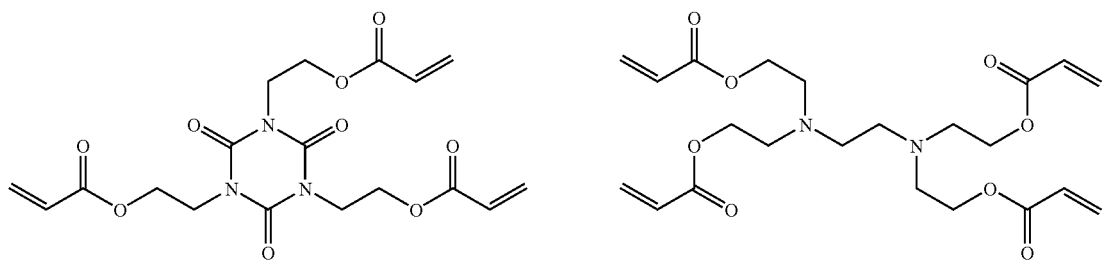

Monomer F

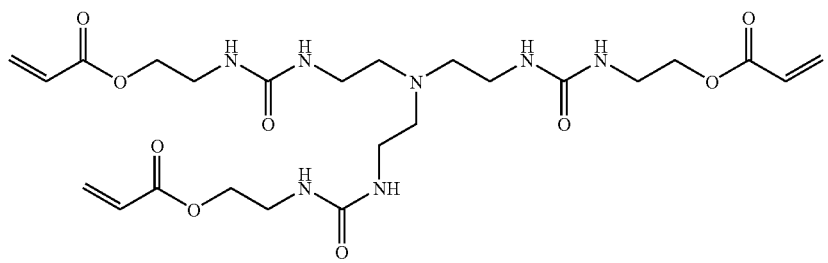

Monomer G

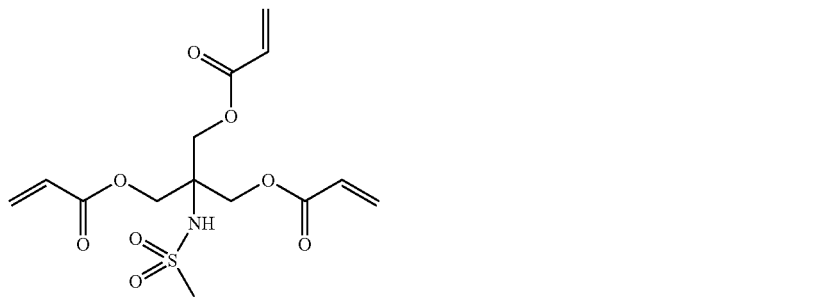

Compound A

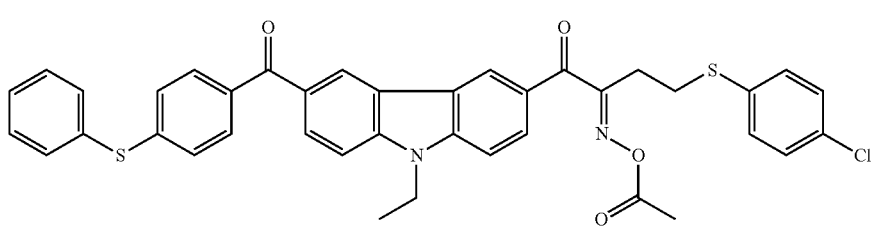

As shown in Table 1, the photosensitive resin compositions of the invention, which include a resin, an oxime photopolymerization initiator, a UV absorbing agent and a hydrogen bonding group-containing monomer included in an amount of 30 mass % or more with respect to the total solid content of the compositions, provide excellent pattern rectangularity and reduced development residues.

In the above example, an example in which a transparent pattern of a color filter is formed on a silicon wafer was given. However, when a solid-state imaging device is to be produced, the silicon wafer can be simply replaced with a substrate for a solid-state imaging device in which a photodiode, a light-blocking film, a device protective layer and the like are provided.

For example, on a silicon wafer on which a photodiode and a transport electrode are formed, a light-blocking film which is composed of tungsten and has an aperture only on the photodetecting area of the photodiode is formed so that the entire surface of the light-blocking film and the photodetecting area of the photodiode (i.e., the region in the aperture of the light-blocking layer) are covered, whereby a device protective layer composed of silicon nitride is formed. Then, on the device protective layer, a transparent pattern (i.e., transparent pixels) is formed in the same manner as in the above examples, and red pixels, blue pixels and green pixels are formed according to a known method, thereby obtaining a color filter. Finally, on the color filter, a micro lens is formed as a light collecting member, whereby a solid-state imaging device (CCD, CMOS or the like) having favorable color reproducibility is prepared.

What is claimed is:

1. A photosensitive resin composition, comprising:
a resin;
an oxime photopolymerization initiator;
a UV absorbing agent; and
a monomer containing a hydrogen bonding group,
wherein the amount of the monomer containing a hydrogen bonding group is 30 mass % or more with respect to the total solid content of the photosensitive resin composition,
wherein the photosensitive resin composition is used for forming a solid-state imaging device, and
wherein the UV absorbing agent is a conjugated diene compound.

2. The photosensitive resin composition according to claim 1, wherein the mass ratio of the resin with respect to the total mass of all monomers including the monomer containing a hydrogen bonding group is from 0.6 to 1.0.

3. The photosensitive resin composition according to claim 1, wherein the mass ratio of the resin with respect to the total mass of all monomers including the monomer containing a hydrogen bonding group is from 0.62 to 0.8.

4. The photosensitive resin composition according to claim 1, wherein the amount of the UV absorbing agent is from 3 mass % to 10 mass % with respect to the total solid content of the photosensitive resin composition.

5. The photosensitive resin composition according to claim 1, wherein the UV absorbing agent is a compound having a maximum absorbance in the wavelength range of 250 nm to 400 nm.

6. The photosensitive resin composition according to claim 1, wherein the hydrogen bonding group is at least one selected from the group consisting of a carboxyl group, an alkoxycarbonylamino group, and a ureido group.

7. The photosensitive resin composition according to claim 1, wherein the conjugated diene compound is a compound represented by the following Formula (1):

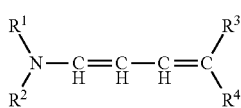

Formula (I)

wherein in Formula (I), $R^1$ and $R^2$ each independently represent a hydrogen atom, an alkyl group having 1 to 20 carbon atoms, or an aryl group having 6 to 20 carbon atoms; $R^1$ and $R^2$ may be the same as or different from each other, but may not both be a hydrogen atom; $R^1$ and $R^2$ may bind to each other to form a cyclic amino group together with the nitrogen atom; and $R^3$ and $R^4$ each independently represent an electron withdrawing group.

8. The photosensitive resin composition according to claim 7, wherein the electron withdrawing group has a Hammett substituent constant $\sigma_p$ of from 0.20 to 1.0.

9. The photosensitive resin composition according to claim 1, wherein the monomer containing a hydrogen binding group is a polyfunctional monomer.

10. The photosensitive resin composition according to claim 1, wherein the photosensitive resin composition has a light transmittance of 90% or more in the wavelength range of from 400 nm to 700 nm when the photosensitive resin composition is formed into a film having a thickness of 1 μm.

11. A method for producing a color filter, comprising:
applying the photosensitive resin composition according to any one of claims 1 to 6 and 7 to 10 onto a substrate to form a coating film;
exposing the coating film to a UV ray through a photomask;
developing the coating film to form a pattern; and
post-baking the pattern.

12. A color filter, which is produced by the method for producing a color filter according to claim 11.

13. A solid-state imaging device, comprising the color filter according to claim 12.

14. A photosensitive resin composition, comprising:
a resin;
an oxime photopolymerization initiator;
a UV absorbing agent; and
a monomer containing a hydrogen bonding group,
wherein the amount of the monomer containing a hydrogen bonding group is 30 mass % or more with respect to the total solid content of the photosensitive resin composition, and
wherein the photosensitive resin composition is used for forming a transparent pattern for a solid-state imaging device, and the photosensitive resin composition has a light transmittance of 90% or more in the wavelength range of from 400 nm to 700 nm when the photosensitive resin composition is formed into a film having a thickness of 1 μm, and
wherein the UV absorbing agent is a conjugated diene compound.

15. The photosensitive composition according to claim 14, wherein the photosensitive composition does not include any colorants.

16. The photosensitive resin composition according to claim 14, wherein the mass ratio of the resin with respect to the total mass of all monomers including the monomer containing a hydrogen bonding group is from 0.6 to 1.0.

17. The photosensitive resin composition according to claim 14, wherein the amount of the UV absorbing agent is from 3 mass % to 10 mass % with respect to the total solid content of the photosensitive resin composition.

18. The photosensitive resin composition according to claim 14, wherein the monomer containing a hydrogen binding group is a polyfunctional monomer.

19. A method for producing a color filter, comprising:
applying the photosensitive resin composition according to claim 14 onto a substrate to form a coating film;
exposing the coating film to a UV ray through a photomask;
developing the coating film to form a pattern; and
post-baking the pattern.

* * * * *